US012748729B2

(12) United States Patent
Cooper et al.

(10) Patent No.: US 12,748,729 B2
(45) **Date of Patent: *Sep. 29, 2026**

(54) SYSTEM AND METHOD FOR STREAM DATA TYPE IDENTIFICATION USING MACHINE LEARNING

(71) Applicant: AtomBeam Technologies Inc., Moraga, CA (US)

(72) Inventors: Joshua Cooper, Columbia, SC (US); Charles Yeomans, Orinda, CA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/347,071

(22) Filed: Oct. 1, 2025

(65) Prior Publication Data

US 2026/0030214 A1 Jan. 29, 2026

Related U.S. Application Data

(63) Continuation-in-part of application No. 18/449,617, filed on Aug. 14, 2023, now Pat. No. 12,436,920, (Continued)

(51) Int. Cl.
*G06F 16/174* (2019.01)
*G06F 3/06* (2006.01)

(52) U.S. Cl.
CPC ........ *G06F 16/1752* (2019.01); *G06F 3/0608* (2013.01); *G06F 3/0641* (2013.01); *G06F 3/067* (2013.01)

(58) Field of Classification Search
CPC .. G06F 16/1752; G06F 3/0608; G06F 3/0641; G06F 3/067

(Continued)

(56) References Cited

U.S. PATENT DOCUMENTS 6,667,700 B1 12/2003 McCanne et al.
8,832,829 B2 9/2014 Manni et al.

(Continued)

OTHER PUBLICATIONS

Li, Wei-Jen et al. "Fileprints: Identifying File Types by n-gram Analysis". Proceedings of the 2005 IEEE Workshop on Information Assurance and Security, pp. 64-71. doi: 10.1109/IAW.2005.1495935. Accessed Mar. 31, 2026 from <https://ieeexplore.IEEE.org/abstract/document/1495935> (Year: 2005).*

(Continued)

*Primary Examiner* — Ajay M Bhatia
*Assistant Examiner* — Lauren Zannah Ganger
(74) *Attorney, Agent, or Firm* — GALVIN PATENT LAW LLC; Brian R. Galvin; Alec L. Perry

(57) ABSTRACT

A system and method for file type identification involving extraction of a file-print of a file, the file-print being a unique or practically-unique representation of statistical characteristics associated with the distribution of bits in the binary contents of the file, similar to a fingerprint. The file-print is then passed to a machine learning algorithm that has been trained to recognize file types from their file-prints. The machine learning algorithm returns a predicted file type and, in some cases, a probability of correctness of the prediction. The file may then be encoded using an encoding algorithm chosen based on the predicted file type.

4 Claims, 38 Drawing Sheets

Related U.S. Application Data which is a continuation of application No. 17/994,359, filed on Nov. 27, 2022, now Pat. No. 11,853,262, which is a continuation of application No. 17/727,919, filed on Apr. 25, 2022, now Pat. No. 11,609,881, which is a continuation of application No. 17/501,872, filed on Oct. 14, 2021, now Pat. No. 11,397,707.

(60) Provisional application No. 63/232,030, filed on Aug. 11, 2021.

(58) Field of Classification Search
USPC .......................................................... 707/692
See application file for complete search history.

(56) References Cited

U.S. PATENT DOCUMENTS

| | | | |
|---|---|---|---|
| 9,971,594 B2 | 5/2018 | Fox et al. | |
| 2015/0248556 A1* | 9/2015 | Sickendick ........... | G06F 21/563<br>726/22 |

OTHER PUBLICATIONS

Jordan, M. I., & Mitchell, T. M.; "Machine learning: Trends, perspectives, and prospects", Science, vol. 349:6245, pp. 255-260, Jul. 17, 2015.

* cited by examiner

SYSTEM AND METHOD FOR STREAM DATA TYPE IDENTIFICATION USING MACHINE LEARNING

CROSS-REFERENCE TO RELATED APPLICATIONS

Priority is claimed in the application data sheet to the following patents or patent applications, each of which is expressly incorporated herein by reference in its entirety:

U.S. Ser. No. 18/449,617
U.S. Ser. No. 17/994,359
U.S. Ser. No. 17/727,919
U.S. Ser. No. 17/501,872
U.S. Ser. No. 63/232,030

BACKGROUND OF THE INVENTION

Field of the Invention

The present invention is in the field of computer data management and in particular is directed to the problem of file type identification.

Discussion of the State of the Art

As computers become an ever-greater part of our lives, and especially in the past few years, data storage has become a limiting factor worldwide. Prior to about 2010, the growth of data storage far exceeded the growth in storage demand. In fact, it was commonly considered at that time that storage was not an issue, and perhaps never would be, again. In 2010, however, with the growth of social media, cloud data centers, high tech and biotech industries, global digital data storage accelerated exponentially, and demand hit the zettabyte (1 trillion gigabytes) level. Current estimates are that data storage demand will reach 50 zettabytes by 2020. By contrast, digital storage device manufacturers produced roughly 1 zettabyte of physical storage capacity globally in 2016. We are producing data at a much faster rate than we are producing the capacity to store it. In short, we are running out of room to store data, and need a breakthrough in data storage technology to keep up with demand.

The primary solutions available at the moment are the addition of additional physical storage capacity and data compression. As noted above, the addition of physical storage will not solve the problem, as storage demand has already outstripped global manufacturing capacity. Data compression is also not a solution. A rough average compression ratio for mixed data types is 2:1, representing a doubling of storage capacity. However, as the mix of global data storage trends toward multi-media data (audio, video, and images), the space savings yielded by compression either decreases substantially, as is the case with lossless compression which allows for retention of all original data in the set, or results in degradation of data, as is the case with lossy compression which selectively discards data in order to increase compression. Even assuming a doubling of storage capacity, data compression cannot solve the global data storage problem. The method disclosed herein, on the other hand, works the same way with any type of data.

Transmission bandwidth is also increasingly becoming a bottleneck. Large data sets require tremendous bandwidth, and we are transmitting more and more data every year between large data centers. On the small end of the scale, we are adding billions of low bandwidth devices to the global network, and data transmission limitations impose constraints on the development of networked computing applications, such as the "Internet of Things."

Furthermore, as quantum computing becomes more and more imminent, the security of data, both stored data and data streaming from one point to another via networks, becomes a critical concern as existing encryption technologies are placed at risk.

A difficulty with encoding files for storage or transmission is that the type of file may need to be identified before encoding. Identification of the file type for certain types of encoding is useful because the file type may influence how the file is encoded. Checking the file signature is one method of determining a file type, but may be unreliable or unavailable if the file has been modified or corrupted, or where more than one file type is associated with a given signature. A method is needed for obtaining a file type which is not restricted to the identification of a file signature and will be described herein.

What is needed is a fundamentally new approach to file type identification that does not rely solely on file signature information.

SUMMARY OF THE INVENTION

The inventor has developed a system and method for stream data type identification using machine learning. The system and method involve a comparison of statistical similarities between the binary distributions of files of a given type. When a file is received with a missing or unreadable file signature, a statistical analysis of the file is performed to extract a "file-print" of the file, the file-print being a unique or practically-unique representation of statistical characteristics associated with the distribution of bits in the binary contents of the file, similar to a fingerprint. The file-print is then passed to a machine learning algorithm that has been trained to recognize file types from their file-prints. The machine learning algorithm returns a predicted file type and, in some cases, a probability of correctness of the prediction. The file may then be encoded using an encoding algorithm chosen based on the predicted file type.

According to a preferred embodiment, a computer system comprising a hardware memory, wherein the computer system is configured to execute software instructions stored on nontransitory machine-readable storage media that: identify a data type of digital data received in varying formats by adapting statistical analysis techniques based on whether received digital data comprises a discrete file with determinable boundaries or a continuous data stream without predetermined endpoints; when the digital data comprises a discrete file: segment the entire file into groups of bytes and generate a statistical file-print comprising a plurality of statistical characteristics of a distribution of the groups of bytes across the entire file; when the digital data comprises a continuous data stream: maintain rolling buffers of configurable size to capture streaming data segments; generate incremental statistical file-prints from buffered segments using sliding window analysis, each incremental file-print comprising statistical characteristics of data within a temporal window; analyze temporal patterns across multiple sequential file-print generations to identify periodic characteristics in the statistical variance between consecutive file-prints; and calculate a confidence score based on an amount of data analyzed and consistency of predictions over time; process the statistical file-print or incremental file-prints through a trained machine learning classifier to identify a data type; and select an encoding or decoding codebook from a plurality of codebooks based on the identified data type, wherein the selection for streaming data can be dynamically adjusted in response to detected changes in data type within the continuous stream, is disclosed.

According to a preferred embodiment, a method for identifying a file type comprising the steps of: identifying a data type of digital data received in varying formats by adapting statistical analysis techniques based on whether received digital data comprises a discrete file with determinable boundaries or a continuous data stream without predetermined endpoints; when the digital data comprises a discrete file: segmenting the entire file into groups of bytes and generate a statistical file-print comprising a plurality of statistical characteristics of a distribution of the groups of bytes across the entire file; when the digital data comprises a continuous data stream: maintaining rolling buffers of configurable size to capture streaming data segments; generating incremental statistical file-prints from buffered segments using sliding window analysis, each incremental file-print comprising statistical characteristics of data within a temporal window; analyzing temporal patterns across multiple sequential file-print generations to identify periodic characteristics in the statistical variance between consecutive file-prints; and calculating a confidence score based on an amount of data analyzed and consistency of predictions over time; processing the statistical file-print or incremental file-prints through a trained machine learning classifier to identify a data type; and selecting an encoding or decoding codebook from a plurality of codebooks based on the identified data type, wherein the selection for streaming data can be dynamically adjusted in response to detected changes in data type within the continuous stream, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION OF THE INVENTION

Figure 1:
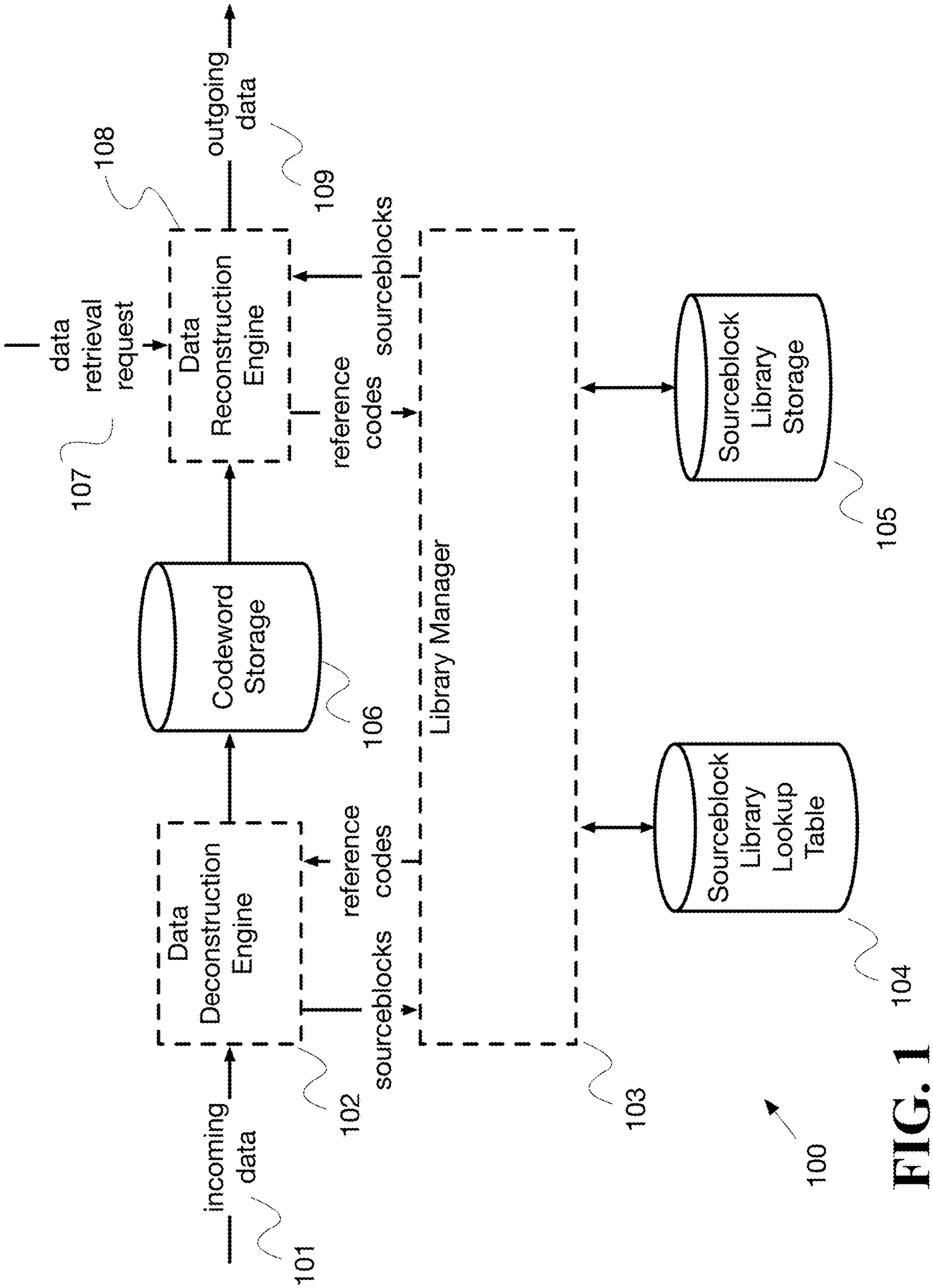
FIG. 1 is a diagram showing an embodiment of the system in which all components of the system are operated locally.

The inventor has conceived, and reduced to practice, various systems and methods for stream data type identification using machine learning. The systems and methods involve a comparison of statistical similarities between the binary distributions of files of a given type. When a file is received with a missing or unreadable file signature, a statistical analysis of the file is performed to extract a "file-print" of the file, the file-print being a unique or practically-unique representation of statistical characteristics associated with the distribution of bits in the binary contents of the file, similar to a fingerprint. The file-print is then passed to a machine learning algorithm that has been trained to recognize file types from their file-prints. The machine learning algorithm returns a predicted file type and, in some cases, a probability of correctness of the prediction. The file may then be encoded using an encoding algorithm chosen based on the predicted file type.

A difficulty with encoding files for storage or transmission is that the type of file may need to be identified before encoding. Identification of the file type for certain types of encoding is useful because the file type may influence how the file is encoded. One primary method of determining a file type is checking of the file signature information (bytes contained in the beginning of a file) for the file. However, this method may be unreliable or unavailable if the file has been modified (i.e., the file signature is no longer contained in the initial bytes or the file signature has been corrupted) or where the file signature information is that of a general text-based file type such as .ascii (there may be more than one file type classified as an .ascii based on the file signature information).

Files with unidentified file types exist in many forms, including but not limited to ASCII files, corrupted files (such as those created with incomplete data transfers or where there has been user tampering), and files that do include an identifier for its file type-known as its "file signature." Despite the lack of a usable file signature, the binary distributions of files of a given type are expected to statistically similar. This expected consistency can be utilized to predict a file type for a file which is of an unidentified file type.

When a file is received with a missing or unreadable file signature, a statistical analysis of the file is performed to extract a "file-print" of the file, the file-print being a unique or practically-unique representation of statistical characteristics associated with the distribution of bits in the binary contents of the file, similar to a fingerprint. The file-print is then passed to a machine learning algorithm that has been trained to recognize file types from their file-prints. To use a machine learning algorithm to predict file types, the machine learning algorithm is first trained by passing file-prints for known types through the algorithm, and allowing the machine learning algorithm to identify patterns within the file-prints that are similar or dissimilar to patterns of file-prints for other known file types. After a sufficient amount of training, machine learning algorithms are able to reliably classify files of unknown type based on their file-prints without requiring file signatures.

A unique property of this method of classifying files based on file-prints is that it can be applied not only to unencoded files, but also to encoded files whose contents cannot be read. When applied to an encoded file, the file-print will be different from the file-print of the unencoded file, but will contain statistical similarities with files of similar types encoded by the same encoding process. Thus, a machine learning algorithm can be trained on file-prints for files of known types and known encoding processes, and will learn to identify the file type and encoding process for file-prints of unknown files, thus allowing for selection of the correct decoding process for the file.

In an embodiment, file-prints are generated by parsing each file into bytes (8 bits), analyzing the statistical distribution of bytes in the parsed file, and generating a 512 bit array, wherein the first 256 bits represent a mean value for the distribution of bytes in the file and the second 256 bits represent a variance from the mean value for the distribution of bytes in the file. However, many different file-prints can be generated, depending on the parsing of the file (bits, bytes, words, etc., or combinations thereof), and the statistical characteristics assessed (e.g., mean, median, variance, skewness, etc.). For example, another method of generating a file-print is to parse files into groups of two bytes (16 bits) and determining the mean and variance of every two bytes. The method chosen may depend on several factors including, but not limited to, file sizes, processing power available, desired processing time per file, desired uniqueness of the file-print, etc. However, file type recognition will generally be enhanced when comparing file-prints generated by the same method.

While the examples herein are discussed in terms of files, the methodology herein applies to data in any format (e.g., streaming data received prior to storage in a file) and in any storage location (e.g., data stored in random access memory, and not on a non-volatile data storage device as a file).

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "bit" refers to the smallest unit of information that can be stored or transmitted. It is in the form of a binary digit (either 0 or 1). In terms of hardware, the bit is represented as an electrical signal that is either off (representing 0) or on (representing 1).

The term "byte" refers to a series of bits exactly eight bits in length.

The term "codebook" refers to a database containing sourceblocks each with a pattern of bits and reference code unique within that library. The terms "library" and "encoding/decoding library" are synonymous with the term codebook.

The term "codeword" refers to the reference code form in which data is stored or transmitted in an aspect of the system. A codeword consists of a reference code to a sourceblock in the library plus an indication of that sourceblock's location in a particular data set.

The terms "compression" and "deflation" as used herein mean the representation of data in a more compact form than the original dataset. Compression and/or deflation may be either "lossless", in which the data can be reconstructed in its original form without any loss of the original data, or "lossy" in which the data can be reconstructed in its original form, but with some loss of the original data.

The terms "compression ratio" and "deflation ratio", and as used herein all mean the size of the original data relative to the size of the compressed data (e.g., if the new data is 70% of the size of the original, then the deflation/compression ratio is 70% or 0.7.)

The term "corrupt" refers to data which has been lost, removed, or altered to such a degree that makes it inoperable or unusable by a computing device.

The term "data" means information in any computer-readable form.

The term "data set" refers to a grouping of data for a particular purpose. One example of a data set might be a word processing file containing text and formatting information.

The term "effective compression" or "effective compression ratio" refers to the additional amount data that can be stored using the method herein described versus conventional data storage methods. Although the method herein described is not data compression, per se, expressing the additional capacity in terms of compression is a useful comparison.

The term "file-print" as used herein means a representation of the statistical characteristics associated with the distribution of information in the parsed contents of a file. In an embodiment, file-prints are generated by parsing each file into bytes (8 bits), analyzing the distribution of bytes in the parsed file, and generating a 512 bit array, wherein the first 256 bits represent a mean value for the distribution of bytes in the file and the second 256 bits represent a variance from the mean value for the distribution of bytes in the file.

The term "file signature" refers to a first plurality of bytes contained in a file which identifies the file type of the file. File signatures are typically located at the beginning of a file.

The term "sourcepacket" as used herein means a packet of data received for encoding or decoding. A sourcepacket may be a portion of a data set.

The term "sourceblock" as used herein means a defined number of bits or bytes used as the block size for encoding or decoding. A sourcepacket may be divisible into a number of sourceblocks. As one non-limiting example, a 1 megabyte sourcepacket of data may be encoded using 512 byte sourceblocks. The number of bits in a sourceblock may be dynamically optimized by the system during operation. In one aspect, a sourceblock may be of the same length as the block size used by a particular file system, typically 512 bytes or 4,096 bytes.

Conceptual Architecture

FIG. 1 is a diagram showing an embodiment 100 of the system in which all components of the system are operated locally. As incoming data 101 is received by data deconstruction engine 102. Data deconstruction engine 102 breaks the incoming data into sourceblocks, which are then sent to library manager 103. Using the information contained in sourceblock library lookup table 104 and sourceblock library storage 105, library manager 103 returns reference codes to data deconstruction engine 102 for processing into codewords, which are stored in codeword storage 106. When a data retrieval request 107 is received, data reconstruction engine 108 obtains the codewords associated with the data from codeword storage 106, and sends them to library manager 103. Library manager 103 returns the appropriate sourceblocks to data reconstruction engine 108, which assembles them into the proper order and sends out the data in its original form 109.

Figure 2:
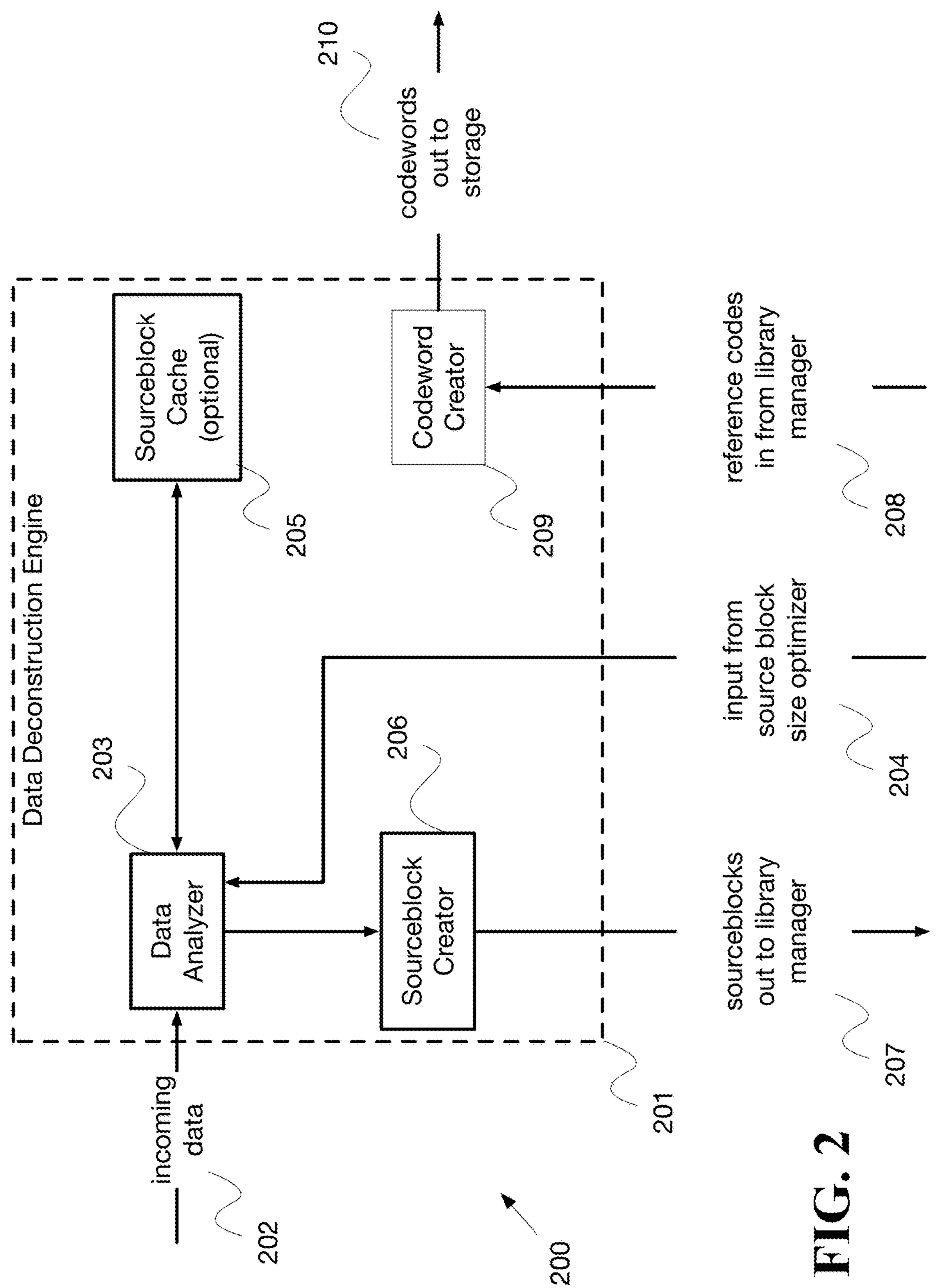
FIG. 2 is a diagram showing an embodiment of one aspect of the system, the data deconstruction engine.

FIG. 2 is a diagram showing an embodiment of one aspect 200 of the system, specifically data deconstruction engine 201. Incoming data 202 is received by data analyzer 203, which optimally analyzes the data based on machine learning algorithms and input 204 from a sourceblock size optimizer, which is disclosed below. Data analyzer may optionally have access to a sourceblock cache 205 of recently-processed sourceblocks, which can increase the speed of the system by avoiding processing in library manager 103. Based on information from data analyzer 203, the data is broken into sourceblocks by sourceblock creator 206, which sends sourceblocks 207 to library manager 203 for additional processing. Data deconstruction engine 201 receives reference codes 208 from library manager 103, corresponding to the sourceblocks in the library that match the sourceblocks sent by sourceblock creator 206, and codeword creator 209 processes the reference codes into codewords comprising a reference code to a sourceblock and a location of that sourceblock within the data set. The original data may be discarded, and the codewords representing the data are sent out to storage 210.

Figure 3:
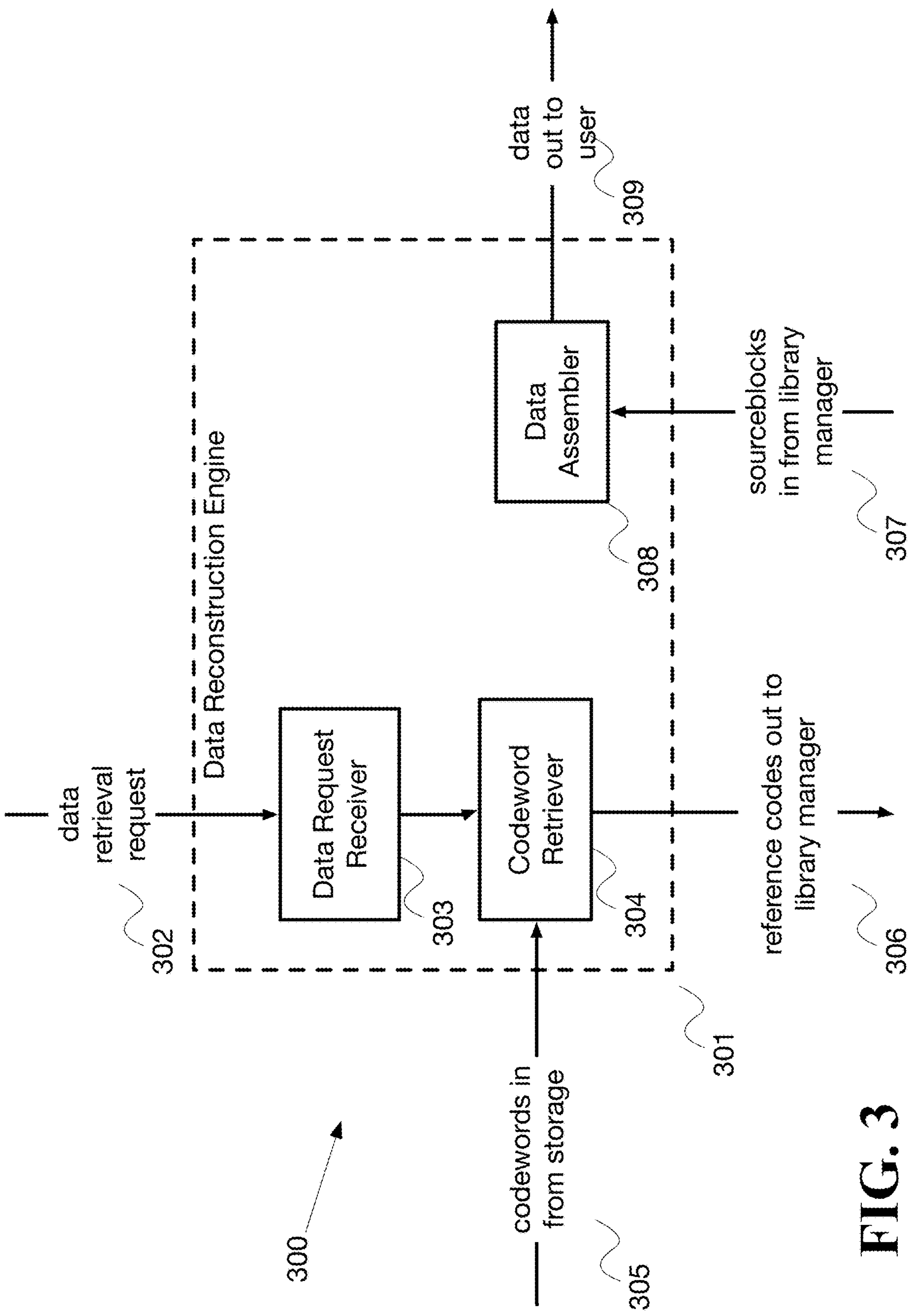
FIG. 3 is a diagram showing an embodiment of one aspect of the system, the data reconstruction engine.

FIG. 3 is a diagram showing an embodiment of another aspect of system 300, specifically data reconstruction engine 301. When a data retrieval request 302 is received by data request receiver 303 (in the form of a plurality of codewords corresponding to a desired final data set), it passes the information to data retriever 304, which obtains the requested data 305 from storage. Data retriever 304 sends, for each codeword received, a reference codes from the codeword 306 to library manager 103 for retrieval of the specific sourceblock associated with the reference code. Data assembler 308 receives the sourceblock 307 from library manager 103 and, after receiving a plurality of sourceblocks corresponding to a plurality of codewords, assembles them into the proper order based on the location information contained in each codeword (recall each codeword comprises a sourceblock reference code and a location identifier that specifies where in the resulting data set the specific sourceblock should be restored to. The requested data is then sent to user 309 in its original form.

Figure 4:
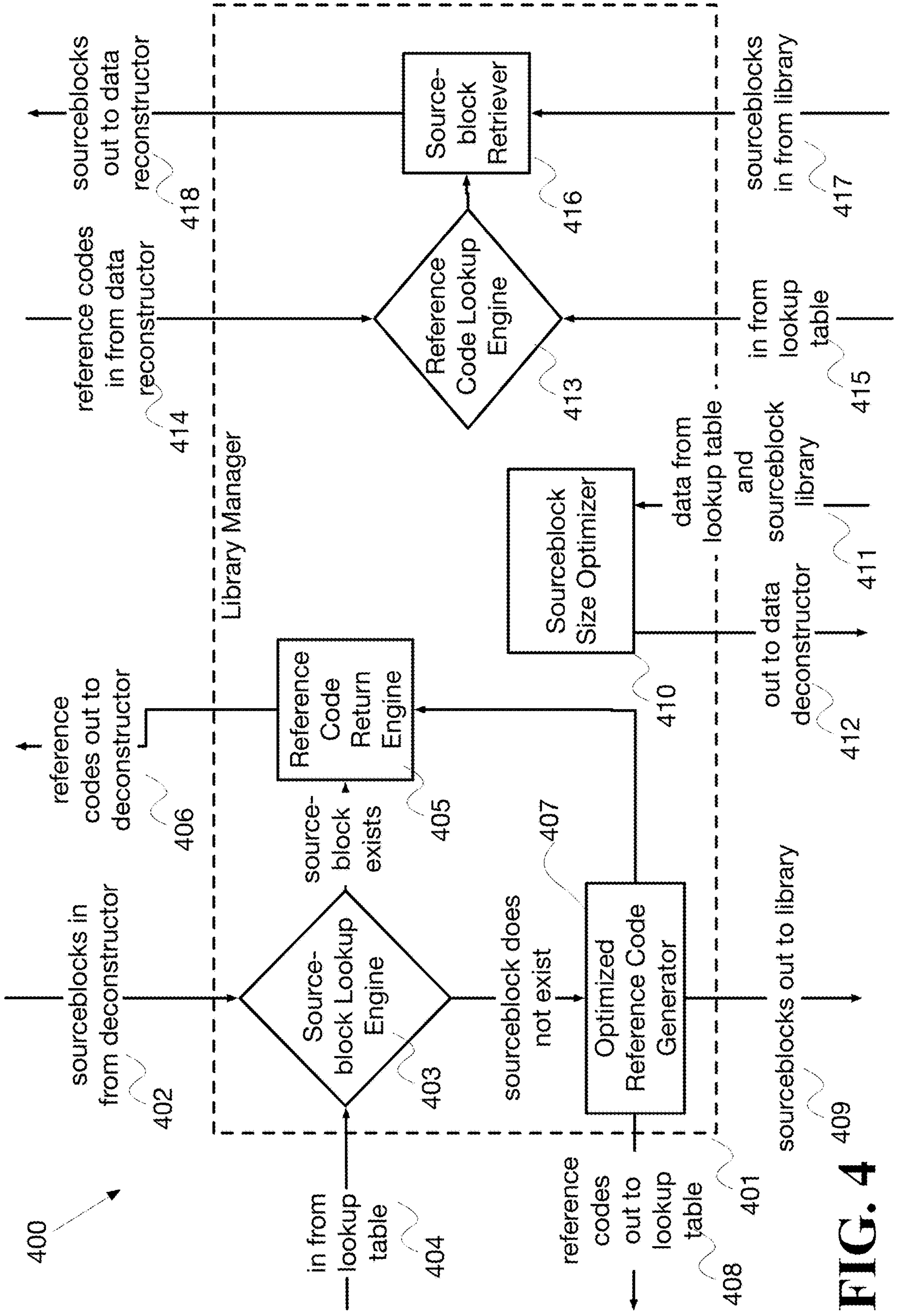
FIG. 4 is a diagram showing an embodiment of one aspect of the system, the library management module.

FIG. 4 is a diagram showing an embodiment of another aspect of the system 400, specifically library manager 401. One function of library manager 401 is to generate reference codes from sourceblocks received from data deconstruction engine 301. As sourceblocks are received 402 from data deconstruction engine 301, sourceblock lookup engine 403 checks sourceblock library lookup table 404 to determine whether those sourceblocks already exist in sourceblock library storage 105. If a particular sourceblock exists in sourceblock library storage 105, reference code return engine 405 sends the appropriate reference code 406 to data deconstruction engine 301. If the sourceblock does not exist in sourceblock library storage 105, optimized reference code generator 407 generates a new, optimized reference code based on machine learning algorithms. Optimized reference code generator 407 then saves the reference code 408 to sourceblock library lookup table 104; saves the associated sourceblock 409 to sourceblock library storage 105; and passes the reference code to reference code return engine 405 for sending 406 to data deconstruction engine 301. Another function of library manager 401 is to optimize the size of sourceblocks in the system. Based on information 411 contained in sourceblock library lookup table 104, sourceblock size optimizer 410 dynamically adjusts the size of sourceblocks in the system based on machine learning algorithms and outputs that information 412 to data analyzer 203. Another function of library manager 401 is to return sourceblocks associated with reference codes received from data reconstruction engine 301. As reference codes are received 414 from data reconstruction engine 301, reference code lookup engine 413 checks sourceblock library lookup table 415 to identify the associated sourceblocks; passes that information to sourceblock retriever 416, which obtains the sourceblocks 417 from sourceblock library storage 105; and passes them 418 to data reconstruction engine 301.

Figure 5:
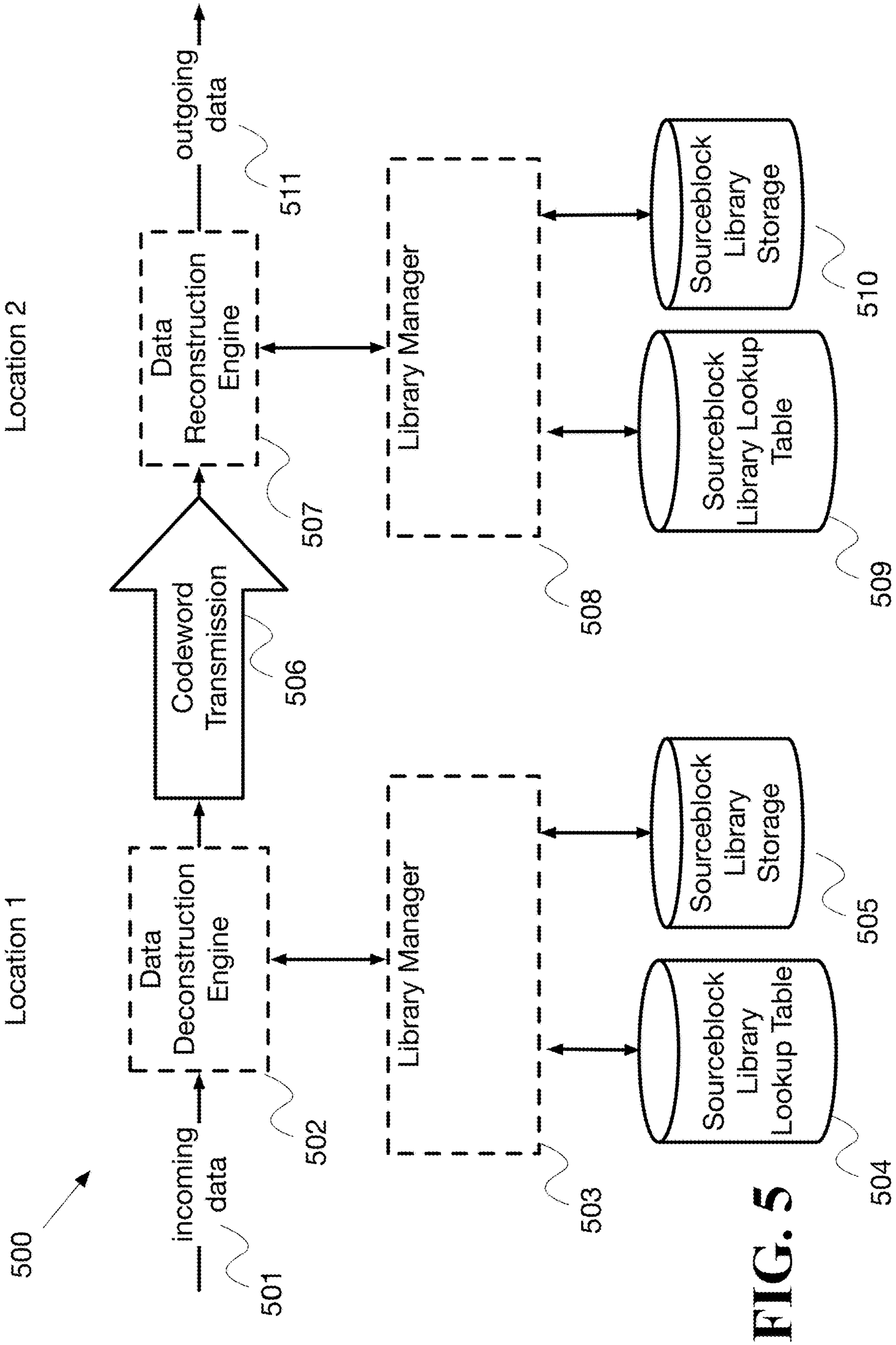
FIG. 5 is a diagram showing another embodiment of the system in which data is transferred between remote locations.

FIG. 5 is a diagram showing another embodiment of system 500, in which data is transferred between remote locations. As incoming data 501 is received by data deconstruction engine 502 at Location 1, data deconstruction engine 301 breaks the incoming data into sourceblocks, which are then sent to library manager 503 at Location 1. Using the information contained in sourceblock library lookup table 504 at Location 1 and sourceblock library storage 505 at Location 1, library manager 503 returns reference codes to data deconstruction engine 301 for processing into codewords, which are transmitted 506 to data reconstruction engine 507 at Location 2. In the case where the reference codes contained in a particular codeword have been newly generated by library manager 503 at Location 1, the codeword is transmitted along with a copy of the associated sourceblock. As data reconstruction engine 507 at Location 2 receives the codewords, it passes them to library manager module 508 at Location 2, which looks up the sourceblock in sourceblock library lookup table 509 at Location 2, and retrieves the associated from sourceblock library storage 510. Where a sourceblock has been transmitted along with a codeword, the sourceblock is stored in sourceblock library storage 510 and sourceblock library lookup table 504 is updated. Library manager 503 returns the appropriate sourceblocks to data reconstruction engine 507, which assembles them into the proper order and sends the data in its original form 511.

Figure 6:
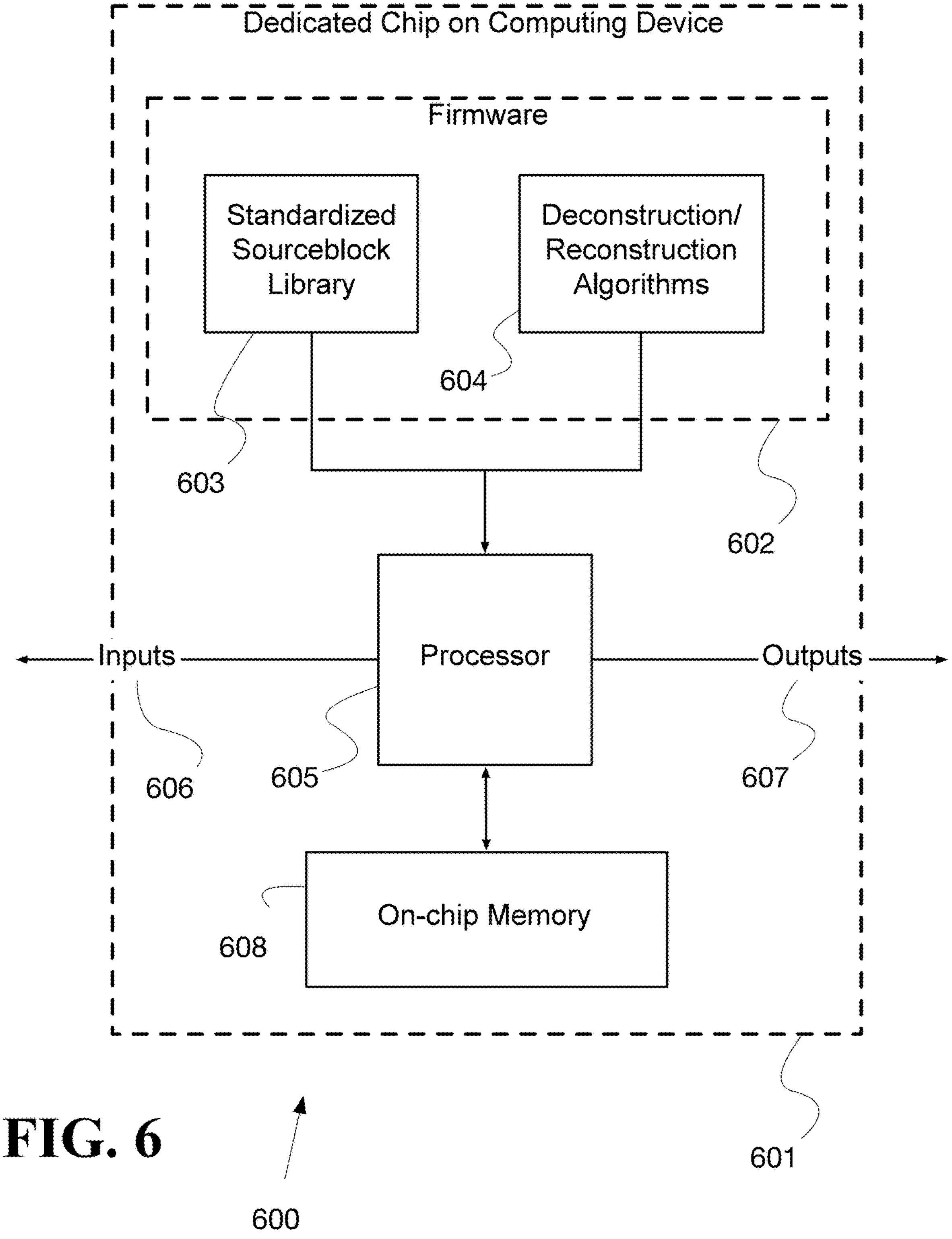
FIG. 6 is a diagram showing an embodiment in which a standardized version of the sourceblock library and associated algorithms would be encoded as firmware on a dedicated processing chip included as part of the hardware of a plurality of devices.

FIG. 6 is a diagram showing an embodiment 600 in which a standardized version of a sourceblock library 603 and associated algorithms 604 would be encoded as firmware 602 on a dedicated processing chip 601 included as part of the hardware of a plurality of devices 600. Contained on dedicated chip 601 would be a firmware area 602, on which would be stored a copy of a standardized sourceblock library 603 and deconstruction/reconstruction algorithms 604 for processing the data. Processor 605 would have both inputs

606 and outputs 607 to other hardware on the device 600. Processor 605 would store incoming data for processing on on-chip memory 608, process the data using standardized sourceblock library 603 and deconstruction/reconstruction algorithms 604, and send the processed data to other hardware on device 600. Using this embodiment, the encoding and decoding of data would be handled by dedicated chip 601, keeping the burden of data processing off device's 600 primary processors. Any device equipped with this embodiment would be able to store and transmit data in a highly optimized, bandwidth-efficient format with any other device equipped with this embodiment.

Figure 12:
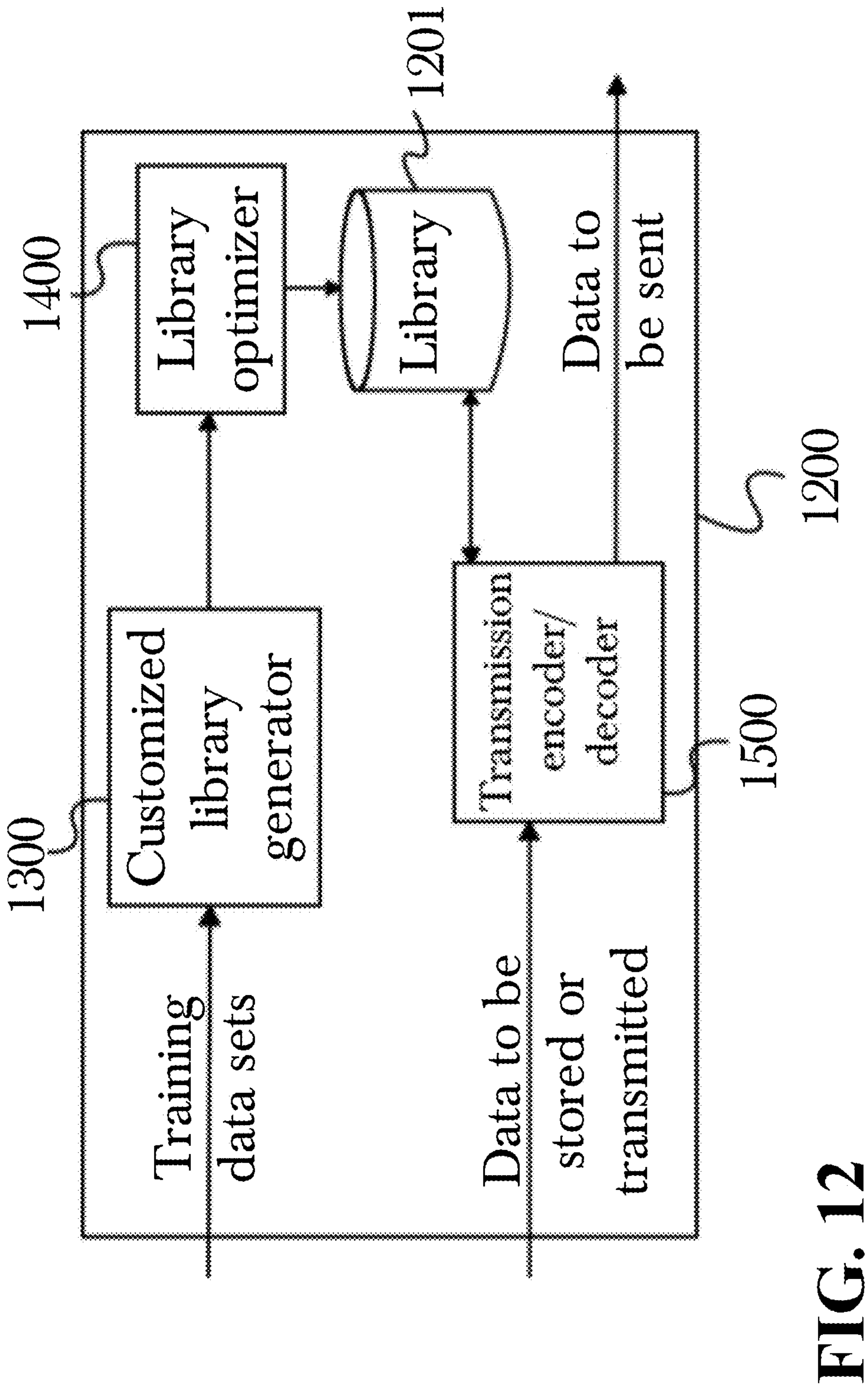
FIG. 12 is a diagram showing an exemplary system architecture, according to a preferred embodiment of the invention.

FIG. 12 is a diagram showing an exemplary system architecture 1200, according to a preferred embodiment of the invention. Incoming training data sets may be received at a customized library generator 1300 that processes training data to produce a customized word library 1201 comprising key-value pairs of data words (each comprising a string of bits) and their corresponding calculated binary Huffman codewords. The resultant word library 1201 may then be processed by a library optimizer 1400 to reduce size and improve efficiency, for example by pruning low-occurrence data entries or calculating approximate codewords that may be used to match more than one data word. A transmission encoder/decoder 1500 may be used to receive incoming data intended for storage or transmission, process the data using a word library 1201 to retrieve codewords for the words in the incoming data, and then append the codewords (rather than the original data) to an outbound data stream. Each of these components is described in greater detail below, illustrating the particulars of their respective processing and other functions, referring to FIGS. 2-4.

System 1200 provides near-instantaneous source coding that is dictionary-based and learned in advance from sample training data, so that encoding and decoding may happen concurrently with data transmission. This results in computational latency that is near zero but the data size reduction is comparable to classical compression. For example, if N bits are to be transmitted from sender to receiver, the compression ratio of classical compression is C, the ratio between the deflation factor of system 1200 and that of multi-pass source coding is p, the classical compression encoding rate is $R_C$ bit/s and the decoding rate is $R_D$ bit/s, and the transmission speed is S bit/s, the compress-send-decompress time will be $$T_{old} = \frac{N}{R_C} + \frac{N}{CS} + \frac{N}{CR_D}$$

while the transmit-while-coding time for system 1200 will be (assuming that encoding and decoding happen at least as quickly as network latency):

$$T_{new} = \frac{N_p}{CS} \text{ so}$$

that the total data transit time improvement factor is $$\frac{T_{old}}{T_{new}} = \frac{\frac{CS}{R_C} + 1 + \frac{S}{R_D}}{p}$$

which presents a savings whenever $$\frac{CS}{R_C} + \frac{S}{R_D} > p - 1.$$

This is a reasonable scenario given that typical values in real-world practice are C=0.32, $R_C=1.1\cdot10^{12}$, $R_D=4.2\cdot10^{12}$, $S=10^{11}$, giving $$\frac{CS}{R_C} + \frac{S}{R_D} = 0.053 \ldots ,$$

such that system 1200 will outperform the total transit time of the best compression technology available as long as its deflation factor is no more than 5% worse than compression. Such customized dictionary-based encoding will also sometimes exceed the deflation ratio of classical compression, particularly when network speeds increase beyond 100 Gb/s.

The delay between data creation and its readiness for use at a receiving end will be equal to only the source word length t (typically 5-15 bytes), divided by the deflation factor C/p and the network speed S, i.e.

$$\text{delay}_{invention} = \frac{tp}{CS}$$

since encoding and decoding occur concurrently with data transmission. On the other hand, the latency associated with classical compression is $$\text{delay}_{priorart} = \frac{N}{R_C} + \frac{N}{CS} + \frac{N}{CR_D}$$

where N is the packet/file size. Even with the generous values chosen above as well as N=512K, t=10, and p=1.05, this results in $\text{delay}_{invention} \approx 3.3\cdot10^{-10}$ while $\text{delay}_{priorart} \approx 1.3\cdot10^{-7}$, a more than 400-fold reduction in latency.

A key factor in the efficiency of Huffman coding used by system 1200 is that key-value pairs be chosen carefully to minimize expected coding length, so that the average deflation/compression ratio is minimized. It is possible to achieve the best possible expected code length among all instantaneous codes using Huffman codes if one has access to the exact probability distribution of source words of a given desired length from the random variable generating them. In practice this is impossible, as data is received in a wide variety of formats and the random processes underlying the source data are a mixture of human input, unpredictable (though in principle, deterministic) physical events, and noise. System 1200 addresses this by restriction of data types and density estimation; training data is provided that is representative of the type of data anticipated in "real-world" use of system 1200, which is then used to model the distribution of binary strings in the data in order to build a Huffman code word library 1200.

Figure 13:
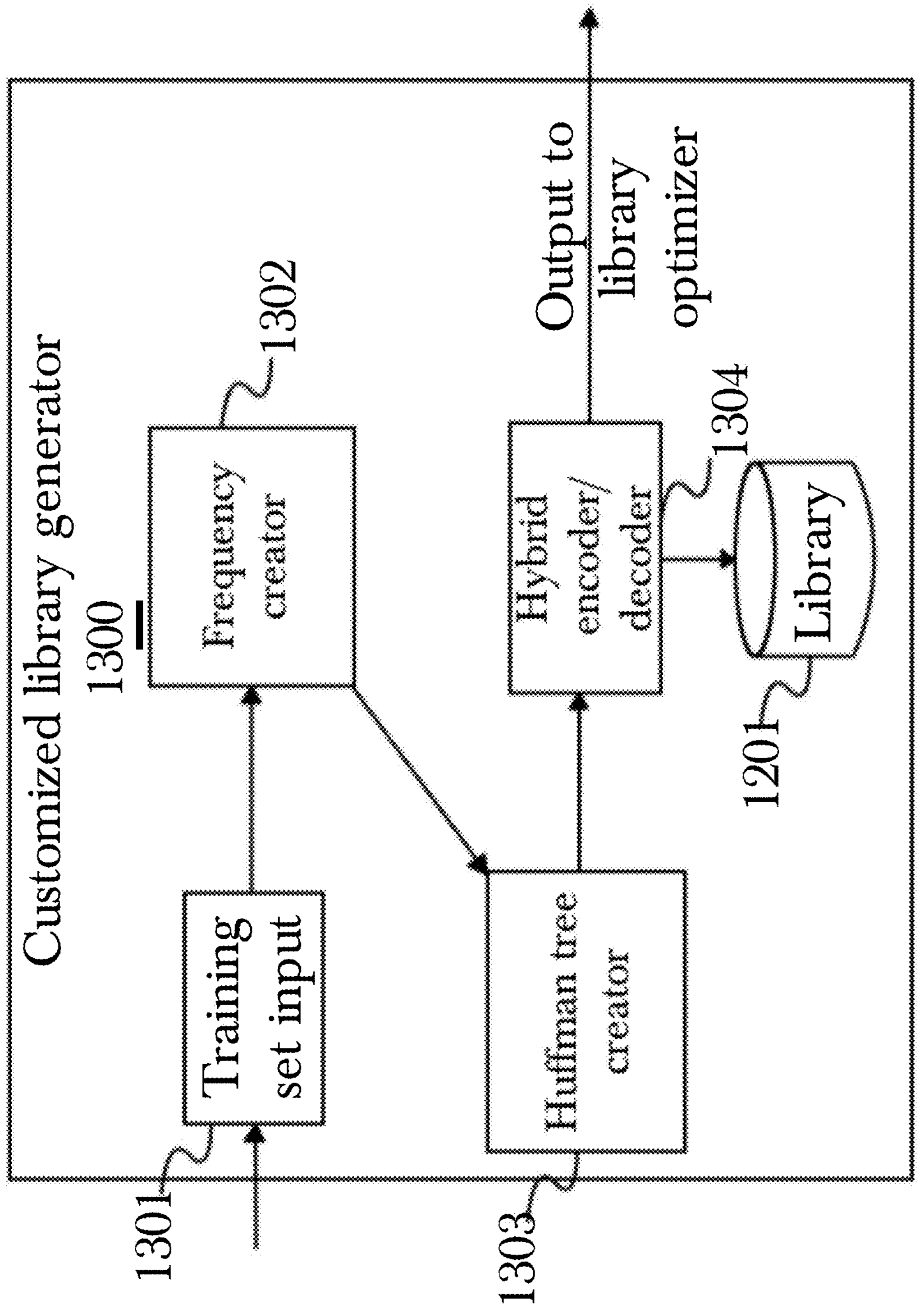
FIG. 13 is a diagram showing a more detailed architecture for a customized library generator.

FIG. 13 is a diagram showing a more detailed architecture for a customized library generator 1300. When an incoming training data set 1301 is received, it may be analyzed using a frequency creator 1302 to analyze for word frequency (that is, the frequency with which a given word occurs in the training data set). Word frequency may be analyzed by scanning all substrings of bits and directly calculating the frequency of each substring by iterating over the data set to produce an occurrence frequency, which may then be used to estimate the rate of word occurrence in non-training data. A first Huffman binary tree is created based on the frequency of occurrences of each word in the first dataset, and a Huffman codeword is assigned to each observed word in the first dataset according to the first Huffman binary tree. Machine learning may be utilized to improve results by processing a number of training data sets and using the results of each training set to refine the frequency estimations for non-training data, so that the estimation yield better results when used with real-world data (rather than, for example, being only based on a single training data set that may not be very similar to a received non-training data set). A second Huffman tree creator 1303 may be utilized to identify words that do not match any existing entries in a word library 1201 and pass them to a hybrid encoder/decoder 1304, that then calculates a binary Huffman codeword for the mismatched word and adds the codeword and original data to the word library 1201 as a new key-value pair. In this manner, customized library generator 1300 may be used both to establish an initial word library 1201 from a first training set, as well as expand the word library 1201 using additional training data to improve operation.

Figure 14:
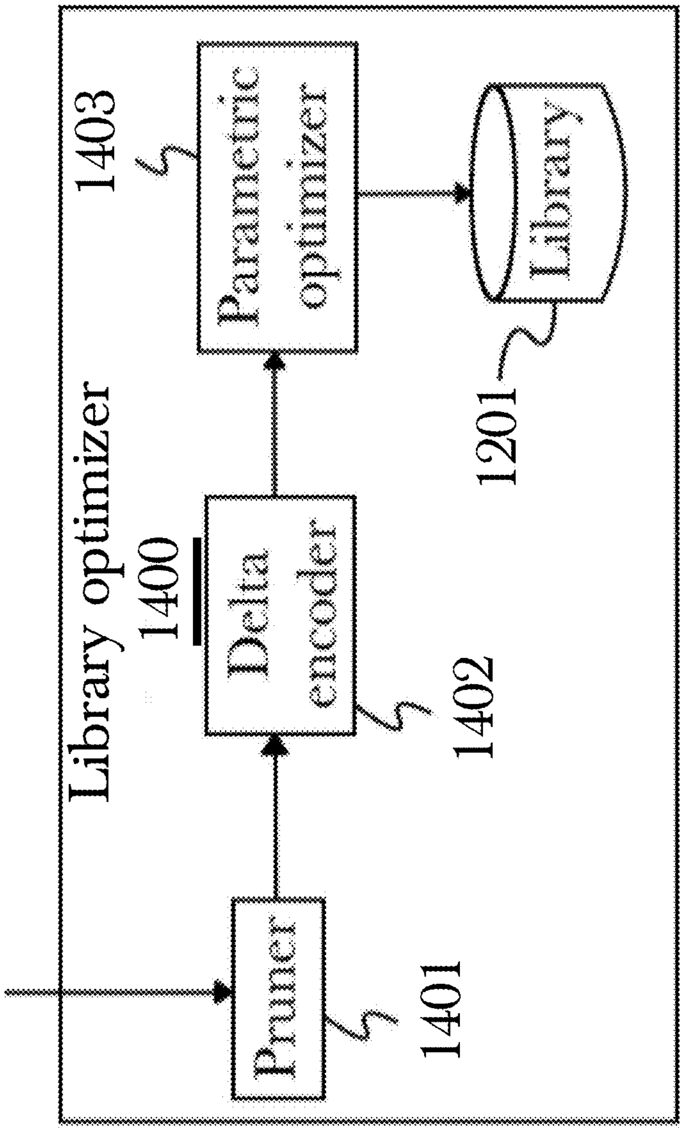
FIG. 14 is a diagram showing a more detailed architecture for a library optimizer.

FIG. 14 is a diagram showing a more detailed architecture for a library optimizer 1400. A pruner 1401 may be used to load a word library 1201 and reduce its size for efficient operation, for example by sorting the word library 1201 based on the known occurrence probability of each key-value pair and removing low-probability key-value pairs based on a loaded threshold parameter. This prunes low-value data from the word library to trim the size, eliminating large quantities of very-low-frequency key-value pairs such as single-occurrence words that are unlikely to be encountered again in a data set. Pruning eliminates the least-probable entries from word library 1201 up to a given threshold, which will have a negligible impact on the deflation factor since the removed entries are only the least-common ones, while the impact on word library size will be larger because samples drawn from asymptotically normal distributions (such as the log-probabilities of words generated by a probabilistic finite state machine, a model well-suited to a wide variety of real-world data) which occur in tails of the distribution are disproportionately large in counting measure. A delta encoder 1402 may be utilized to apply delta encoding to a plurality of words to store an approximate codeword as a value in the word library, for which each of the plurality of source words is a valid corresponding key. This may be used to reduce library size by replacing numerous key-value pairs with a single entry for the approximate codeword and then represent actual codewords using the approximate codeword plus a delta value representing the difference between the approximate codeword and the actual codeword. Approximate coding is optimized for low-weight sources such as Golomb coding, run-length coding, and similar techniques. The approximate source words may be chosen by locality-sensitive hashing, so as to approximate Hamming distance without incurring the intractability of nearest-neighbor-search in Hamming space. A parametric optimizer 1403 may load configuration parameters for operation to optimize the use of the word library 1201 during operation. Best-practice parameter/hyperparameter optimization strategies such as stochastic gradient descent, quasi-random grid search, and evolutionary search may be used to make optimal choices for all interdependent settings playing a role in the functionality of system 1200. In cases where lossless compression is not required, the delta value may be discarded at the expense of introducing some limited errors into any decoded (reconstructed) data.

Figure 15:
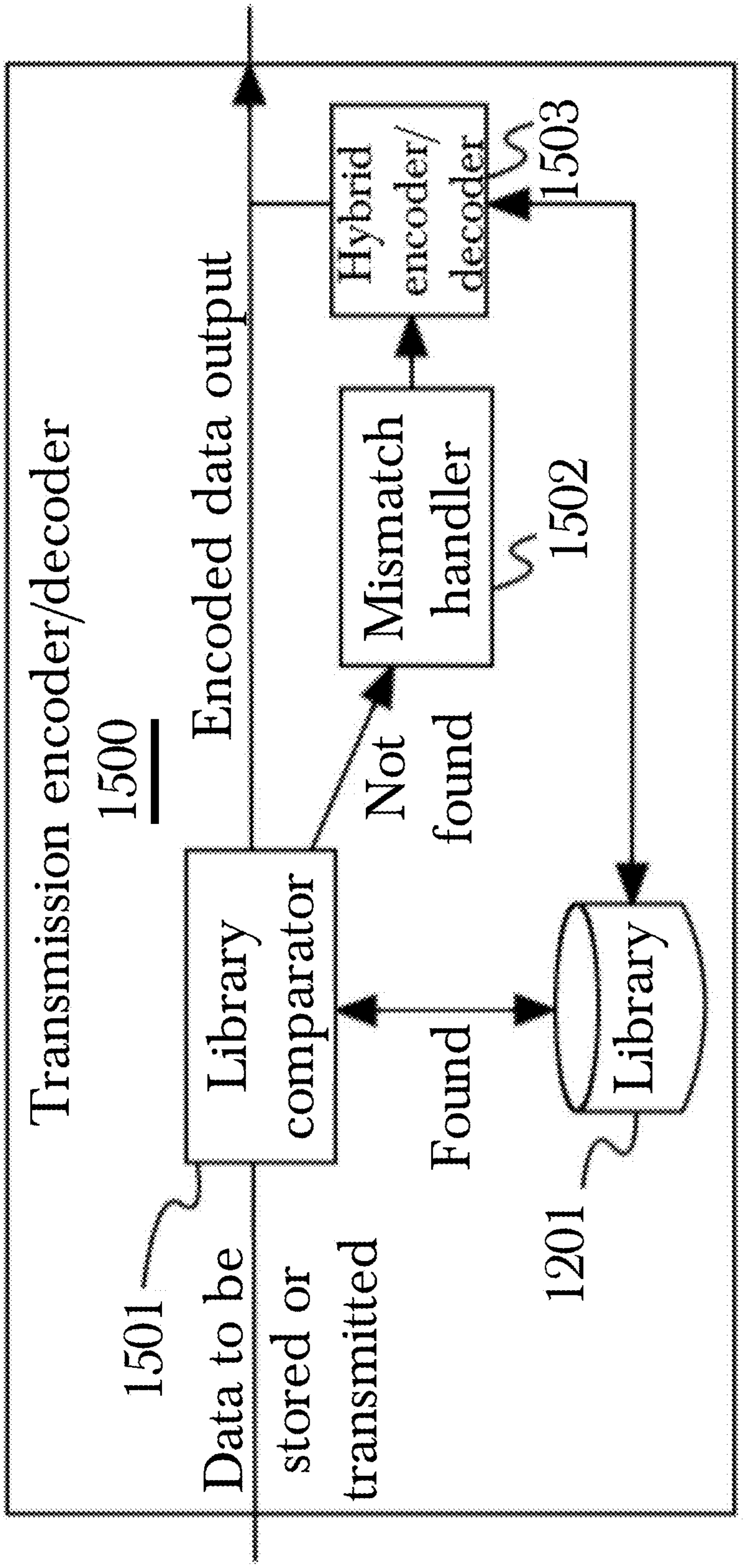
FIG. 15 is a diagram showing a more detailed architecture for a transmission and storage engine.

FIG. 15 is a diagram showing a more detailed architecture for a transmission encoder/decoder 1500. According to various arrangements, transmission encoder/decoder 1500 may be used to deconstruct data for storage or transmission, or to reconstruct data that has been received, using a word library 1201. A library comparator 1501 may be used to receive data comprising words or codewords, and compare against a word library 1201 by dividing the incoming stream into substrings of length/and using a fast hash to check word library 1201 for each substring. If a substring is found in word library 1201, the corresponding key/value (that is, the corresponding source word or codeword, according to whether the substring used in comparison was itself a word or codeword) is returned and appended to an output stream. If a given substring is not found in word library 1201, a mismatch handler 1502 and hybrid encoder/decoder 1503 may be used to handle the mismatch similarly to operation during the construction or expansion of word library 1201. A mismatch handler 1502 may be utilized to identify words that do not match any existing entries in a word library 1201 and pass them to a hybrid encoder/decoder 1503, that then calculates a binary Huffman codeword for the mismatched word and adds the codeword and original data to the word library 1201 as a new key-value pair. The newly-produced codeword may then be appended to the output stream. In arrangements where a mismatch indicator is included in a received data stream, this may be used to preemptively identify a substring that is not in word library 1201 (for example, if it was identified as a mismatch on the transmission end), and handled accordingly without the need for a library lookup.

Figure 19:
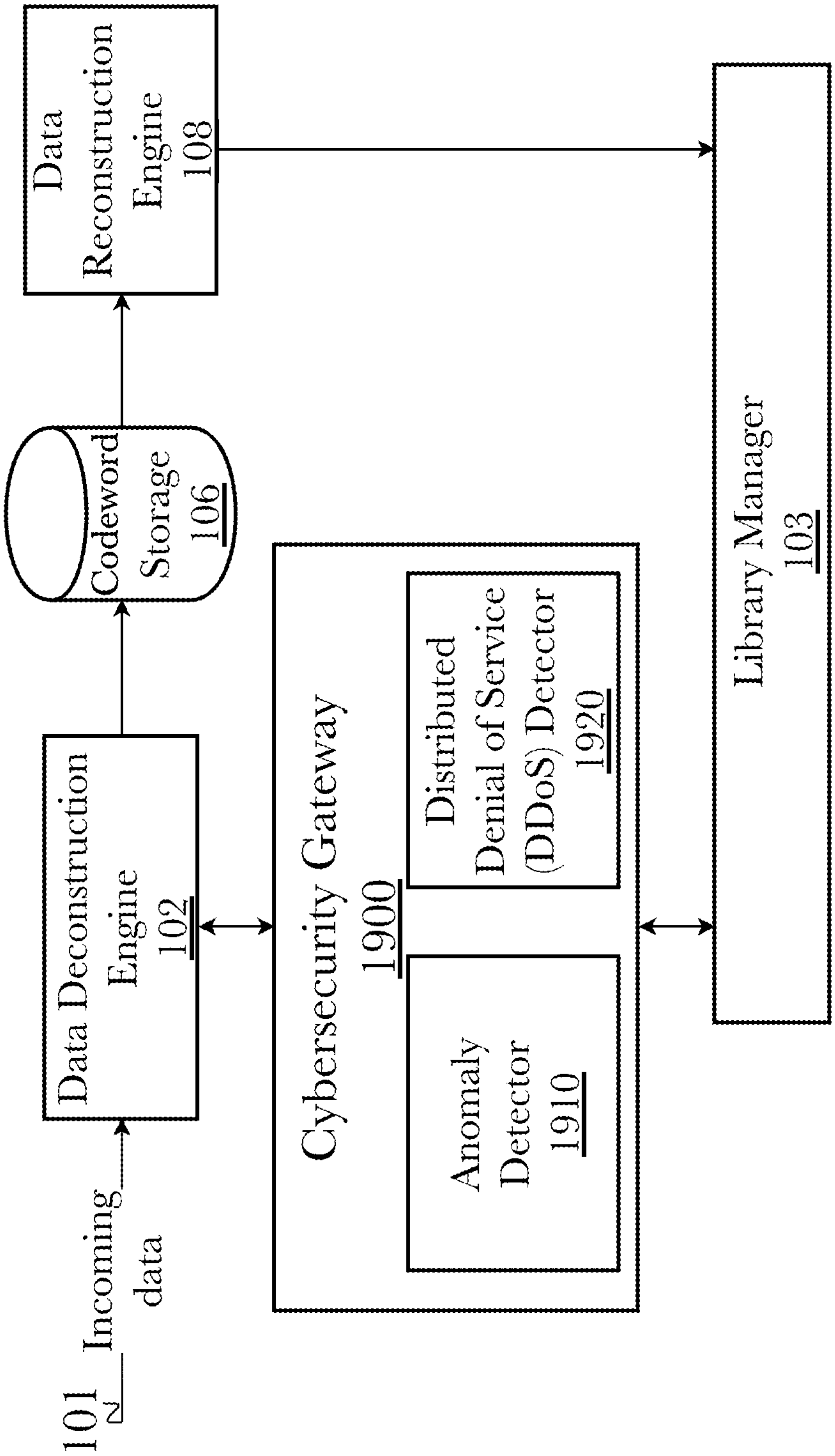
FIG. 19 is an exemplary system architecture of a data encoding system used for cyber security purposes.

FIG. 19 is an exemplary system architecture of a data encoding system used for cyber security purposes. Much like in FIG. 1, incoming data 101 to be deconstructed is sent to a data deconstruction engine 102, which may attempt to deconstruct the data and turn it into a collection of codewords using a library manager 103. Codeword storage 106 serves to store unique codewords from this process, and may be queried by a data reconstruction engine 108 which may reconstruct the original data from the codewords, using a library manager 103. However, a cybersecurity gateway 1900 is present, communicating in-between a library manager 103 and a deconstruction engine 102, and containing an anomaly detector 1910 and distributed denial of service (DDoS) detector 1920. The anomaly detector examines incoming data to determine whether there is a disproportionate number of incoming reference codes that do not match reference codes in the existing library. A disproportionate number of non-matching reference codes may indicate that data is being received from an unknown source, of an unknown type, or contains unexpected (possibly malicious) data. If the disproportionate number of non-matching reference codes exceeds an established threshold or persists for a certain length of time, the anomaly detector 1910 raises a warning to a system administrator. Likewise, the DDoS detector 1920 examines incoming data to determine whether there is a disproportionate amount of repetitive data. A disproportionate amount of repetitive data may indicate that a DDoS attack is in progress. If the disproportionate amount of repetitive data exceeds an established threshold or persists for a certain length of time, the DDoS detector 1910 raises a warning to a system administrator. In this way, a data encoding system may detect and warn users of, or help mitigate, common cyber-attacks that result from a flow of unexpected and potentially harmful data, or attacks that result from a flow of too much irrelevant data meant to slow down a network or system, as in the case of a DDoS attack.

Figure 22:
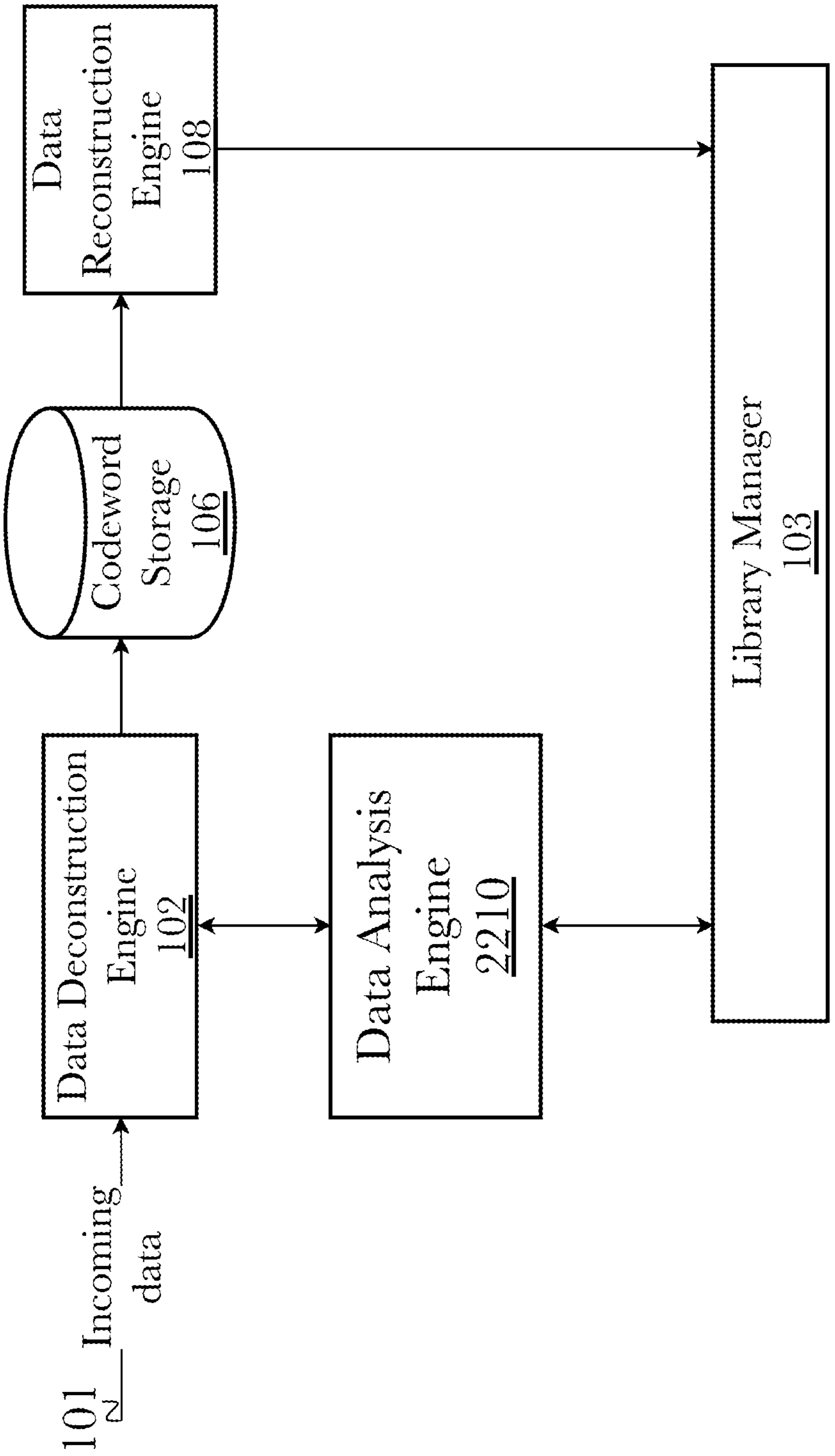
FIG. 22 is an exemplary system architecture of a data encoding system used for data mining and analysis purposes.

FIG. 22 is an exemplary system architecture of a data encoding system used for data mining and analysis purposes. Much like in FIG. 1, incoming data 101 to be deconstructed is sent to a data deconstruction engine 102, which may attempt to deconstruct the data and turn it into a collection of codewords using a library manager 103. Codeword storage 106 serves to store unique codewords from this process, and may be queried by a data reconstruction engine 108 which may reconstruct the original data from the codewords, using a library manager 103. A data analysis engine 2210, typically operating while the system is otherwise idle, sends requests for data to the data reconstruction engine 108, which retrieves the codewords representing the requested data from codeword storage 106, reconstructs them into the data represented by the codewords, and send the reconstructed data to the data analysis engine 2210 for analysis and extraction of useful data (i.e., data mining). Because the speed of reconstruction is significantly faster than decompression using traditional compression technologies (i.e., significantly less decompression latency), this approach makes data mining feasible. Very often, data stored using traditional compression is not mined precisely because decompression lag makes it unfeasible, especially during shorter periods of system idleness. Increasing the speed of data reconstruction broadens the circumstances under which data mining of stored data is feasible.

Figure 24:
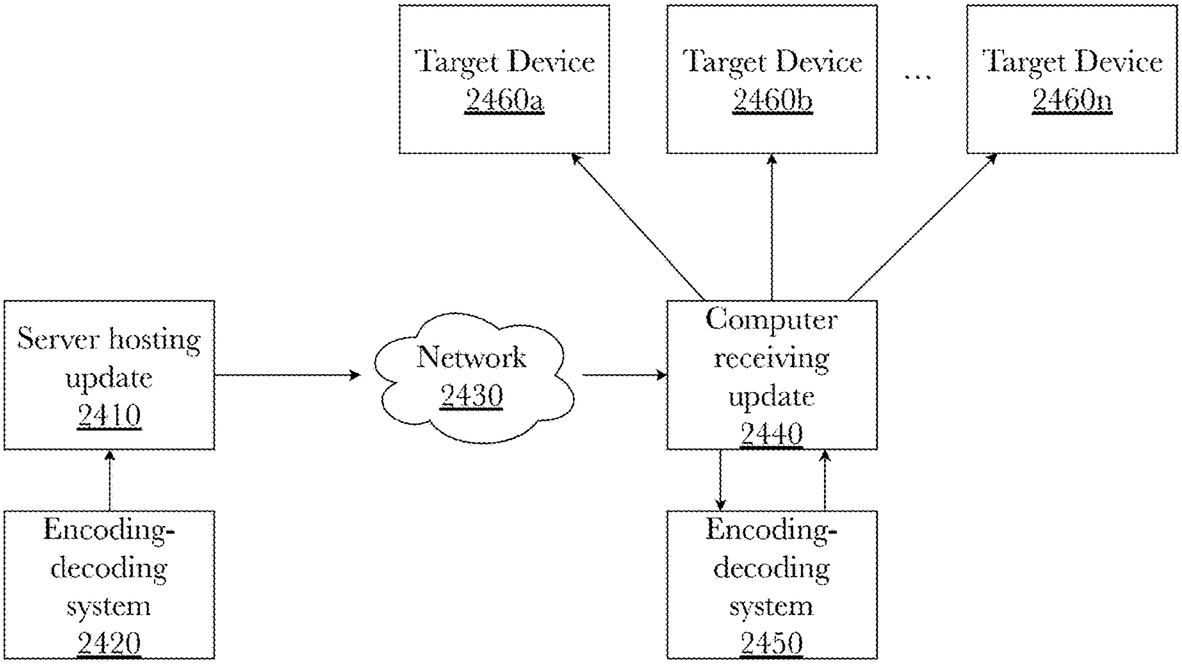
FIG. 24 is an exemplary system architecture of a data encoding system used for remote software and firmware updates.

FIG. 24 is an exemplary system architecture of a data encoding system used for remote software and firmware updates. Software and firmware updates typically require smaller, but more frequent, file transfers. A server which hosts a software or firmware update 2410 may host an encoding-decoding system 2420, allowing for data to be encoded into, and decoded from, sourceblocks or codewords, as disclosed in previous figures. Such a server may possess a software update, operating system update, firmware update, device driver update, or any other form of software update, which in some cases may be minor changes to a file, but nevertheless necessitate sending the new, completed file to the recipient. Such a server is connected over a network 2430, which is further connected to a recipient computer 2440, which may be connected to a server 2410 for receiving such an update to its system. In this instance, the recipient device 2440 also hosts the encoding and decoding system 2450, along with a codebook or library of reference codes that the hosting server 2410 also shares. The updates are retrieved from storage at the hosting server 2410 in the form of codewords, transferred over the network 2430 in the form of codewords, and reconstructed on the receiving computer 2440. In this way, a far smaller file size, and smaller total update size, may be sent over a network. The receiving computer 2440 may then install the updates on any number of target computing devices 2460*a-n*, using a local network or other high-bandwidth connection.

Figure 26:
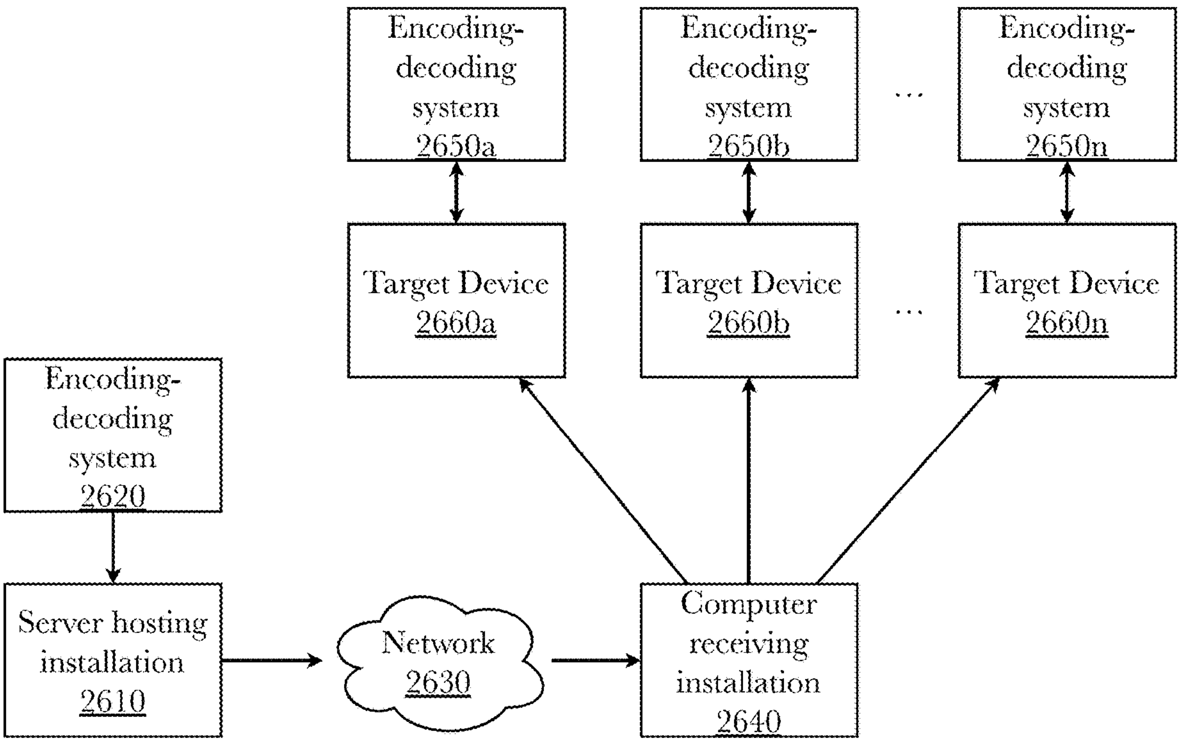
FIG. 26 is an exemplary system architecture of a data encoding system used for large-scale software installation such as operating systems.

FIG. 26 is an exemplary system architecture of a data encoding system used for large-scale software installation such as operating systems. Large-scale software installations typically require very large, but infrequent, file transfers. A server which hosts an installable software 2610 may host an encoding-decoding system 2620, allowing for data to be encoded into, and decoded from, sourceblocks or codewords, as disclosed in previous figures. The files for the large scale software installation are hosted on the server 2610, which is connected over a network 2630 to a recipient computer 2640. In this instance, the encoding and decoding system 2650*a-n* is stored on or connected to one or more target devices 2660*a-n*, along with a codebook or library of reference codes that the hosting server 2610 shares. The software is retrieved from storage at the hosting server 2610 in the form of codewords, and transferred over the network 2630 in the form of codewords to the receiving computer 2640. However, instead of being reconstructed at the receiving computer 2640, the codewords are transmitted to one or more target computing devices, and reconstructed and installed directly on the target devices 2660*a-n*. In this way, a far smaller file size, and smaller total update size, may be sent over a network or transferred between computing devices, even where the network 2630 between the receiving computer 2640 and target devices 2660*a-n* is low bandwidth, or where there are many target devices 2660*a-n*.

Description of Method Aspects

Machine-learning based algorithms may improve the accuracy of their result by enhancing the dataset of which it reads on. By providing the machine learning with more data—such as is used in the case with the file type identification system—the accuracy of its returned value may continuously be improved overtime by the addition of more data being stored in its "training" dataset. The functionality of such a file type identification algorithm is intended to provide a predictive result for a file type based on the comparison of pre-existing data—which is data contained in a dataset for the algorithm—and is compared to incoming data which needs its file type identified.

To expand on this idea for the file identification system, if a file is corrupt (which may occur from incomplete data transfers or even a user tampering with said file) it may be impossible to identify its file type based on the file signature—which is a traditional method known by those skilled in the art for determining a file type. With such a case, to rectify the situation of an unidentifiable file type the only possibility is to utilize what information is there to provide a predictive result for what the file type would be prior to its corruption. Luckily, the binary information of files is often consistent amongst files of the same type, thus there is a possible method—of which this invention aims to provide and will be described herein—which allows for a means of determining an unknown file type.

Since the library consists of re-usable building sourceblocks, and the actual data is represented by reference codes to the library, the total storage space of a single set of data would be much smaller than conventional methods, wherein the data is stored in its entirety. The more data sets that are stored, the larger the library becomes, and the more data can be stored in reference code form.

As an analogy, imagine each data set as a collection of printed books that are only occasionally accessed. The amount of physical shelf space required to store many collections would be quite large, and is analogous to conventional methods of storing every single bit of data in every data set. Consider, however, storing all common elements within and across books in a single library, and storing the books as references codes to those common elements in that library. As a single book is added to the library, it will contain many repetitions of words and phrases. Instead of storing the whole words and phrases, they are added to a library, and given a reference code, and stored as reference codes. At this scale, some space savings may be achieved, but the reference codes will be on the order of the same size as the words themselves. As more books are added to the library, larger phrases, quotations, and other words patterns will become common among the books. The larger the word patterns, the smaller the reference codes will be in relation to them as not all possible word patterns will be used. As entire collections of books are added to the library, sentences, paragraphs, pages, or even whole books will become repetitive. There may be many duplicates of books within a collection and across multiple collections, many references and quotations from one book to another, and much common phraseology within books on particular subjects. If each unique page of a book is stored only once in a common library and given a reference code, then a book of 1,000 pages or more could be stored on a few printed pages as a string of codes referencing the proper full-sized pages in the common library. The physical space taken up by the books would be dramatically reduced. The more collections that are added, the greater the likelihood that phrases, paragraphs, pages, or entire books will already be in the library, and the more information in each collection of books can be stored in reference form. Accessing entire collections of books is then limited not by physical shelf space, but by the ability to reprint and recycle the books as needed for use.

The projected increase in storage capacity using the method herein described is primarily dependent on two factors: 1) the ratio of the number of bits in a block to the number of bits in the reference code, and 2) the amount of repetition in data being stored by the system.

With respect to the first factor, the number of bits used in the reference codes to the sourceblocks must be smaller than the number of bits in the sourceblocks themselves in order for any additional data storage capacity to be obtained. As a simple example, 16-bit sourceblocks would require $2^{16}$, or 65536, unique reference codes to represent all possible patterns of bits. If all possible 65536 blocks patterns are utilized, then the reference code itself would also need to contain sixteen bits in order to refer to all possible 65,536 blocks patterns. In such case, there would be no storage savings. However, if only 16 of those block patterns are utilized, the reference code can be reduced to 4 bits in size, representing an effective compression of 4 times (16 bits/4 bits=4) versus conventional storage. Using a typical block size of 512 bytes, or 4,096 bits, the number of possible block patterns is $2^{4,096}$, which for all practical purposes is unlimited. A typical hard drive contains one terabyte (TB) of physical storage capacity, which represents 1,953,125,000, or roughly $2^{31}$, 512 byte blocks. Assuming that 1 TB of unique 512-byte sourceblocks were contained in the library, and that the reference code would thus need to be 31 bits long, the effective compression ratio for stored data would be on the order of 132 times (4,096/31≈132) that of conventional storage.

With respect to the second factor, in most cases it could be assumed that there would be sufficient repetition within a data set such that, when the data set is broken down into sourceblocks, its size within the library would be smaller than the original data. However, it is conceivable that the initial copy of a data set could require somewhat more storage space than the data stored in a conventional manner, if all or nearly all sourceblocks in that set were unique. For example, assuming that the reference codes are $1/10^{th}$ the size of a full-sized copy, the first copy stored as sourceblocks in the library would need to be 1.1 megabytes (MB), (1 MB for the complete set of full-sized sourceblocks in the library and 0.1 MB for the reference codes). However, since the sourceblocks stored in the library are universal, the more duplicate copies of something you save, the greater efficiency versus conventional storage methods. Conventionally, storing 10 copies of the same data requires 10 times the storage space of a single copy. For example, ten copies of a 1 MB file would take up 10 MB of storage space. However, using the method described herein, only a single full-sized copy is stored, and subsequent copies are stored as reference codes. Each additional copy takes up only a fraction of the space of the full-sized copy. For example, again assuming that the reference codes are $1/10^{th}$ the size of the full-size copy, ten copies of a 1 MB file would take up only 2 MB of space (1 MB for the full-sized copy, and 0.1 MB each for ten sets of reference codes). The larger the library, the more likely that part or all of incoming data will duplicate sourceblocks already existing in the library.

The size of the library could be reduced in a manner similar to storage of data. Where sourceblocks differ from each other only by a certain number of bits, instead of storing a new sourceblock that is very similar to one already existing in the library, the new sourceblock could be represented as a reference code to the existing sourceblock, plus information about which bits in the new block differ from the existing block. For example, in the case where 512 byte sourceblocks are being used, if the system receives a new sourceblock that differs by only one bit from a sourceblock already existing in the library, instead of storing a new 512 byte sourceblock, the new sourceblock could be stored as a reference code to the existing sourceblock, plus a reference to the bit that differs. Storing the new sourceblock as a reference code plus changes would require only a few bytes of physical storage space versus the 512 bytes that a full sourceblock would require. The algorithm could be optimized to store new sourceblocks in this reference code plus changes form unless the changes portion is large enough that it is more efficient to store a new, full sourceblock.

It will be understood by one skilled in the art that transfer and synchronization of data would be increased to the same extent as for storage. By transferring or synchronizing reference codes instead of full-sized data, the bandwidth requirements for both types of operations are dramatically reduced.

In addition, the method described herein is inherently a form of encryption. When the data is converted from its full form to reference codes, none of the original data is contained in the reference codes. Without access to the library of sourceblocks, it would be impossible to reconstruct any portion of the data from the reference codes. This inherent property of the method described herein could obviate the need for traditional encryption algorithms, thereby offsetting most or all of the computational cost of conversion of data back and forth to reference codes. In theory, the method described herein should not utilize any additional computing power beyond traditional storage using encryption algorithms. Alternatively, the method described herein could be in addition to other encryption algorithms to increase data security even further.

In other embodiments, additional security features could be added, such as: creating a proprietary library of sourceblocks for proprietary networks, physical separation of the reference codes from the library of sourceblocks, storage of the library of sourceblocks on a removable device to enable easy physical separation of the library and reference codes from any network, and incorporation of proprietary sequences of how sourceblocks are read and the data reassembled.

Figure 7:
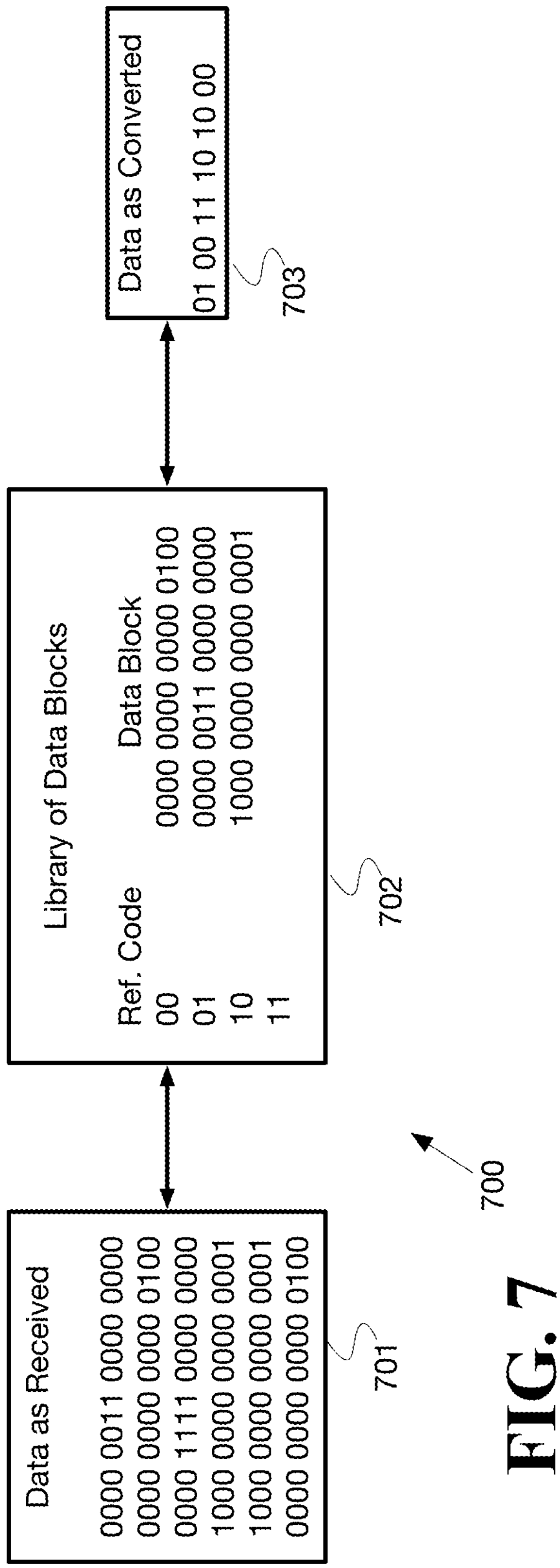
FIG. 7 is a diagram showing an example of how data might be converted into reference codes using an aspect of an embodiment.

FIG. 7 is a diagram showing an example of how data might be converted into reference codes using an aspect of an embodiment 700. As data is received 701, it is read by the processor in sourceblocks of a size dynamically determined by the previously disclosed sourceblock size optimizer 410.

In this example, each sourceblock is 16 bits in length, and the library 702 initially contains three sourceblocks with reference codes 00, 01, and 10. The entry for reference code 11 is initially empty. As each 16 bit sourceblock is received, it is compared with the library. If that sourceblock is already contained in the library, it is assigned the corresponding reference code. So, for example, as the first line of data (0000 0011 0000 0000) is received, it is assigned the reference code (01) associated with that sourceblock in the library. If that sourceblock is not already contained in the library, as is the case with the third line of data (0000 1111 0000 0000) received in the example, that sourceblock is added to the library and assigned a reference code, in this case 11. The data is thus converted 703 to a series of reference codes to sourceblocks in the library. The data is stored as a collection of codewords, each of which contains the reference code to a sourceblock and information about the location of the sourceblocks in the data set. Reconstructing the data is performed by reversing the process. Each stored reference code in a data collection is compared with the reference codes in the library, the corresponding sourceblock is read from the library, and the data is reconstructed into its original form.

Figure 8:
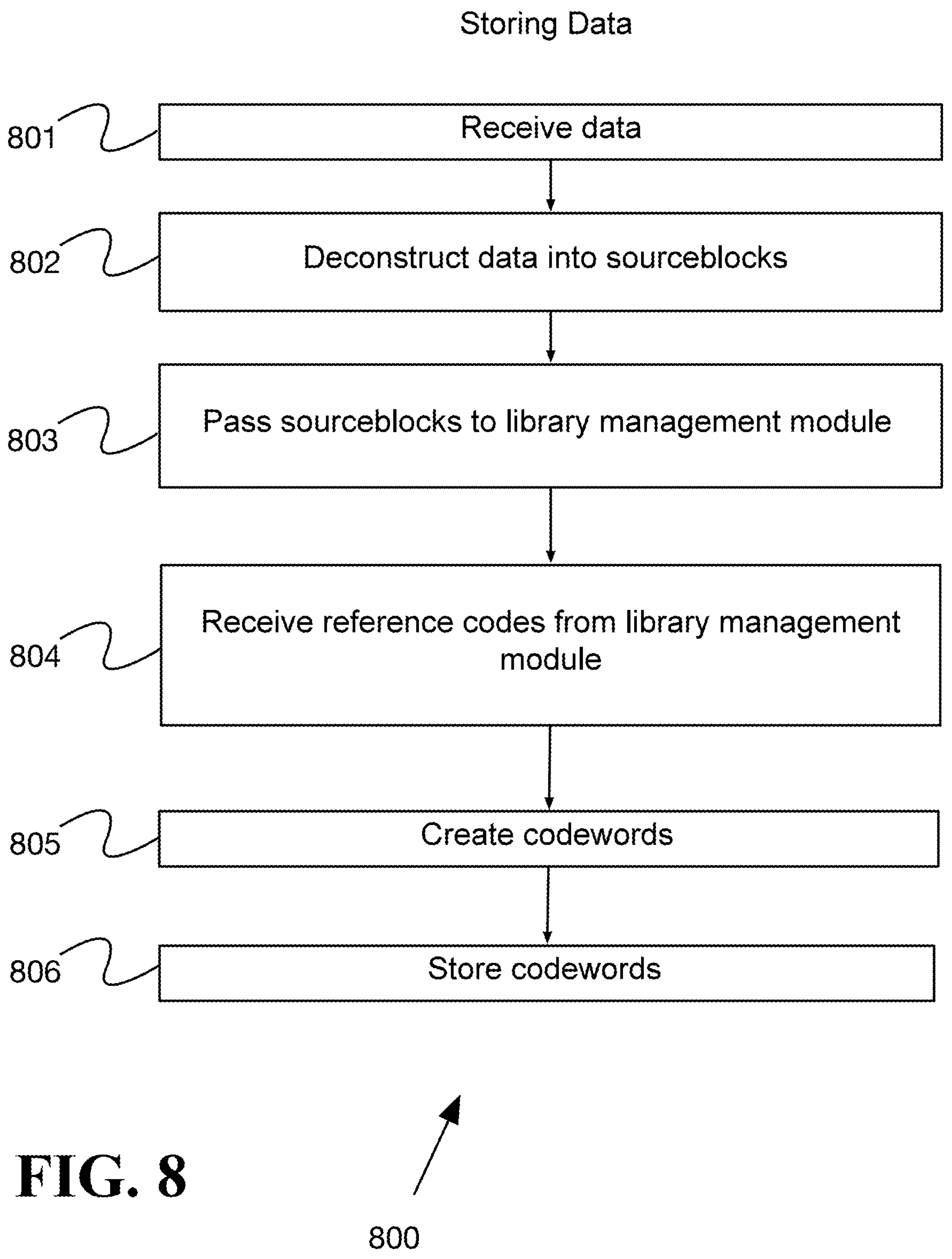
FIG. 8 is a method diagram showing the steps involved in using an embodiment to store data.

FIG. 8 is a method diagram showing the steps involved in using an embodiment 800 to store data. As data is received 801, it would be deconstructed into sourceblocks 802, and passed 803 to the library management module for processing. Reference codes would be received back 804 from the library management module, and could be combined with location information to create codewords 805, which would then be stored 806 as representations of the original data.

Figure 9:
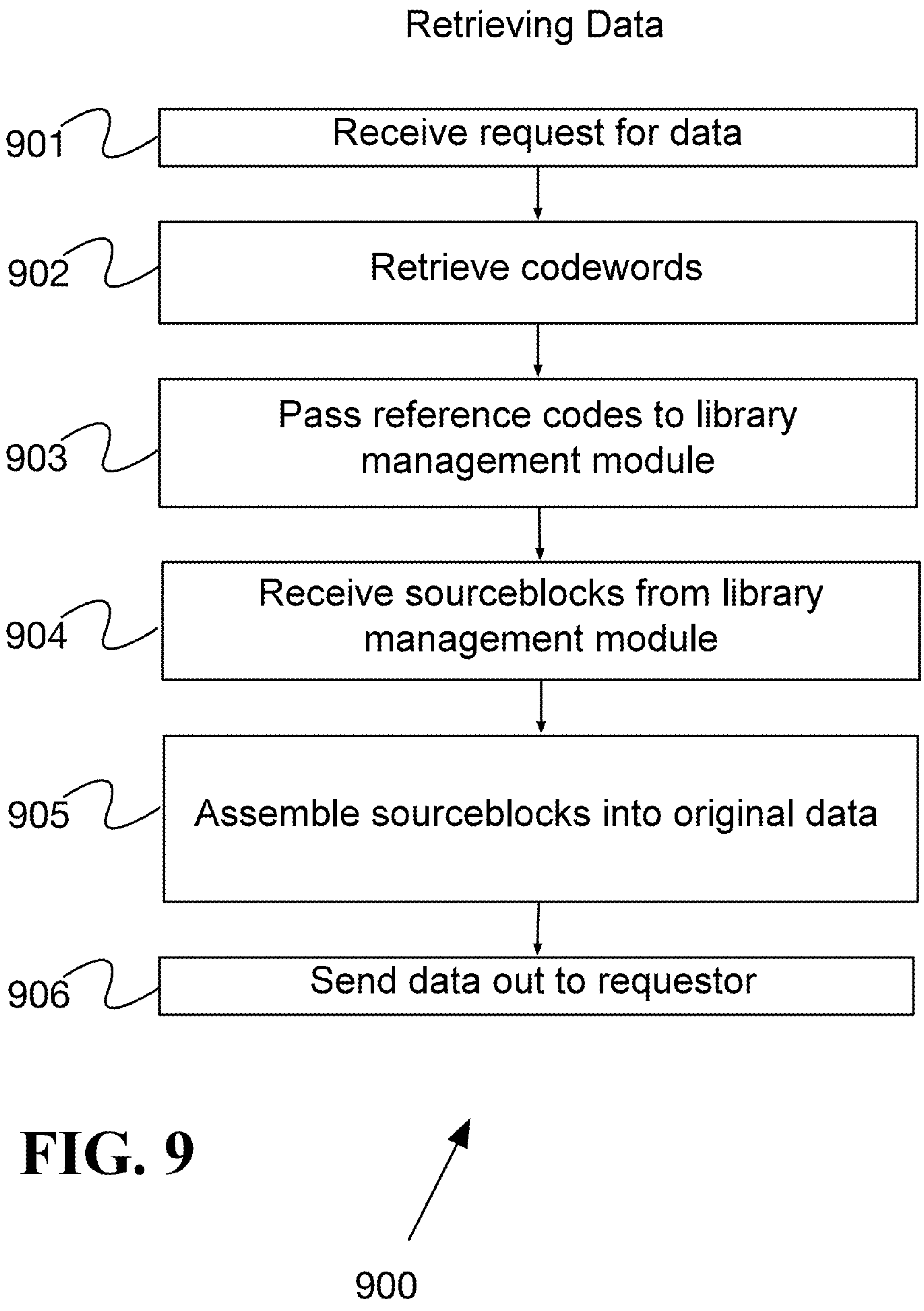
FIG. 9 is a method diagram showing the steps involved in using an embodiment to retrieve data.

FIG. 9 is a method diagram showing the steps involved in using an embodiment 900 to retrieve data. When a request for data is received 901, the associated codewords would be retrieved 902 from the library. The codewords would be passed 903 to the library management module, and the associated sourceblocks would be received back 904. Upon receipt, the sourceblocks would be assembled 905 into the original data using the location data contained in the codewords, and the reconstructed data would be sent out 906 to the requestor.

Figure 10:
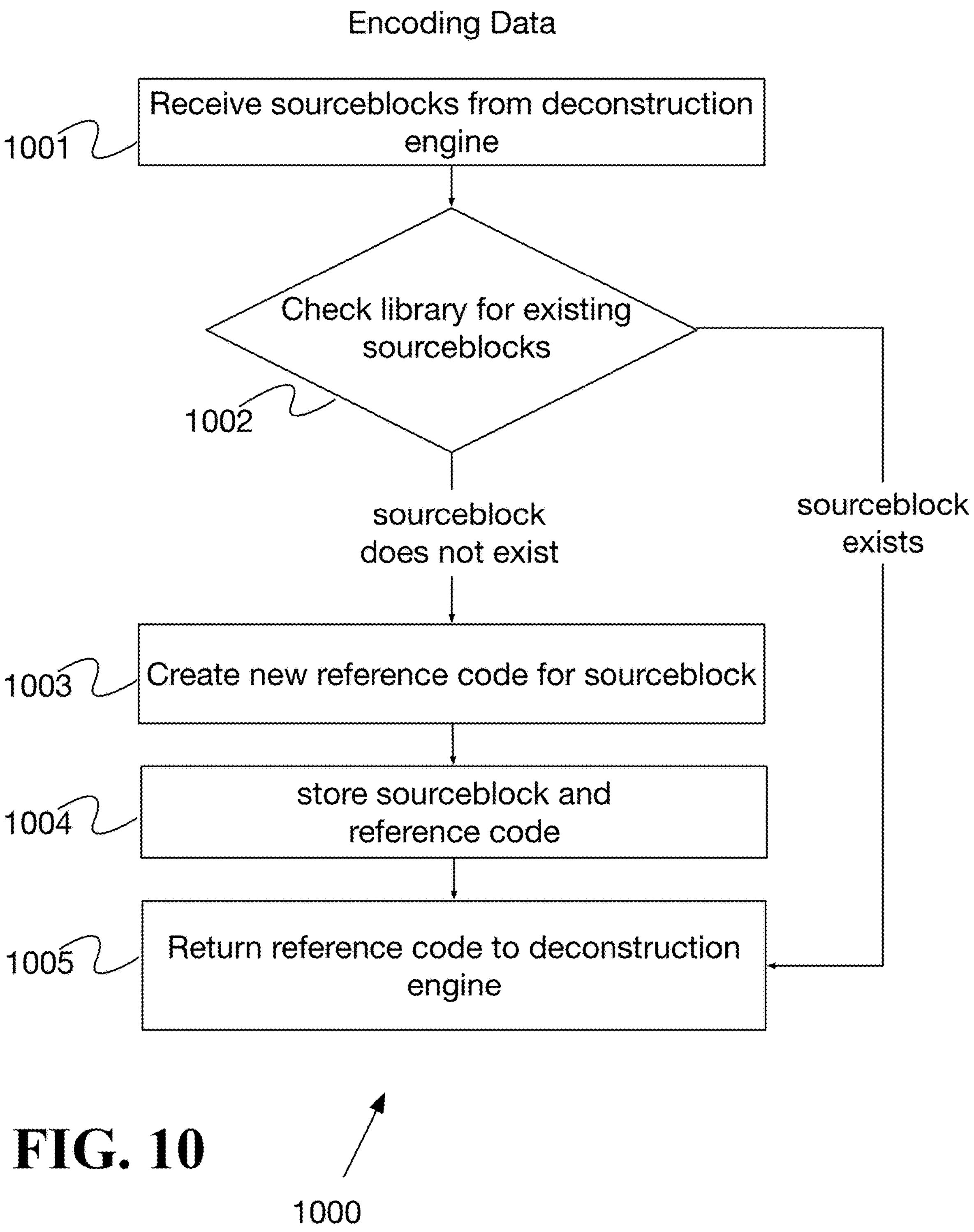
FIG. 10 is a method diagram showing the steps involved in using an embodiment to encode data.

FIG. 10 is a method diagram showing the steps involved in using an embodiment 1000 to encode data. As sourceblocks are received 1001 from the deconstruction engine, they would be compared 1002 with the sourceblocks already contained in the library. If that sourceblock already exists in the library, the associated reference code would be returned 1005 to the deconstruction engine. If the sourceblock does not already exist in the library, a new reference code would be created 1003 for the sourceblock. The new reference code and its associated sourceblock would be stored 1004 in the library, and the reference code would be returned to the deconstruction engine.

Figure 11:
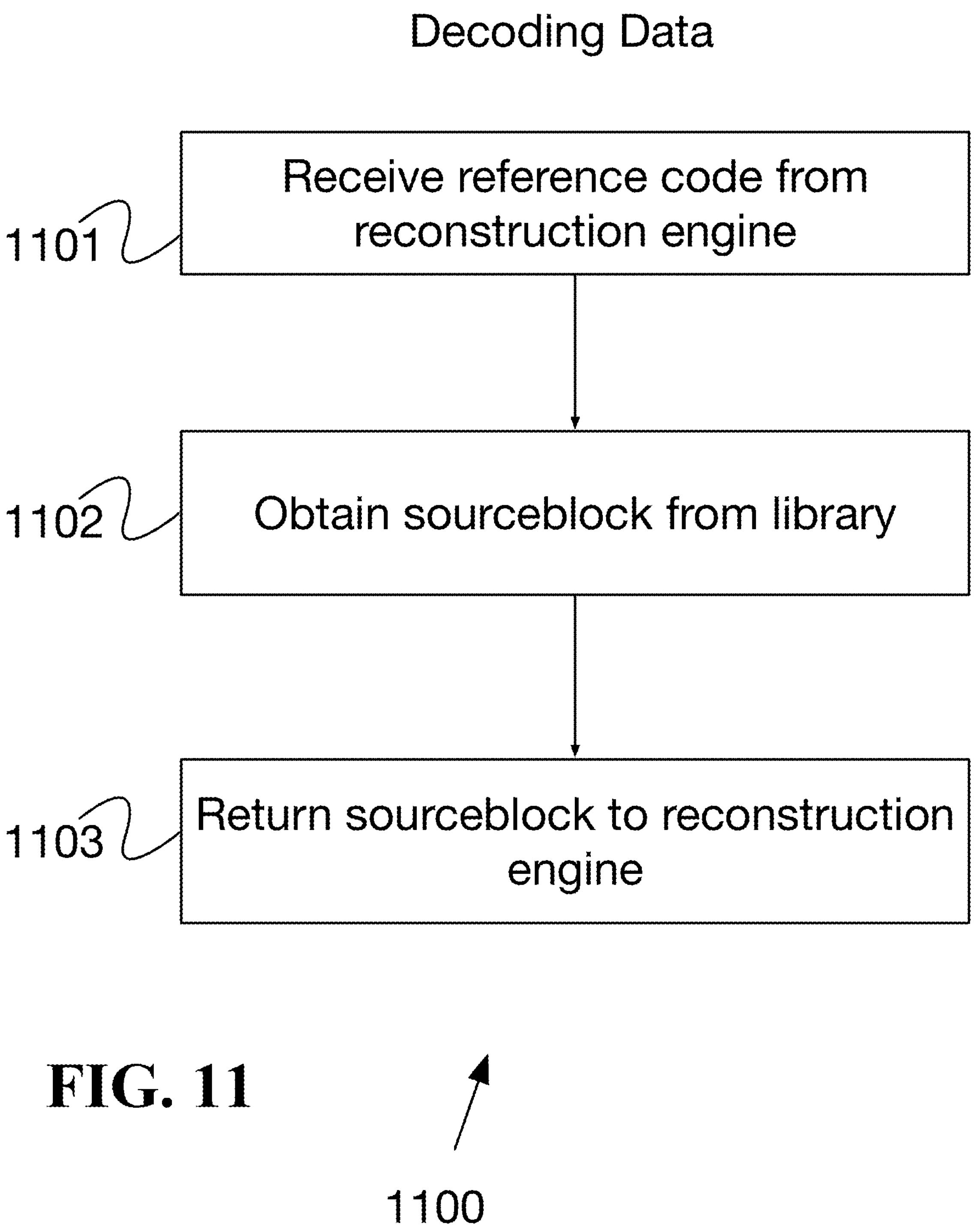
FIG. 11 is a method diagram showing the steps involved in using an embodiment to decode data.

FIG. 11 is a method diagram showing the steps involved in using an embodiment 1100 to decode data. As reference codes are received 1101 from the reconstruction engine, the associated sourceblocks are retrieved 1102 from the library, and returned 1103 to the reconstruction engine.

Figure 16:
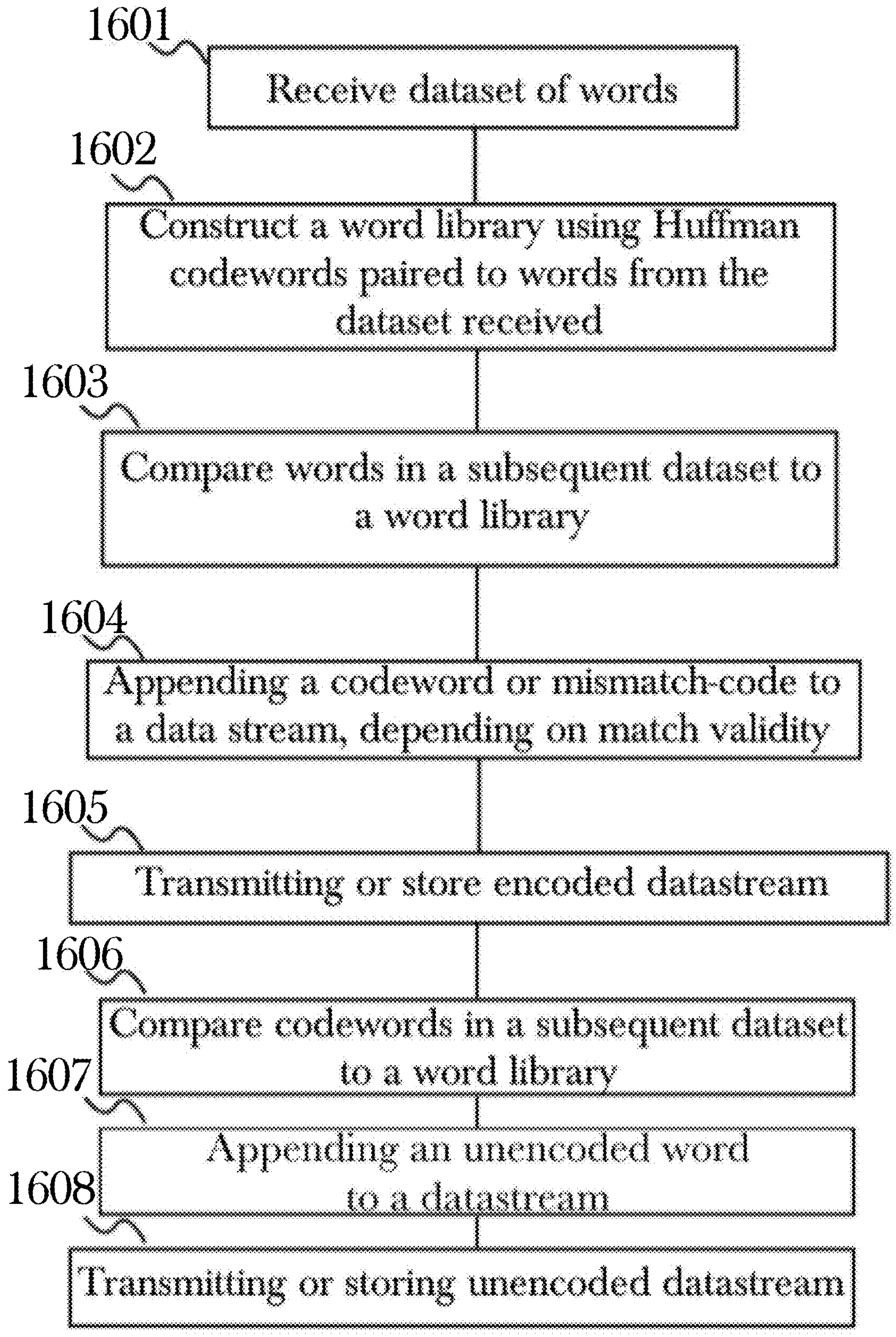
FIG. 16 is a method diagram illustrating key system functionality utilizing an encoder and decoder pair.

FIG. 16 is a method diagram illustrating key system functionality utilizing an encoder and decoder pair, according to a preferred embodiment. In a first step 1601, at least one incoming data set may be received at a customized library generator 1300 that then 1602 processes data to produce a customized word library 1201 comprising key-value pairs of data words (each comprising a string of bits) and their corresponding calculated binary Huffman codewords. A subsequent dataset may be received, and compared to the word library 1603 to determine the proper codewords to use in order to encode the dataset. Words in the dataset are checked against the word library and appropriate encodings are appended to a data stream 1604. If a word is mismatched within the word library and the dataset, meaning that it is present in the dataset but not the word library, then a mismatched code is appended, followed by the unencoded original word. If a word has a match within the word library, then the appropriate codeword in the word library is appended to the data stream. Such a data stream may then be stored or transmitted 1605 to a destination as desired. For the purposes of decoding, an already-encoded data stream may be received and compared 1606, and un-encoded words may be appended to a new data stream 1607 depending on word matches found between the encoded data stream and the word library that is present. A matching codeword that is found in a word library is replaced with the matching word and appended to a data stream, and a mismatch code found in a data stream is deleted and the following unencoded word is re-appended to a new data stream, the inverse of the process of encoding described earlier. Such a data stream may then be stored or transmitted 1608 as desired.

Figure 17:
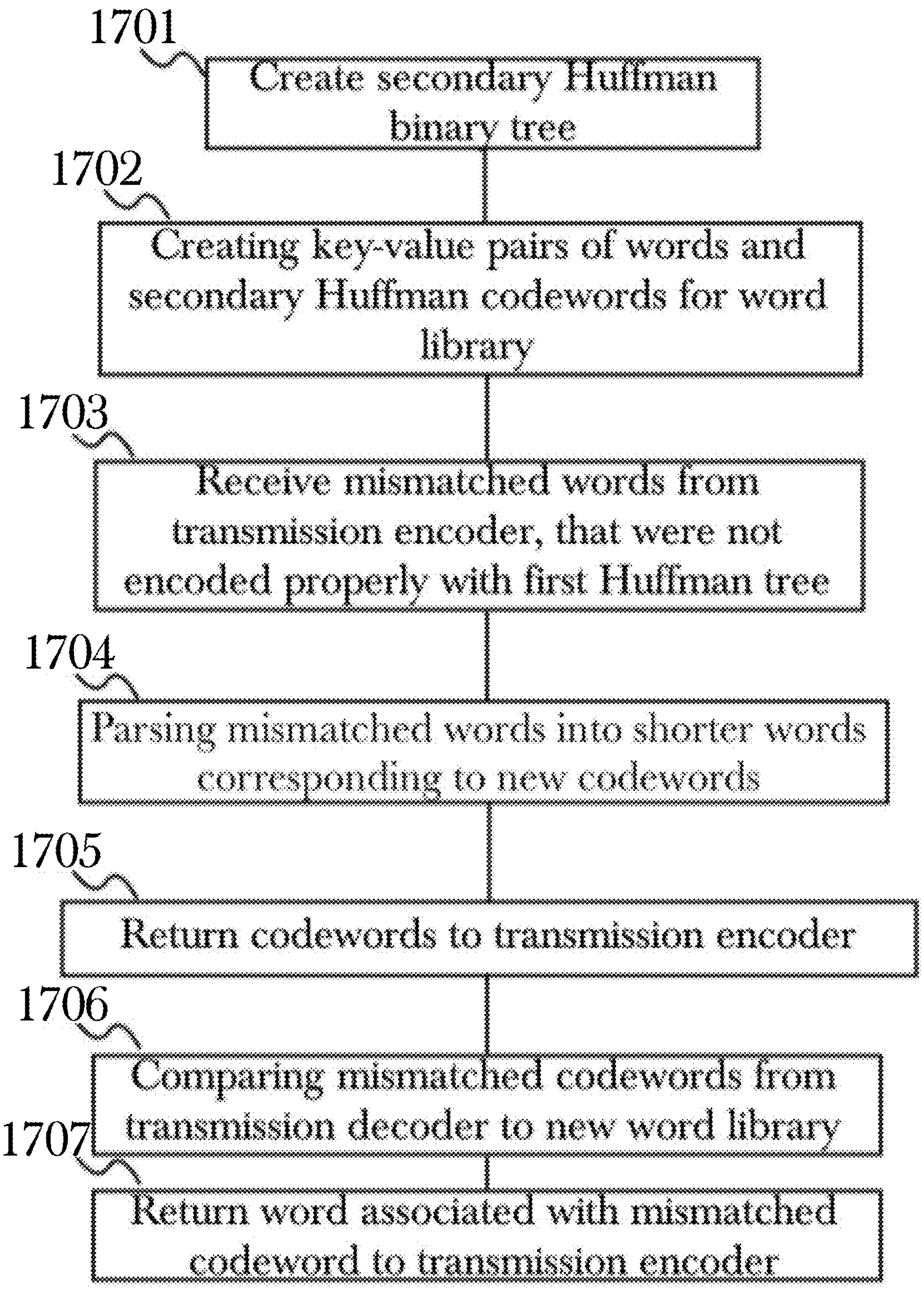
FIG. 17 is a method diagram illustrating possible use of a hybrid encoder/decoder to improve the compression ratio.

FIG. 17 is a method diagram illustrating possible use of a hybrid encoder/decoder to improve the compression ratio, according to a preferred aspect. A second Huffman binary tree may be created 1701, having a shorter maximum length of codewords than a first Huffman binary tree 1602, allowing a word library to be filled with every combination of codeword possible in this shorter Huffman binary tree 1702. A word library may be filled with these Huffman codewords and words from a dataset 1702, such that a hybrid encoder/decoder 1304, 1503 may receive any mismatched words from a dataset for which encoding has been attempted with a first Huffman binary tree 1703, 1604 and parse previously mismatched words into new partial codewords (that is, codewords that are each a substring of an original mismatched codeword) using the second Huffman binary tree 1704. In this way, an incomplete word library may be supplemented by a second word library. New codewords attained in this way may then be returned to a transmission encoder 1705, 1500. In the event that an encoded dataset is received for decoding, and there is a mismatch code indicating that additional coding is needed, a mismatch code may be removed and the unencoded word used to generate a new codeword as before 1706, so that a transmission encoder 1500 may have the word and newly generated codeword added to its word library 1707, to prevent further mismatching and errors in encoding and decoding.

It will be recognized by a person skilled in the art that the methods described herein can be applied to data in any form. For example, the method described herein could be used to store genetic data, which has four data units: C, G, A, and T. Those four data units can be represented as 2 bit sequences: 00, 01, 10, and 11, which can be processed and stored using the method described herein.

It will be recognized by a person skilled in the art that certain embodiments of the methods described herein may have uses other than data storage. For example, because the data is stored in reference code form, it cannot be reconstructed without the availability of the library of sourceblocks. This is effectively a form of encryption, which could be used for cyber security purposes. As another example, an embodiment of the method described herein could be used to store backup copies of data, provide for redundancy in the event of server failure, or provide additional security against cyberattacks by distributing multiple partial copies of the library among computers are various locations, ensuring that at least two copies of each sourceblock exist in different locations within the network.

Figure 18:
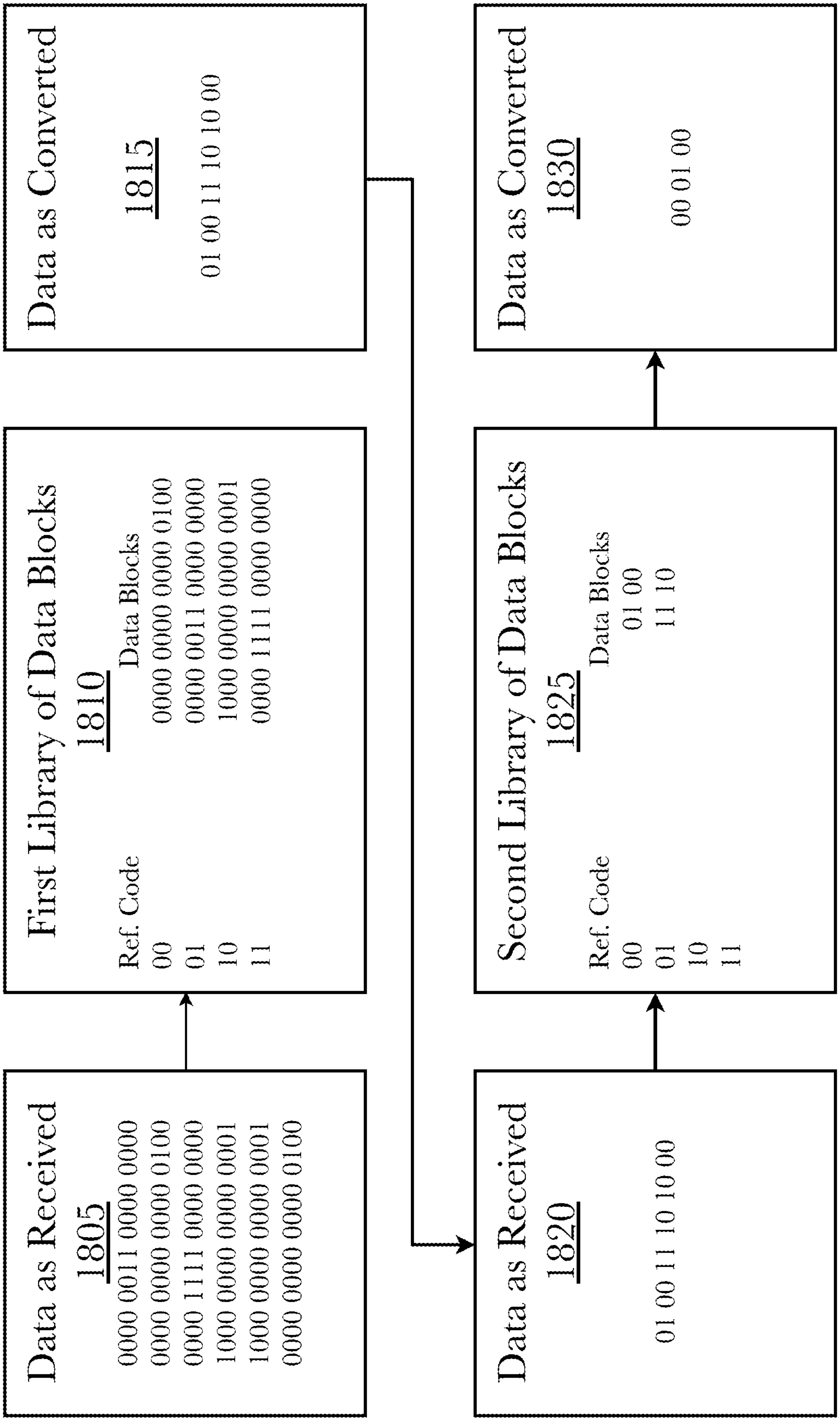
FIG. 18 is a flow diagram illustrating the use of a data encoding system used to recursively encode data to further reduce data size.

FIG. 18 is a flow diagram illustrating the use of a data encoding system used to recursively encode data to further reduce data size. Data may be input 1805 into a data deconstruction engine 102 to be deconstructed into code references, using a library of code references based on the input 1810. Such example data is shown in a converted, encoded format 1815, highly compressed, reducing the example data from 96 bits of data, to 12 bits of data, before sending this newly encoded data through the process again 1820, to be encoded by a second library 1825, reducing it even further. The newly converted data 1830 is shown as only 6 bits in this example, thus a size of 6.25% of the original data packet. With recursive encoding, then, it is possible and implemented in the system to achieve increasing compression ratios, using multi-layered encoding, through recursively encoding data. Both initial encoding libraries 1810 and subsequent libraries 1825 may be achieved through machine learning techniques to find optimal encoding patterns to reduce size, with the libraries being distributed to recipients prior to transfer of the actual encoded data, such that only the compressed data 1830 must be transferred or stored, allowing for smaller data footprints and bandwidth requirements. This process can be reversed to reconstruct the data. While this example shows only two levels of encoding, recursive encoding may be repeated any number of times. The number of levels of recursive encoding will depend on many factors, a non-exhaustive list of which includes the type of data being encoded, the size of the original data, the intended usage of the data, the number of instances of data being stored, and available storage space for codebooks and libraries. Additionally, recursive encoding can be applied not only to data to be stored or transmitted, but also to the codebooks and/or libraries, themselves. For example, many installations of different libraries could take up a substantial amount of storage space. Recursively encoding those different libraries to a single, universal library would dramatically reduce the amount of storage space required, and each different library could be reconstructed as necessary to reconstruct incoming streams of data.

Figure 20:
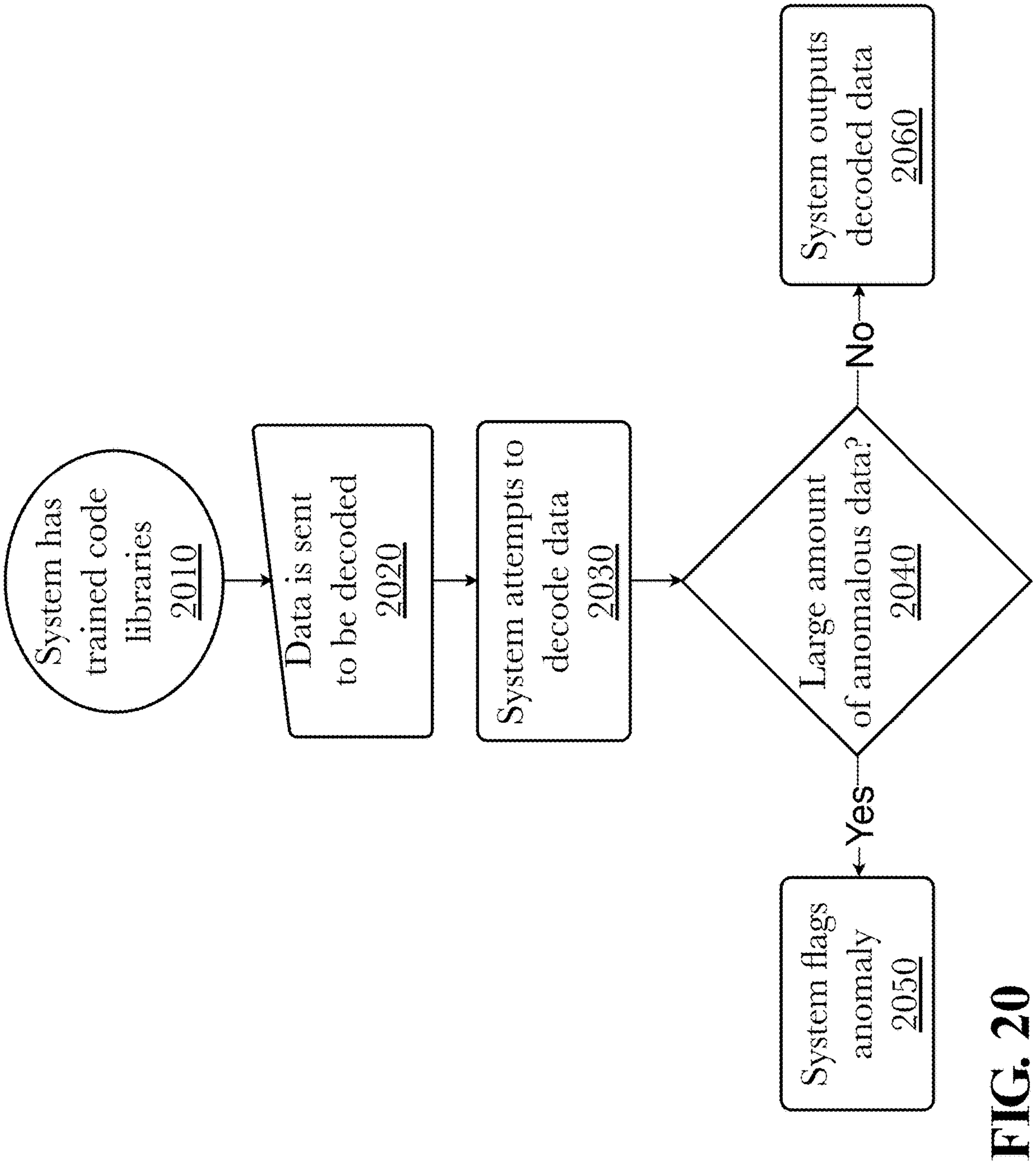
FIG. 20 is a flow diagram of an exemplary method used to detect anomalies in received encoded data and producing a warning.

FIG. 20 is a flow diagram of an exemplary method used to detect anomalies in received encoded data and producing a warning. A system may have trained encoding libraries 2010, before data is received from some source such as a network connected device or a locally connected device including USB connected devices, to be decoded 2020. Decoding in this context refers to the process of using the encoding libraries to take the received data and attempt to use encoded references to decode the data into its original source 2030, potentially more than once if recursive encoding was used, but not necessarily more than once. An anomaly detector 1910 may be configured to detect a large amount of un-encoded data 2040 in the midst of encoded data, by locating data or references that do not appear in the encoding libraries, indicating at least an anomaly, and potentially data tampering or faulty encoding libraries. A flag or warning is set by the system 2050, allowing a user to be warned at least of the presence of the anomaly and the characteristics of the anomaly. However, if a large amount of invalid references or unencoded data are not present in the encoded data that is attempting to be decoded, the data may be decoded and output as normal 2060, indicating no anomaly has been detected.

Figure 21:
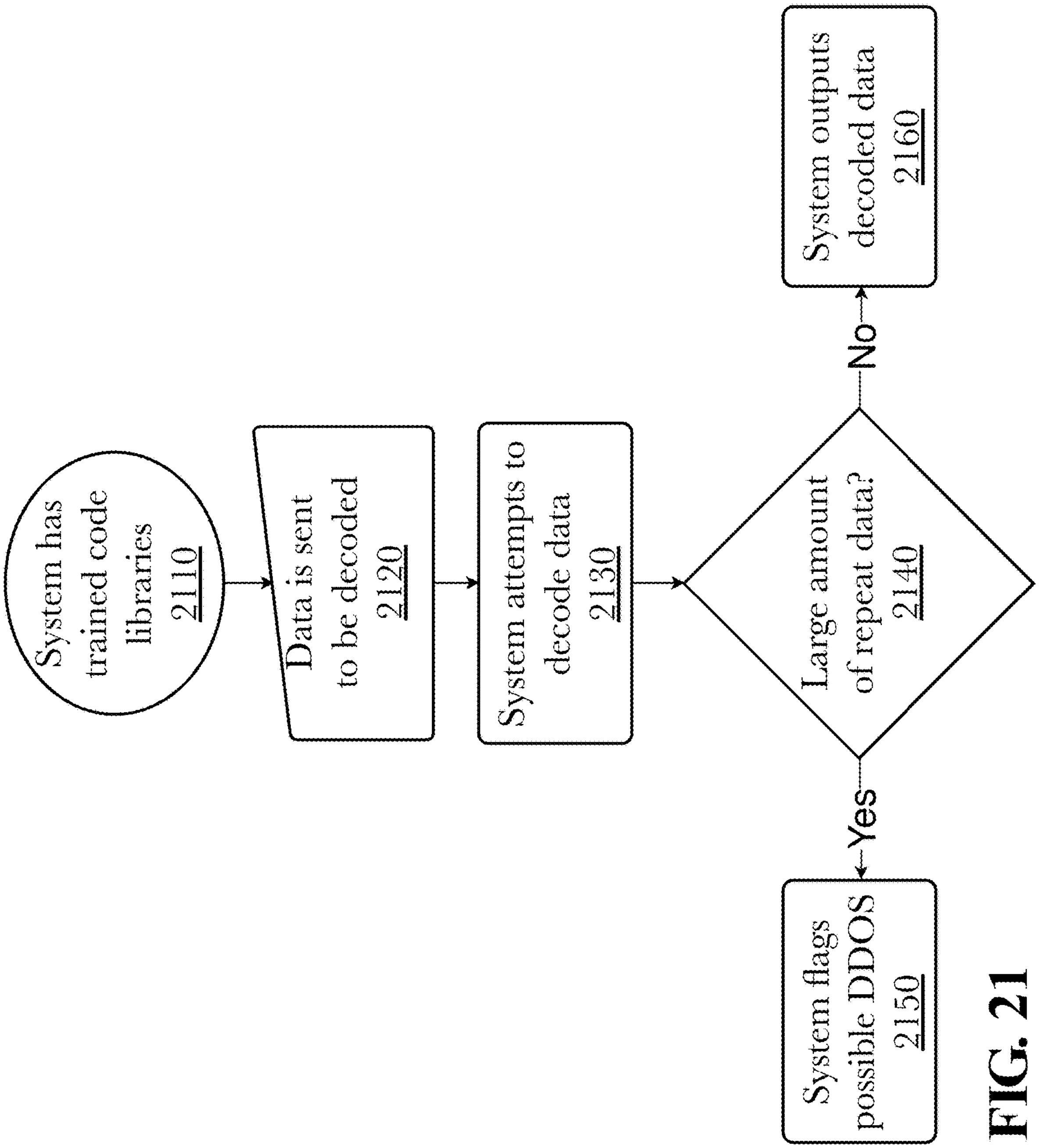
FIG. 21 is a flow diagram of a data encoding system used for Distributed Denial of Service (DDOS) attack denial.

FIG. 21 is a flow diagram of a method used for Distributed Denial of Service (DDoS) attack denial. A system may have trained encoding libraries 2110, before data is received from some source such as a network connected device or a locally connected device including USB connected devices, to be decoded 2120. Decoding in this context refers to the process of using the encoding libraries to take the received data and attempt to use encoded references to decode the data into its original source 2130, potentially more than once if recursive encoding was used, but not necessarily more than once. A DDoS detector 1920 may be configured to detect a large amount of repeating data 2140 in the encoded data, by locating data or references that repeat many times over (the number of which can be configured by a user or administrator as need be), indicating a possible DDoS attack. A flag or warning is set by the system 2150, allowing a user to be warned at least of the presence of a possible DDoS attack, including characteristics about the data and source that initiated the flag, allowing a user to then block incoming data from that source. However, if a large amount of repeat data in a short span of time is not detected, the data may be decoded and output as normal 2160, indicating no DDoS attack has been detected.

Figure 23:
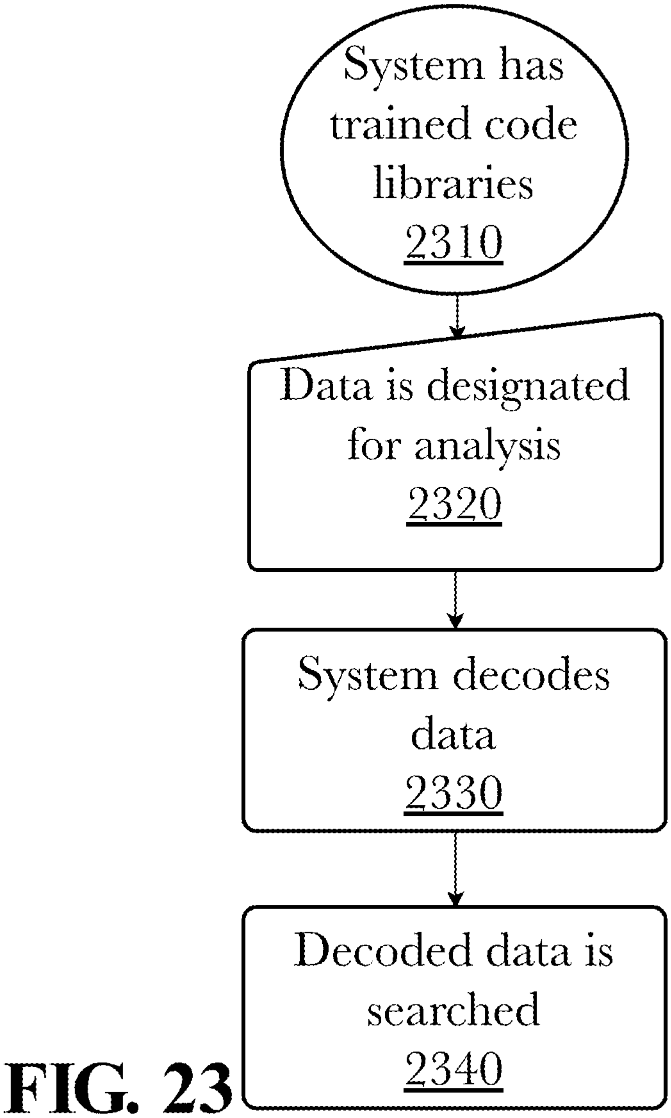
FIG. 23 is a flow diagram of an exemplary method used to enable high-speed data mining of repetitive data.

FIG. 23 is a flow diagram of an exemplary method used to enable high-speed data mining of repetitive data. A system may have trained encoding libraries 2310, before data is received from some source such as a network connected device or a locally connected device including USB connected devices, to be analyzed 2320 and decoded 2330. When determining data for analysis, users may select specific data to designate for decoding 2330, before running any data mining or analytics functions or software on the decoded data 2340. Rather than having traditional decryption and decompression operate over distributed drives, data can be regenerated immediately using the encoding libraries disclosed herein, as it is being searched. Using methods described in FIG. 9 and FIG. 11, data can be stored, retrieved, and decoded swiftly for searching, even across multiple devices, because the encoding library may be on each device. For example, if a group of servers host codewords relevant for data mining purposes, a single computer can request these codewords, and the codewords can be sent to the recipient swiftly over the bandwidth of their connection, allowing the recipient to locally decode the data for immediate evaluation and searching, rather than running slow, traditional decompression algorithms on data stored across multiple devices or transfer larger sums of data across limited bandwidth.

Figure 25:
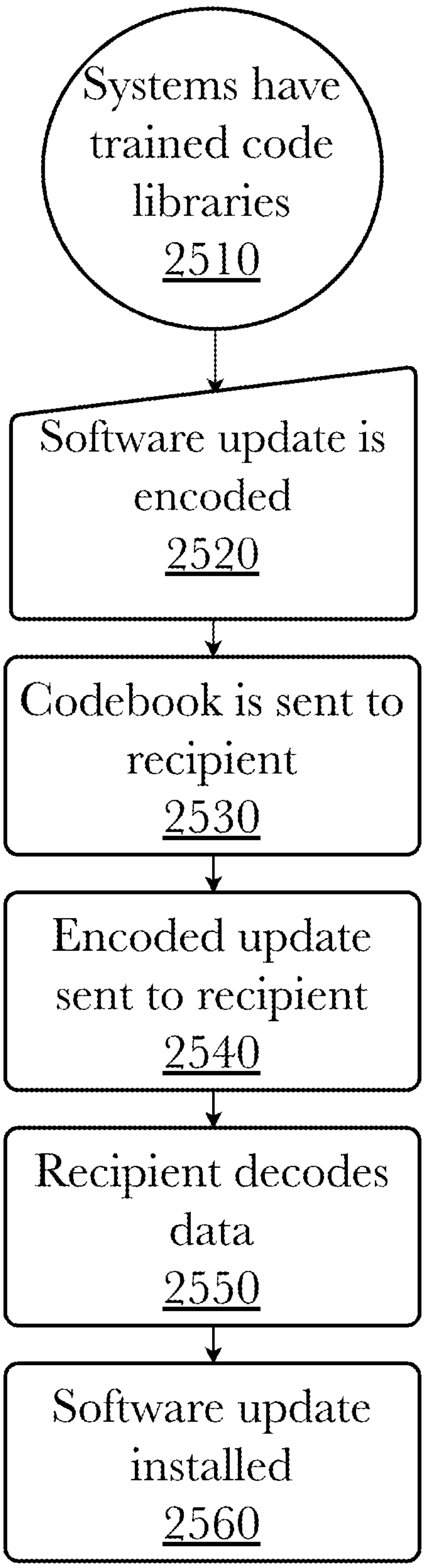
FIG. 25 is a flow diagram of an exemplary method used to encode and transfer software and firmware updates to a device for installation, for the purposes of reduced bandwidth consumption.

FIG. 25 is a flow diagram of an exemplary method used to encode and transfer software and firmware updates to a device for installation, for the purposes of reduced bandwidth consumption. A first system may have trained code libraries or "codebooks" present 2510, allowing for a software update of some manner to be encoded 2520. Such a software update may be a firmware update, operating system update, security patch, application patch or upgrade, or any other type of software update, patch, modification, or upgrade, affecting any computer system. A codebook for the patch must be distributed to a recipient 2530, which may be done beforehand and either over a network or through a local or physical connection, but must be accomplished at some point in the process before the update may be installed on the recipient device 2560. An update may then be distributed to a recipient device 2540, allowing a recipient with a codebook distributed to them 2530 to decode the update 2550 before installation 2560. In this way, an encoded and thus heavily compressed update may be sent to a recipient far quicker and with less bandwidth usage than traditional lossless compression methods for data, or when sending data in uncompressed formats. This especially may benefit large distributions of software and software updates, as with enterprises updating large numbers of devices at once.

Figure 27:
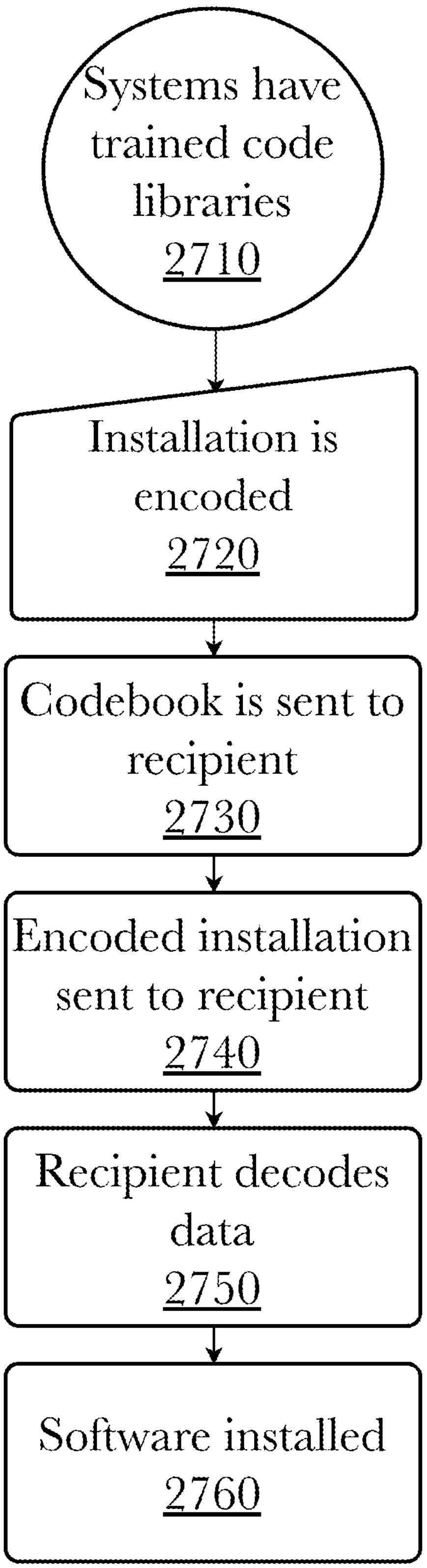
FIG. 27 is a flow diagram of an exemplary method used to encode new software and operating system installations for reduced bandwidth required for transference.

FIG. 27 is a flow diagram of an exemplary method used to encode new software and operating system installations for reduced bandwidth required for transference. A first system may have trained code libraries or "codebooks" present 2710, allowing for a software installation of some manner to be encoded 2720. Such a software installation may be a software update, operating system, security system, application, or any other type of software installation, execution, or acquisition, affecting a computer system. An encoding library or "codebook" for the installation must be distributed to a recipient 2730, which may be done beforehand and either over a network or through a local or physical connection, but must be accomplished at some point in the process before the installation can begin on the recipient device 2760. An installation may then be distributed to a recipient device 2740, allowing a recipient with a codebook distributed to them 2730 to decode the installation 2750 before executing the installation 2760. In this way, an encoded and thus heavily compressed software installation may be sent to a recipient far quicker and with less bandwidth usage than traditional lossless compression methods for data, or when sending data in uncompressed formats. This especially may benefit large distributions of software and software updates, as with enterprises updating large numbers of devices at once.

Figure 28:
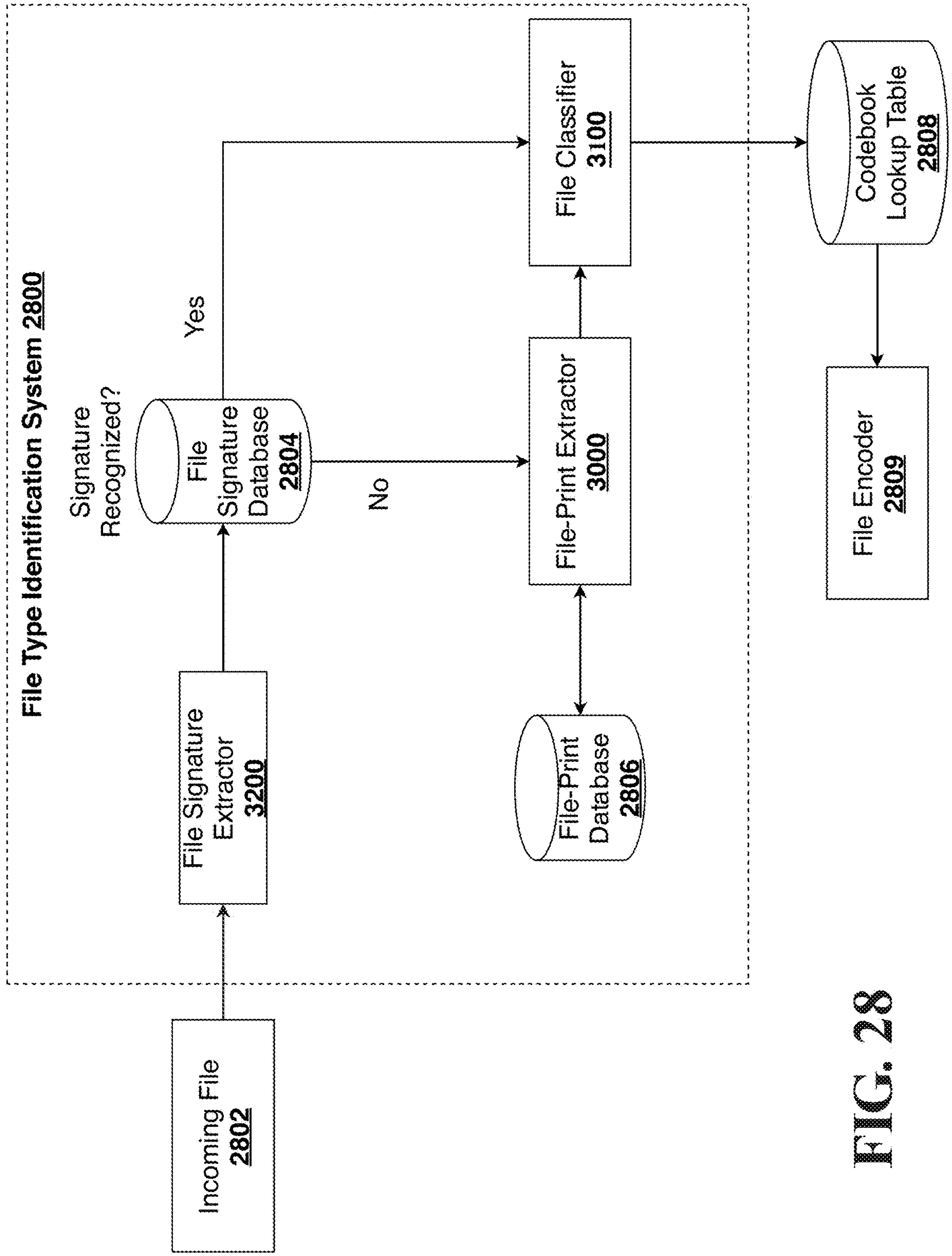
FIG. 28 is an exemplary system architecture diagram for a file classification system used for determining a file type.

FIG. 28 is an exemplary system architecture diagram for a file classification system used for determining a file type 2800. As a file is received 2802, a file signature extractor 3200 attempts to find and read a file signature of the file. The file signature extractor 3200 may search a file signature database 2804 to determine the expected location and structure of the file signature. If a file signature is found and is readable, the file type determining process is concluded and the file may be routed (along with its file type information) for further processing, such as to a codebook lookup table 2808 whereby the data encoder 2809 may encode the file based on a codebook associated with that file type in the database. If the file type determining process is concluded after a file signature is found, the file print extractor and file classifier may be instructed to cease operations, as the file type has already been determined.

If the file signature is not recognized in file-signature database 2804, or is recognized as a general text-based file type such as .ascii which is used for storing many different types of information, the file is routed to a file-print extraction algorithm 2805 which parses file into bytes and performs statistical analyses on the parsed file to generate the file's "file-print." The file-print may be generated by a machine learning algorithm trained on file-prints stored in a file-print database 2806. The file-print is sent to a file classifier, which uses a trained machine learning algorithm to identify a file type based on the file-print.

Figure 29:
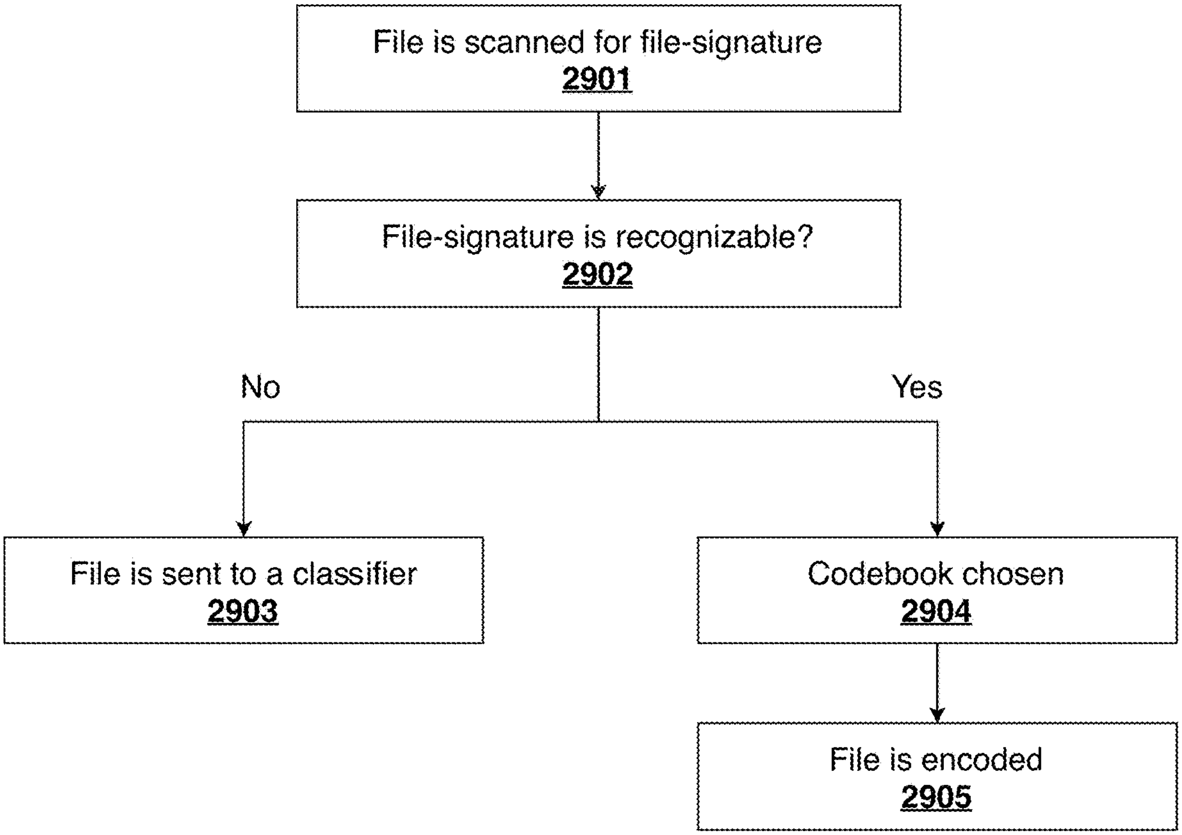
FIG. 29 is a flow diagram illustrating an exemplary process for determining whether a file should be passed as input to a machine-learning based classification algorithm.

FIG. 29 is a flow diagram illustrating an exemplary process for determining whether a file should be passed as input to a machine-learning based classification algorithm. A file, which may be locally stored on a computing device or sent/received over a network, is scanned for a file signature 2901, which is typically contained at the beginning of the file. The scan may be based on a list of file signatures stored in a database that contains the locations and structure of known file signatures 2902. If a file signature is recognized the file may be sent for further processing such as selection of a codebook for encoding files of the type contained in the file signature 2904, and encoding of the file based on the selected codebook 2905. If the file signature is missing or not recognized, the file is sent to a file classifier for further identification based on file-printing 2903.

Figure 30:
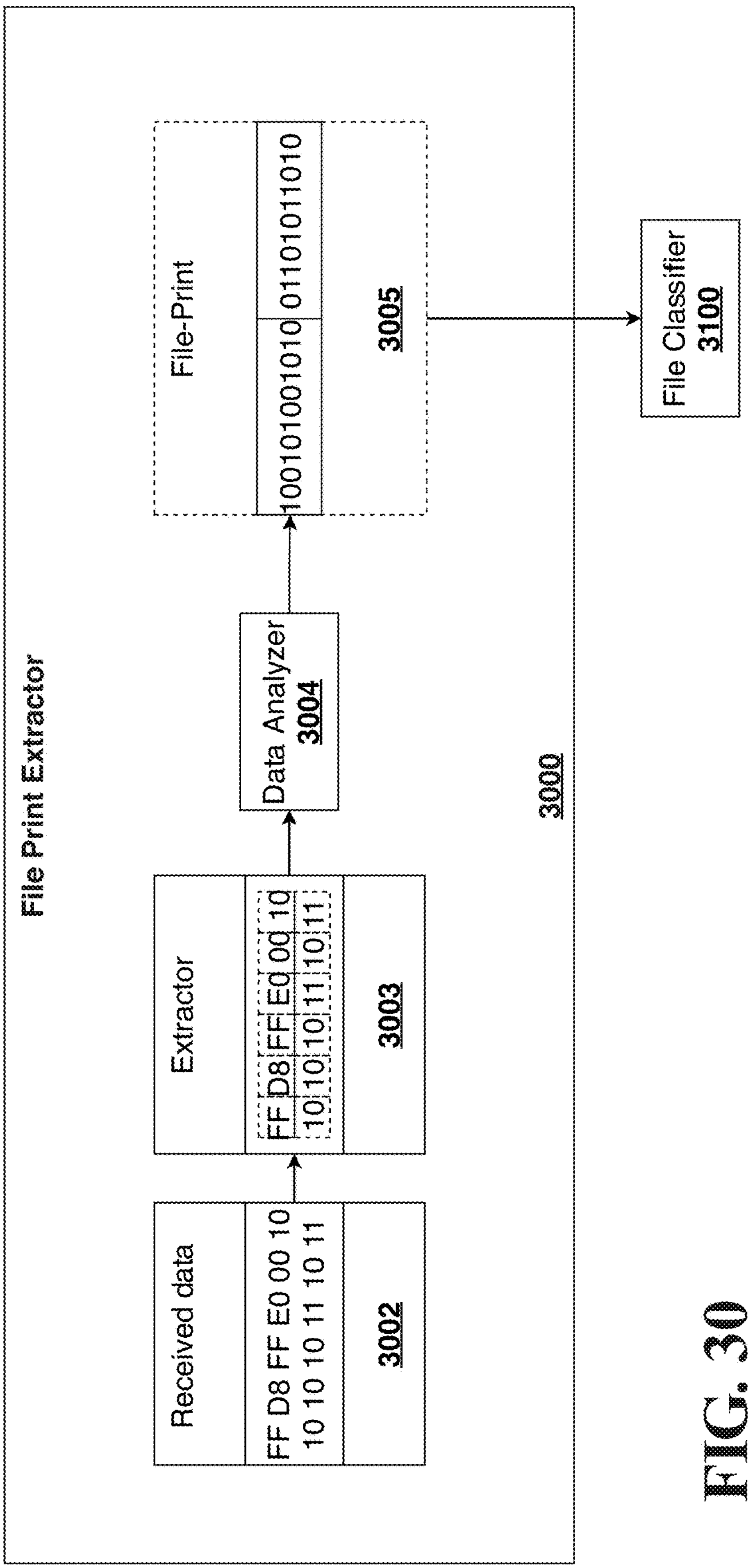
FIG. 30 is flowchart describing an exemplary file-print extraction process.

FIG. 30 is flowchart describing an exemplary file-print extraction process. In this example, a file is parsed into bytes (here shown as pairs of hexadecimal values) 3002, 3003. A data analyzer 3004 performs statistical calculations of the distribution of bytes in the parsed file and, in this simplified example, generates a 24-bit array file print 3005, wherein the first 12 bits represent a mean value for the distribution of bytes in the file and the second 12 bits represent a variance from the mean value for the distribution of bytes in the file. The file-print 3005 is then sent to a file classifier 3100 which uses a trained machine learning algorithm to identify the file type. While a simplified 24-bit file print 3005 is shown here, larger file-prints will typically be used.

Figure 31:
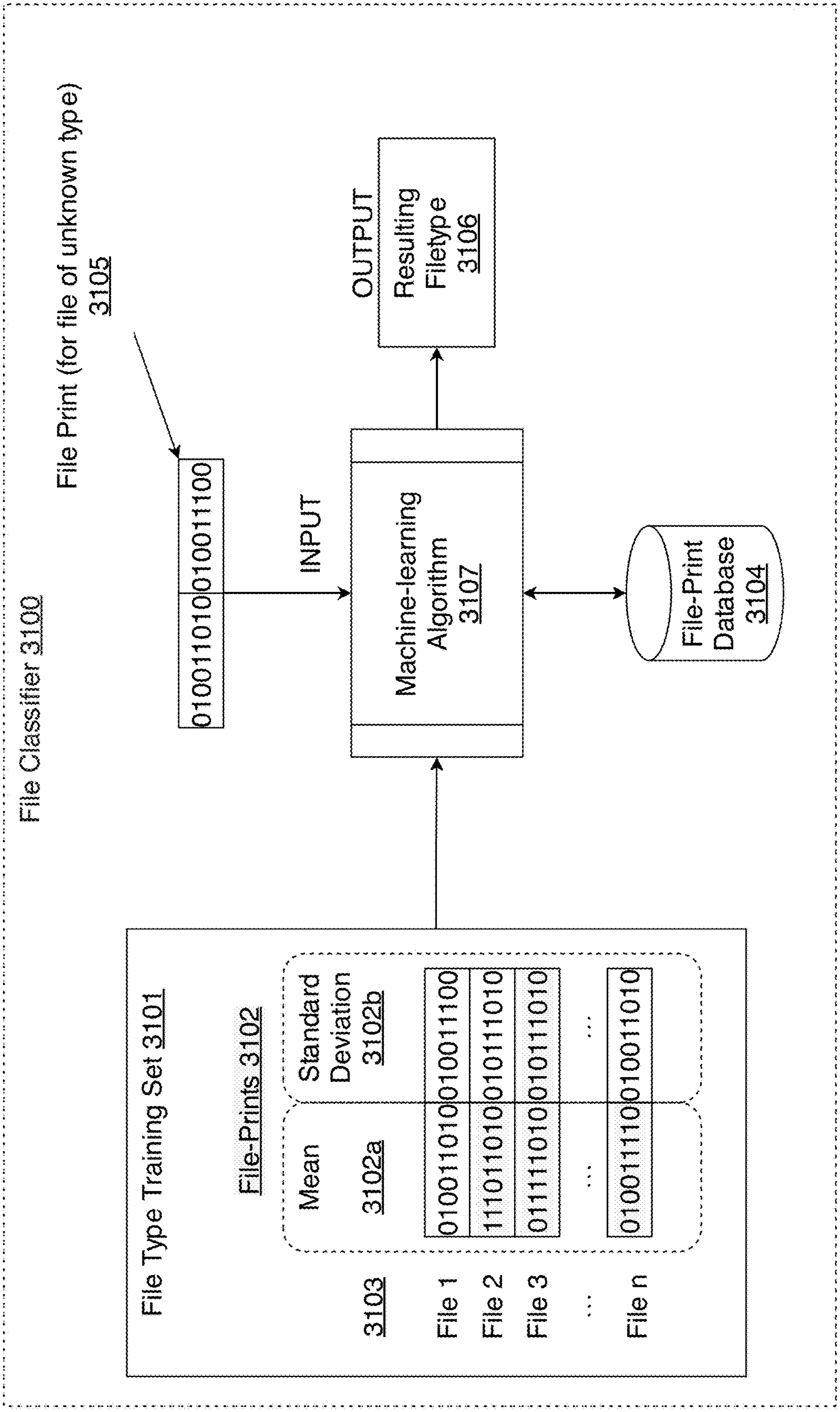
FIG. 31 is an exemplary process for file type identification using a file classifier.

FIG. 31 is an exemplary process for file type identification using a file classifier. The file classifier 3100 uses a trained machine learning algorithm to identify the file type of an unknown file from its file-print 3105. The machine learning algorithm is trained on file-prints for a plurality of files of known types. A file type training set 3101 may comprise file-prints 3102 derived from many thousands or millions of files 3103, each file-print 3102 comprising an array containing a mean value of the occurrence of each byte in the distribution of bytes in the file 3102*a* and a standard deviation of the mean value of the number of occurrences from the mean value of the expected number of occurrences 3102*b*. This simplified diagram shows file-prints with an array of 18 bits, with the mean value 3102*a* being 9 bits and the standard deviation 3102*b* being 9 bits, but real-work applications would typically contain larger arrays.

After the machine learning algorithm 3107 is trained using the file type training sets 3101, file-prints for files of unknown types 3105 may be passed through the machine learning algorithm 3107 which will identify the file type of the unknown file based on its training. The machine learning algorithm's data may be stored in a file-print database 3104, and confirmations of properly-identified files may be used as training data to further improve the machine learning algorithm's accuracy.

In some embodiments, a file-print may be sent through the machine learning algorithm more than once, and comparisons may be made between the file type predictions of the algorithm after each pass-through. In some embodiments, parameters for mean and variance may be altered with each pass-through of the algorithm until a sufficiently similar file-print for a known file type is identified. Limits may be imposed on the amount of pass-throughs for the algorithm whereby reaching said limit may prompt the user with its lack of satisfactory result (which is a value that may be determined by the implementation from the programmer).

In some embodiments, a minimum file size may be required so that each file contains a sufficient amount of data to generate valid statistical data to allow for the binary distribution analysis method described herein. In some cases, for example when a file is corrupted or the file is very short, there may not be enough binary information to develop a valid file-print for the file.

In some embodiments, the machine learning algorithm 3107 may produce a probability that the identified or predicted file type is correct. In such cases, threshold values may be established to require a certain percentage of similarity amongst the binary distribution-based analysis results of an unidentified file type with a certain file type contained in a database of file types before determining its file type prediction 3106. For example, if the machine learning algorithm 3107 conducts a pass through of a parsed file and determines that its prediction is correct only to a low probability (for example, 25%), the machine learning algorithm 3107 may go through repeated pass-throughs, but re-parsing the file into a different grouping at each pass-through. For example, if the file is initially parsed at every 2 bytes, in subsequent pass-throughs, the file might be parsed at 3 bytes, and then 4 bytes, etc., to see if the machine learning algorithm 3107 identifies a file type with a higher probability of accuracy, depending on the parsing of the file.

Figure 32:
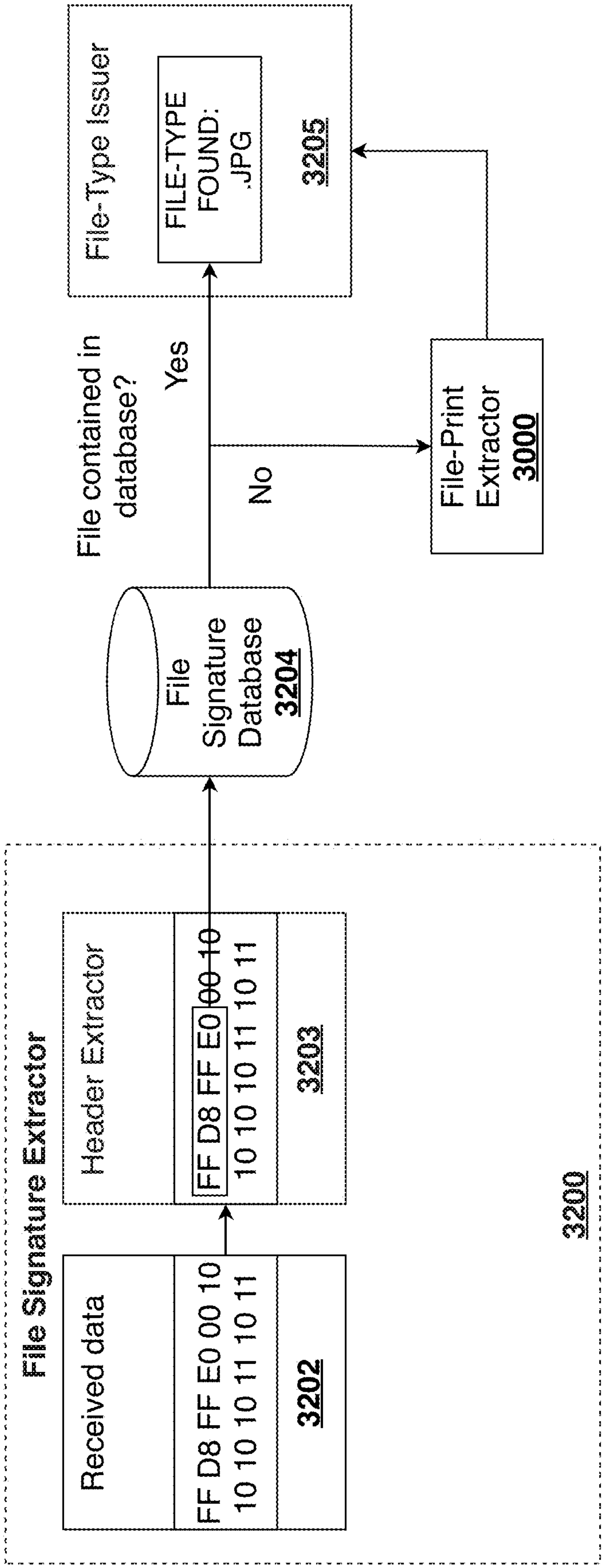
FIG. 32 is a flow diagram which illustrates an exemplary operation of a file signature extractor.

FIG. 32 is a flow diagram which illustrates an exemplary operation of a file signature extractor. A file signature is parsed to determine if a file type is identifiable, this is a process which may be done prior to having its parsed byte information routed to an algorithm for receiving its file-print to determine if said algorithm is necessary. The file signature information, which is often contained in the first initial bytes of a file, is a unique code specific to a given file type. An example of such a file signature is the four-byte sequence "FF D8 FF E0," which is the file signature for JPEG images, as shown in 3203. After a file 3202 is parsed for the file signature information 3203, the values are compared to a database which contains at least a plurality of file signatures of known file types 3204. If the file is identifiable, which is to say it has a file signature value which corresponds with a file signature of a known file type contained in the file signature database, it may have its file type predicted 3205. If the file signature is not identifiable, which is to say no file signature of the same value is present in the database for file signatures, the file is routed to a file-print extraction algorithm 3000 which may conduct a binary distribution-based analysis for providing a file-print to a machine-learning algorithm described herein for determining its file type.

According to an embodiment, the file-print information for a file which is identifiable may still have its file-print extracted and sent to a file-print database 3104 containing file-prints for known file type. This may allow for increasing the training dataset at an enhanced rate, which is an essential component for the machine-learning algorithm to improve its predictive file type result.

According to an embodiment, the file signature may be a general text-based file type such as .ascii. Said file type may have a wide range of realizable file types contained in its bit information. In such a case, the machine-learning based algorithm described herein may determine a prediction for its file type using file-print information instead of (or in conjunction with) its file signature.

In another aspect, said file may not contain file signature information in the first of a plurality of bytes. The algorithm 3000, which utilizes machine-learning/AI functionality, may be able to determine the file type through comparisons with 'training sets' contained in a database. Said training sets are files of the same file type, which have had their binary information parsed and analyzed using the methods described herein, and may be used for providing a larger dataset for the machine-learning algorithm to compare to thus potentially improving the accuracy of the predictive result for a file type.

Figure 33:
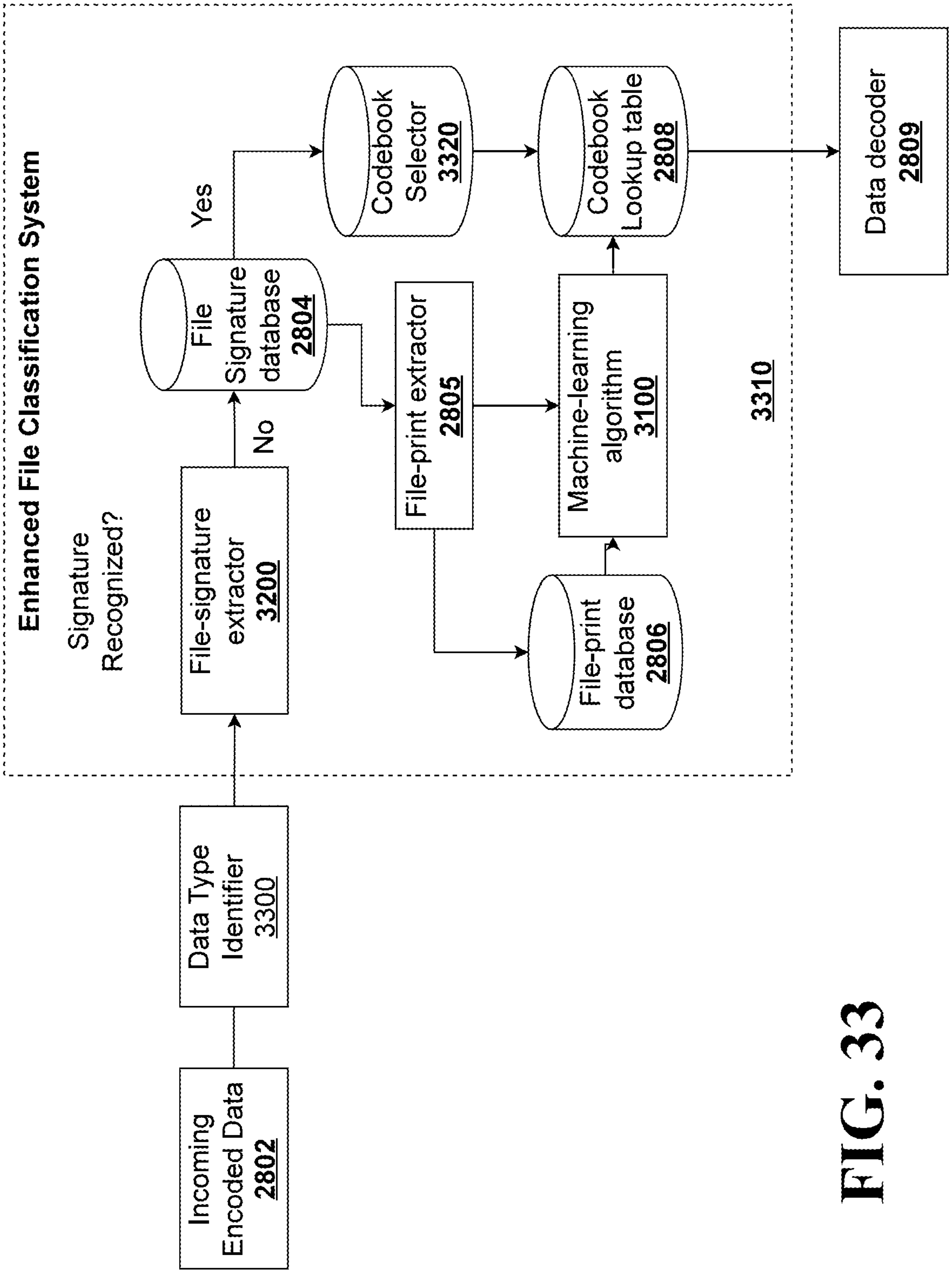
FIG. 33 is a block diagram showing an exemplary enhanced file classification system architecture capable of processing both traditional file-based data and streaming data through a unified classification pipeline.

FIG. 33 is a block diagram showing an exemplary enhanced file classification system architecture capable of processing both traditional file-based data and streaming data through a unified classification pipeline. The system receives incoming encoded data 2802 which may consist of complete files, partial files, corrupted files, or continuous data streams. This incoming data is initially processed by a data type identifier 3300, which serves as an intelligent routing component that determines whether the incoming data is a discrete file that can be processed using traditional file signature methods, or whether it represents streaming data requiring progressive analysis techniques.

Data type identifier 3300 examines the incoming data structure and metadata to make this determination. For example, if the incoming data arrives with clear file boundaries and a defined size, it may be routed as a traditional file. Conversely, if the data arrives as continuous packets without predetermined endpoints, or if it contains transport protocol headers such as RTP (Real-time Transport Protocol) or HLS (HTTP Live Streaming) markers, the data type identifier 3300 recognizes this as streaming data requiring specialized handling. Data type identifier 3300 maintains internal buffers and state management systems that allow it to begin processing streaming data immediately while accumulating sufficient data for meaningful analysis.

Once data type identifier 3300 has characterized the incoming data, it passes the data to an enhanced file classification system 3310, which contains the core classification components. File-signature extractor 3200 attempts to locate and read file signature information, typically found in the first several bytes of a file. File-signature extractor 3200 queries a file signature database 2804 containing thousands of known file signatures. For instance, a JPEG image file may contain the hexadecimal signature "FF D8 FF E0" in its first four bytes, while a PDF document would begin with "% PDF". If file-signature extractor 3200 successfully identifies a matching signature in database 2804, and if this signature provides sufficient specificity for file type determination (meaning it is not a generic signature like ASCII that could represent multiple file types), the system can bypass the more computationally intensive file-print analysis.

When a definitive file signature is recognized, the system follows the "Yes" path directly to a codebook selector 3320. Codebook selector 3320 uses the identified file type to query a codebook lookup table 2808, which maintains associations between file types and optimized encoding/decoding codebooks. Each codebook contains specialized encoding patterns optimized for the statistical characteristics of specific file types. For example, a codebook optimized for video files would contain different encoding patterns than one optimized for database files, reflecting the different data distribution patterns inherent in these file types.

However, when the file signature is missing, corrupted, unrecognized, or represents a generic type requiring further classification, the system follows the "No" path to file-print extractor 2805. File-print extractor 2805 performs a sophisticated statistical analysis of the data's binary distribution patterns. This component segments the data into uniform groups (such as 8-bit bytes or 16-bit words) and calculates multiple statistical characteristics including mean occurrence values, variance from expected distributions, entropy measures, and higher-order statistics such as skewness and kurtosis. These statistical measurements are compiled into a file-print—a compact mathematical representation that captures the essential statistical signature of the data. For streaming data processed through data type identifier 3300, file-print extractor 2805 may generate multiple incremental file-prints as new data arrives, allowing for progressive refinement of the classification.

The generated file-print is then processed by machine-learning algorithm 3100 that has been trained on comprehensive file-print database 2806 containing file-prints from millions of files of known types. Machine-learning algorithm 3100 employs neural network architectures, support vector machines, or ensemble methods to identify patterns in the file-print that correlate with specific file types. The algorithm has been trained to recognize that, for example, compressed video files exhibit certain characteristic patterns in their byte distribution that differ measurably from those of encrypted database files or plain text documents. Machine-learning algorithm 3100 outputs not only a predicted file type but also a confidence score indicating the reliability of its prediction.

File-print database 2806 serves a dual purpose in the system. During operation, it provides the reference patterns that machine-learning algorithm 3100 uses for classification. Additionally, it continuously expands through a feedback mechanism where successfully classified files have their file-prints added to the database, improving the system's accuracy over time. This learning capability is particularly valuable for streaming data, where the system can build up a profile of typical streaming patterns for different protocols and content types.

After machine-learning algorithm 3100 determines the file type, this information is passed to codebook selector 3320, which retrieves the appropriate codebook from codebook lookup table 2808. The selected codebook is then utilized by data decoder 2809 to decode the data using the optimal decoding parameters for the identified file type. Data decoder 2809 applies the inverse transformation of the encoding process, using the codebook's reference patterns to reconstruct the original data from its encoded form. This type-specific decoding ensures maximum efficiency and accuracy in the reconstruction process, as each codebook is optimized for the particular statistical characteristics of its associated file type.

Figure 34:
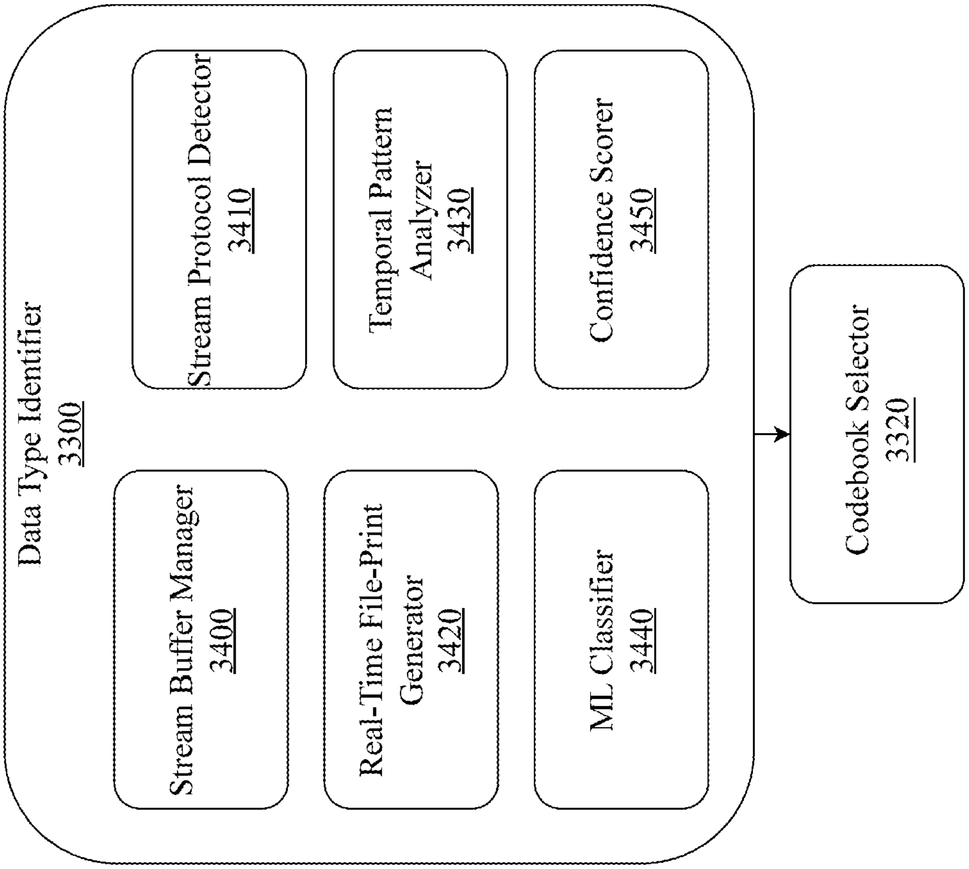
FIG. 34 is a block diagram illustrating the internal components of a data type identifier specialized for processing streaming data and data of uncertain format.

FIG. 34 is a block diagram illustrating the internal components of a data type identifier specialized for processing streaming data and data of uncertain format. Data type identifier 3300 operates as an intelligent front-end processing system that handles continuous data streams, partial files, and data with ambiguous or missing file signatures, preparing them for classification through sophisticated real-time analysis.

A stream buffer manager 3400 serves as the primary data ingestion component, implementing a multi-tiered buffering strategy to accommodate varying data arrival rates and analysis requirements. This component maintains multiple circular buffers of different sizes—for example, small 1 KB buffers for rapid initial analysis, medium 16 KB buffers for standard processing, and large 256 KB buffers for comprehensive pattern detection. Stream buffer manager 3400 dynamically allocates and deallocates these buffers based on available system memory, data arrival rate, and confidence feedback from downstream components. When processing a live video stream, for instance, the buffer manager might maintain a small buffer for detecting frame boundaries, a medium buffer for analyzing GOP (Group of Pictures) structures, and a large buffer for identifying scene transitions. The component implements intelligent overflow handling, ensuring that when buffers reach capacity, the oldest data is either archived for potential reanalysis or discarded based on configurable retention policies.

Working in parallel with the buffer manager, a stream protocol detector 3410 examines the data stream for protocol-specific markers and metadata that can aid in identification. This component maintains a library of protocol signatures for common streaming formats such as but not limited to WebSocket frames for bidirectional communication, and proprietary protocols used by various streaming services. Stream protocol detector 3410 performs both byte-pattern matching for protocol headers and statistical analysis of packet timing and size distributions. For example, when analyzing a stream, it may identify a characteristic header, extract the payload type field, and correlate timestamp progressions to determine whether the stream contains audio (typically 20 ms packets) or video (variable intervals corresponding to frame rates). Stream protocol detector 3410 can also identify multiplexed streams where multiple data types are interleaved, separating them into constituent components for individual analysis.

A real-time file-print generator 3420 adapts the file-print concept for streaming data by implementing sliding window analysis and incremental statistics calculation. Unlike traditional file-print generation which processes complete files, this component maintains running statistics that are continuously updated as new data arrives. In an embodiment, real-time file-print generator 3420 employs efficient online algorithms such as Welford's method for calculating running variance and exponentially weighted moving averages for tracking distribution changes over time. Real-time file-print generator 3420 produces compact file-print snapshots at regular intervals (configurable from milliseconds to seconds based on data rate), with each snapshot containing statistical measures including byte frequency distributions, entropy measurements, autocorrelation values indicating repetitive patterns, and spectral characteristics derived from fast Fourier transforms of the data. For a streaming audio file, real-time file-print generator 3420 might produce file-prints every 100 milliseconds, capturing the statistical signature of the audio data while using minimal computational resources.

A temporal pattern analyzer 3430 examines how statistical characteristics evolve over time, identifying patterns that are characteristic of specific data types. This component maintains a sliding window of recent file-prints generated by real-time file-print generator 3420 and performs time-series analysis to detect periodicities, trends, and anomalies. For video streams, it might identify the regular pattern of I-frames occurring every 2 seconds, with predictable statistical variations between I, P, and B frames. For encrypted data streams, it would detect the high entropy values that remain consistent over time. Temporal pattern analyzer 3430 employs techniques such as autocorrelation analysis to find repeating patterns, change point detection algorithms to identify format transitions within a stream, and frequency domain analysis to identify characteristic rhythms in the data. These temporal features provide crucial supplementary information that significantly improves classification accuracy for streaming data.

A ML classifier 3440 represents an enhanced version of the machine learning algorithm designed specifically for streaming data classification. This component employs a hierarchical classification approach, using fast, lightweight models for initial classification followed by more sophisticated deep learning models for refined analysis. The classifier may incorporate LSTM (Long Short-Term Memory) or transformer-based architectures that can process sequential file-prints while maintaining context over extended time periods. It has been trained not only on static file-prints but also on temporal sequences, learning to recognize how different data types evolve over time. For instance, the classifier learns that streaming video exhibits periodic spikes in data complexity corresponding to keyframes, while streaming sensor data shows more uniform statistical properties. ML classifier 3440 can also identify transitions between data types within a single stream, such as when a multimedia stream switches from video content to pure audio during a commercial break.

A confidence scorer 3450 provides a probability assessment of the classification results, considering multiple factors including the amount of data analyzed, the consistency of predictions over time, the strength of pattern matches, and the presence or absence of expected temporal features. This component may utilize a Bayesian framework that updates probability estimates as more data becomes available, starting with prior probabilities based on protocol detection and refining these estimates with each new file-print analysis. Confidence scorer 3450 maintains separate confidence tracks for different aspects of the classification—for example, it might be 95% confident that data is video-based but only 60% confident about the specific codec. It also implements anomaly detection, flagging unusual patterns that might indicate corrupted data, encryption, or novel data types not well-represented in the training set. Confidence scorer 3450 provides not just a single confidence value but a confidence interval and a trajectory indicating whether confidence is improving or degrading over time.

All components within data type identifier 3300 operate in a coordinated pipeline, with data flowing from stream buffer manager 3400 through the analysis components and ultimately to codebook selector 3320. Codebook selector 3320 receives the classification results and confidence scores, using this information to select the most appropriate codebook for decoding. In cases where confidence is low or multiple data types are detected, codebook selector 3320 may load multiple codebooks and maintain them in a ready state, switching between them as needed or using a fallback universal codebook that provides acceptable though not optimal performance across multiple data types. This architecture ensures that streaming data can be processed with minimal latency while maintaining high classification accuracy, enabling efficient real-time encoding and decoding of diverse data streams.

Figure 35:
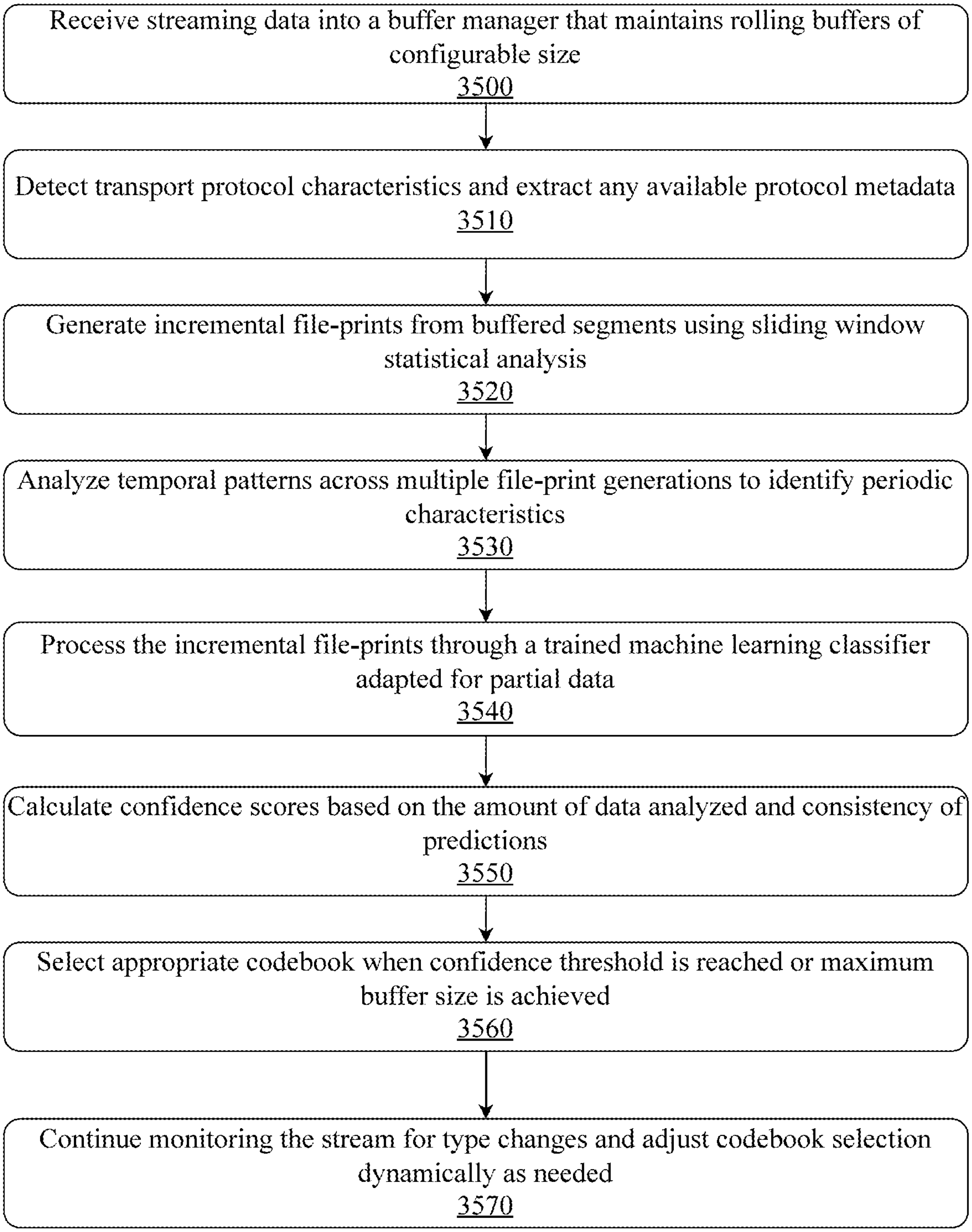
FIG. 35 is a flow diagram illustrating an exemplary method for identifying data types in streaming data using progressive statistical analysis.

FIG. 35 is a flow diagram illustrating an exemplary method for identifying data types in streaming data using progressive statistical analysis. In a first step 3500, streaming data is received into a buffer manager that maintains rolling buffers of configurable size. This initial reception process involves allocating memory buffers that can accommodate continuous data flow while preventing data loss. The rolling buffer architecture allows for continuous data ingestion where new data overwrites the oldest data once capacity is reached, ensuring that analysis can proceed without interrupting the data stream. Buffer sizes are configured based on expected data rates, available memory, and the minimum data quantity required for meaningful statistical analysis, typically ranging from kilobytes for low-bandwidth streams to megabytes for high-throughput applications.

In a step 3510, transport protocol characteristics are detected and any available protocol metadata is extracted. This detection process involves examining the structure and headers of incoming data packets to identify standardized streaming protocols such as RTP, RTSP, HLS, DASH, or proprietary formats. Protocol detection algorithms analyze packet boundaries, header fields, timestamp sequences, and payload type indicators that provide valuable context about the data type even before content analysis begins. Metadata extraction retrieves information such as codec identifiers, bitrate specifications, timing information, and multiplexing parameters that can significantly accelerate and improve the accuracy of subsequent classification steps.

In a step 3520, incremental file-prints are generated from buffered segments using sliding window statistical analysis. This generation process calculates statistical characteristics of data within overlapping windows that slide through the buffer at regular intervals. Each file-print captures distribution properties including byte frequency histograms, entropy measurements, mean and variance calculations, and higher-order statistics computed using online algorithms that update incrementally as new data arrives. The sliding window approach ensures that file-prints reflect current data characteristics while maintaining computational efficiency by avoiding complete recalculation with each new data segment.

In a step 3530, temporal patterns are analyzed across multiple file-print generations to identify periodic characteristics. This analysis examines how statistical properties evolve over time by comparing sequential file-prints to detect repetitive patterns, cyclic variations, and trend changes that are characteristic of specific data types. Time-series analysis techniques including autocorrelation, spectral analysis, and change-point detection identify features such as the regular occurrence of keyframes in video streams, the consistent packet intervals in audio streams, or the random distribution patterns in encrypted data. These temporal signatures provide discriminative features that distinguish between data types that might have similar instantaneous statistical properties but different temporal behaviors.

In a step 3540, the incremental file-prints are processed through a trained machine learning classifier adapted for partial data. This processing involves feeding both the current file-print and historical file-print sequences into neural network architectures designed to handle incomplete or streaming data. The classifier employs techniques such as attention mechanisms to weight the importance of different temporal segments, dropout regularization to handle missing data gracefully, and ensemble methods that combine predictions from multiple models trained on different data completeness levels. The adaptation for partial data includes probability calibration that accounts for the reduced confidence inherent in classifications based on incomplete information.

In a step 3550, confidence scores are calculated based on the amount of data analyzed and consistency of predictions. This calculation implements a multi-factor scoring algorithm that considers the volume of data processed, the stability of predictions over time, the strength of pattern matches, and the agreement between different classification approaches. The confidence scoring employs Bayesian updating to refine probability estimates as more data becomes available, starting with prior probabilities based on protocol detection and continuously adjusting based on accumulated evidence. Confidence thresholds are dynamically adjusted based on application requirements, with key applications requiring higher confidence before committing to a classification decision.

In a step 3560, an appropriate codebook is selected when the confidence threshold is reached or maximum buffer size is achieved. This selection process evaluates the classification results and confidence scores to choose the optimal codebook for encoding or decoding the identified data type. When confidence thresholds are met, the most probable codebook is loaded and activated for processing. When maximum buffer size is reached without achieving target confidence, the method employs fallback strategies such as selecting a universal codebook that provides acceptable performance across multiple data types, or maintaining multiple codebooks in parallel until additional data allows for definitive selection.

In a step 3570, monitoring continues for type changes in the stream with dynamic adjustment of codebook selection as needed. This continuous monitoring process maintains vigilance for indications that the data type has changed, such as sudden shifts in statistical properties, protocol marker changes, or degrading classification confidence. When transitions are detected, the method initiates reclassification procedures, potentially maintaining multiple active codebooks during transition periods to ensure uninterrupted processing. The monitoring process employs adaptive thresholds that become more sensitive to changes after extended periods of stable classification, allowing for quick response to format switches while avoiding false positives during normal statistical variations within a single data type.

Figure 36:
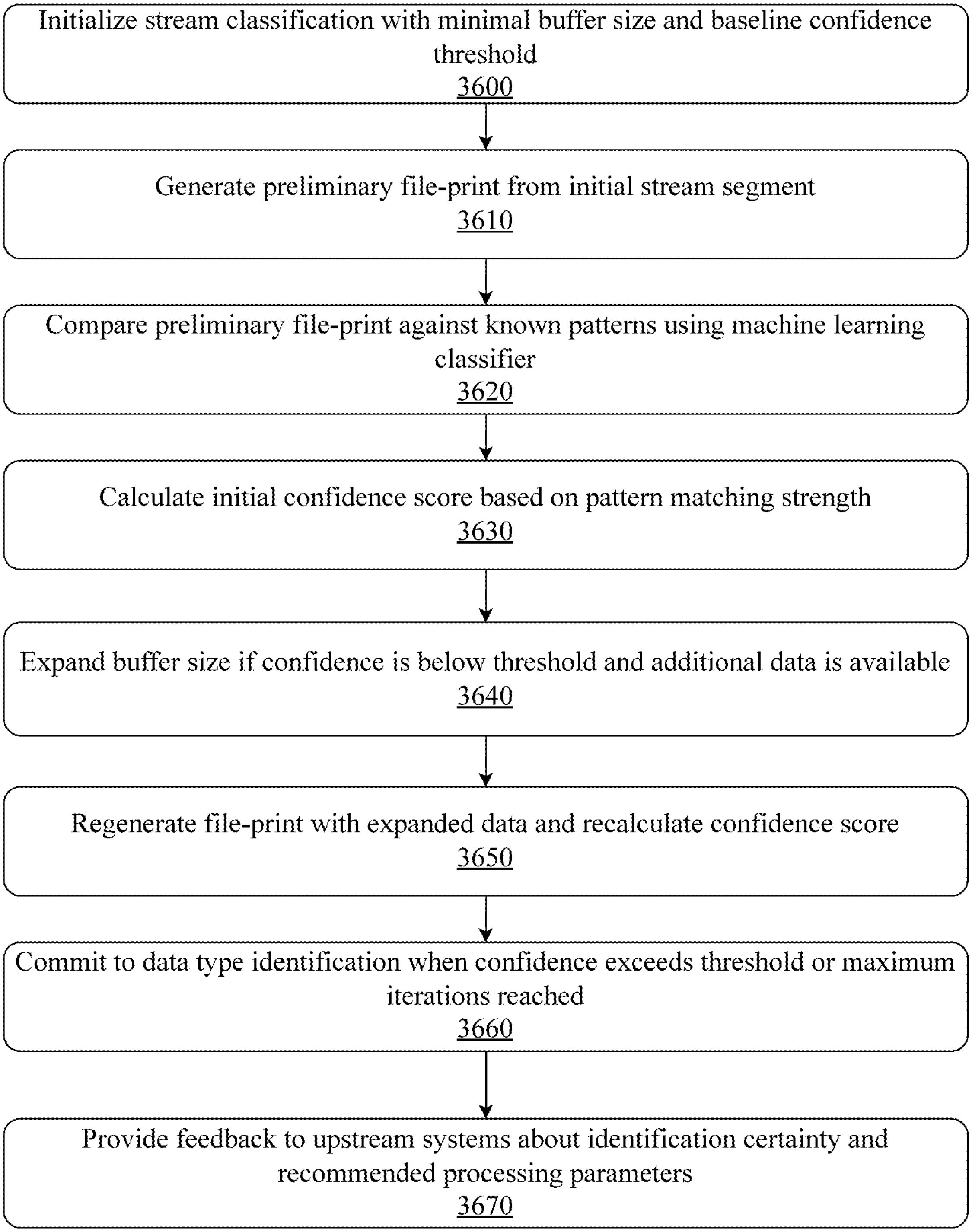
FIG. 36 is a flow diagram illustrating an exemplary method for progressively refining stream type identification with increasing confidence levels.

FIG. 36 is a flow diagram illustrating an exemplary method for progressively refining stream type identification with increasing confidence levels. In a first step 3600, stream classification is initialized with minimal buffer size and baseline confidence threshold. This initialization establishes the starting parameters for an adaptive classification process that balances speed with accuracy. The minimal buffer size, typically ranging from 256 bytes to 4 kilobytes, represents the smallest amount of data deemed sufficient for generating a meaningful initial file-print while minimizing latency. The baseline confidence threshold establishes the minimum certainty level required for classification commitment, with this threshold being configurable based on application requirements where time-critical applications might accept lower confidence for faster decisions while high-accuracy applications demand higher certainty.

In a step 3610, a preliminary file-print is generated from the initial stream segment. This generation process applies statistical analysis algorithms to the limited initial data, calculating distribution characteristics including byte frequencies, entropy measures, and basic statistical moments. Despite the small sample size, the preliminary file-print captures essential statistical signatures that can provide strong indicators for certain data types, particularly those with distinctive patterns such as highly structured formats or encrypted data with uniform randomness. The generation process employs techniques optimized for small sample statistics, including bias correction methods and bootstrap sampling to maximize the information extracted from limited data.

In a step 3620, the preliminary file-print is compared against known patterns using a machine learning classifier. This comparison process involves feeding the preliminary file-print into neural networks or ensemble classifiers that have been specifically trained to handle file-prints generated from varying data sizes. The classifier maintains multiple model variants trained on different data completeness levels, selecting the appropriate model based on the input size. Pattern matching algorithms compute similarity measures between the preliminary file-print and reference patterns in the training database, using distance metrics adapted for high-dimensional sparse data where not all statistical features may be reliably computed from small samples.

In a step 3630, an initial confidence score is calculated based on pattern matching strength. This calculation evaluates multiple factors including the distance between the preliminary file-print and the nearest known patterns, the separation between the top predicted class and alternative classes, and the reliability of statistical measures given the sample size. The confidence scoring employs probabilistic frameworks that account for uncertainty inherent in small-sample classification, producing not just a point estimate but a confidence interval that reflects the range of plausible classifications. The scoring algorithm weights different statistical features based on their stability with small samples, giving higher importance to robust measures that remain reliable even with limited data.

In a step 3640, buffer size is expanded if confidence is below threshold and additional data is available. This expansion process implements an adaptive sampling strategy that increases the data collection window when initial classification attempts yield insufficient confidence. The expansion follows geometric progression, typically doubling the buffer size with each iteration to rapidly increase the available data while maintaining computational efficiency. Buffer expansion continues only while new data provides meaningful information gain, with diminishing returns detection preventing unnecessary memory consumption when additional data no longer improves classification confidence.

In a step 3650, the file-print is regenerated with expanded data and confidence score is recalculated. This regeneration process recalculates all statistical measures using the larger data sample, providing more accurate and stable feature values. The expanded file-print incorporates additional statistical dimensions that may not have been computable with smaller samples, such as higher-order moments, cross-correlations, and spectral features requiring longer data sequences. The recalculation of confidence scores reflects both the improved statistical reliability from larger samples and any changes in classification predictions that result from the more comprehensive analysis.

In a step 3660, commitment to data type identification occurs when confidence exceeds threshold or maximum iterations are reached. This commitment process makes a definitive classification decision based on the accumulated evidence, either because sufficient confidence has been achieved or because resource constraints prevent further analysis. When confidence thresholds are met, the classification result is finalized with associated metadata including the confidence level, the amount of data analyzed, and any alternative classifications with significant probability. When maximum iterations are reached without achieving target confidence, the method commits to the most probable classification while flagging the result as provisional, enabling downstream processes to implement appropriate fallback strategies.

In a step 3670, feedback is provided to upstream systems about identification certainty and recommended processing parameters. This feedback mechanism communicates comprehensive classification results including the identified data type, confidence metrics, statistical characteristics that influenced the classification, and recommendations for optimal processing based on the identified type. The feedback includes quality indicators such as classification stability over time, presence of anomalies or mixed content, and suggestions for buffer sizes or sampling rates that would improve future classification attempts. This information enables upstream systems to make informed decisions about data routing, processing priorities, error handling strategies, and resource allocation based on both the classification result and the certainty with which it was determined.

Figure 37:
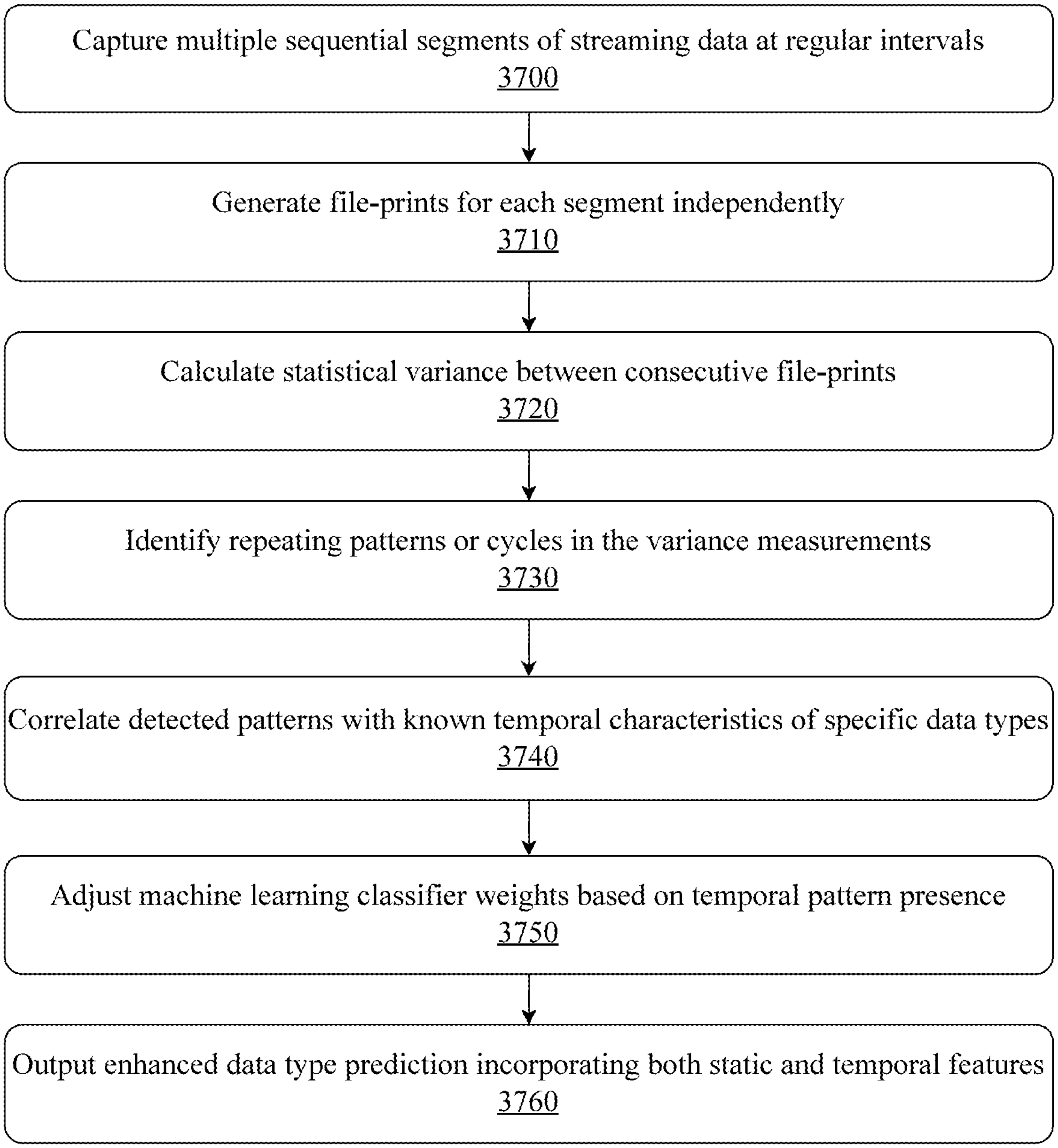
FIG. 37 is a flow diagram illustrating an exemplary method for detecting and utilizing temporal patterns to enhance stream type identification.

FIG. 37 is a flow diagram illustrating an exemplary method for detecting and utilizing temporal patterns to enhance stream type identification. In a first step 3700, multiple sequential segments of streaming data are captured at regular intervals. This capture process establishes a temporal sampling framework where data segments are extracted from the continuous stream at predetermined time intervals, which may range from milliseconds for high-frequency analysis to seconds for slower-changing content. Each captured segment maintains consistent size to ensure statistical comparability, with the segment duration and sampling interval optimized based on expected data characteristics and available computational resources. The capture mechanism preserves temporal ordering and timing information, creating a time-indexed sequence of data segments that forms the basis for temporal pattern analysis.

In a step 3710, file-prints are generated for each segment independently. This generation process applies identical statistical analysis algorithms to each captured segment, producing a standardized file-print that encapsulates the statistical characteristics of that specific time window. Each file-print calculation proceeds without reference to other segments, ensuring that the resulting file-prints represent true snapshots of the data's statistical properties at discrete time points. The independent generation approach enables parallel processing of multiple segments and provides resilience against corrupted or missing segments that might occur in unreliable streaming conditions.

In a step 3720, statistical variance is calculated between consecutive file-prints. This calculation quantifies the degree of change in statistical properties from one time segment to the next, producing a time series of variance measurements that reveals how rapidly and significantly the data characteristics evolve. The variance computation employs multiple distance metrics including Euclidean distance for overall dissimilarity, Jensen-Shannon divergence for distribution differences, and correlation coefficients for pattern similarity. These variance measurements create a second-order statistical representation that captures the dynamics of change rather than just static properties.

In a step 3730, repeating patterns or cycles are identified in the variance measurements. This identification process applies time-series analysis techniques to detect periodicities in how the statistical properties change over time. Autocorrelation analysis reveals repeating patterns at different lag intervals, while Fourier transformation identifies dominant frequencies in the variance signal. Pattern detection algorithms search for both strict periodicities, such as regular keyframe intervals in video streams, and quasi-periodic patterns, such as the variable but bounded intervals between silence periods in speech. The identification process also recognizes phase-locked patterns where changes occur at consistent relative timings even if absolute timing varies.

In a step 3740, detected patterns are correlated with known temporal characteristics of specific data types. This correlation process matches observed temporal patterns against a reference database of temporal signatures associated with different data types and encoding formats. For instance, compressed video streams exhibit characteristic patterns of high variance at keyframe boundaries followed by gradual variance decay during inter-frame sequences, while encrypted data maintains consistently low variance due to its randomized nature. The correlation analysis employs pattern matching algorithms that account for scale variations, phase shifts, and noise, producing similarity scores that indicate how closely the observed patterns match known temporal signatures.

In a step 3750, machine learning classifier weights are adjusted based on temporal pattern presence. This adjustment process modifies the relative importance of different features in the classification decision based on the strength and consistency of detected temporal patterns. When strong temporal patterns are detected that match known signatures, the classifier increases the weight given to temporal features relative to static statistical features. The weight adjustment employs adaptive learning algorithms that can dynamically rebalance feature importance based on the discriminative power of temporal versus static features for the current data stream. This adaptive weighting ensures that the classifier leverages the most informative features available, whether they are static distributions, temporal patterns, or combinations thereof.

In a step 3760, an enhanced data type prediction is output incorporating both static and temporal features. This output process combines the classification results from static file-print analysis with the temporal pattern analysis to produce a comprehensive data type identification that leverages all available information. The enhanced prediction includes not only the identified data type but also metadata about the temporal characteristics observed, such as detected periodicities, pattern stability, and temporal anomalies that might indicate format changes or corrupted segments. The prediction confidence score reflects the agreement between static and temporal analyses, with higher confidence when both approaches independently suggest the same data type. The output format provides sufficient detail for downstream processes to make informed decisions about handling the identified stream, including optimal buffer sizes for the detected periodicity, expected variance patterns for quality monitoring, and timing parameters for synchronized processing of periodic elements.

Exemplary Computing Environment

Figure 38:
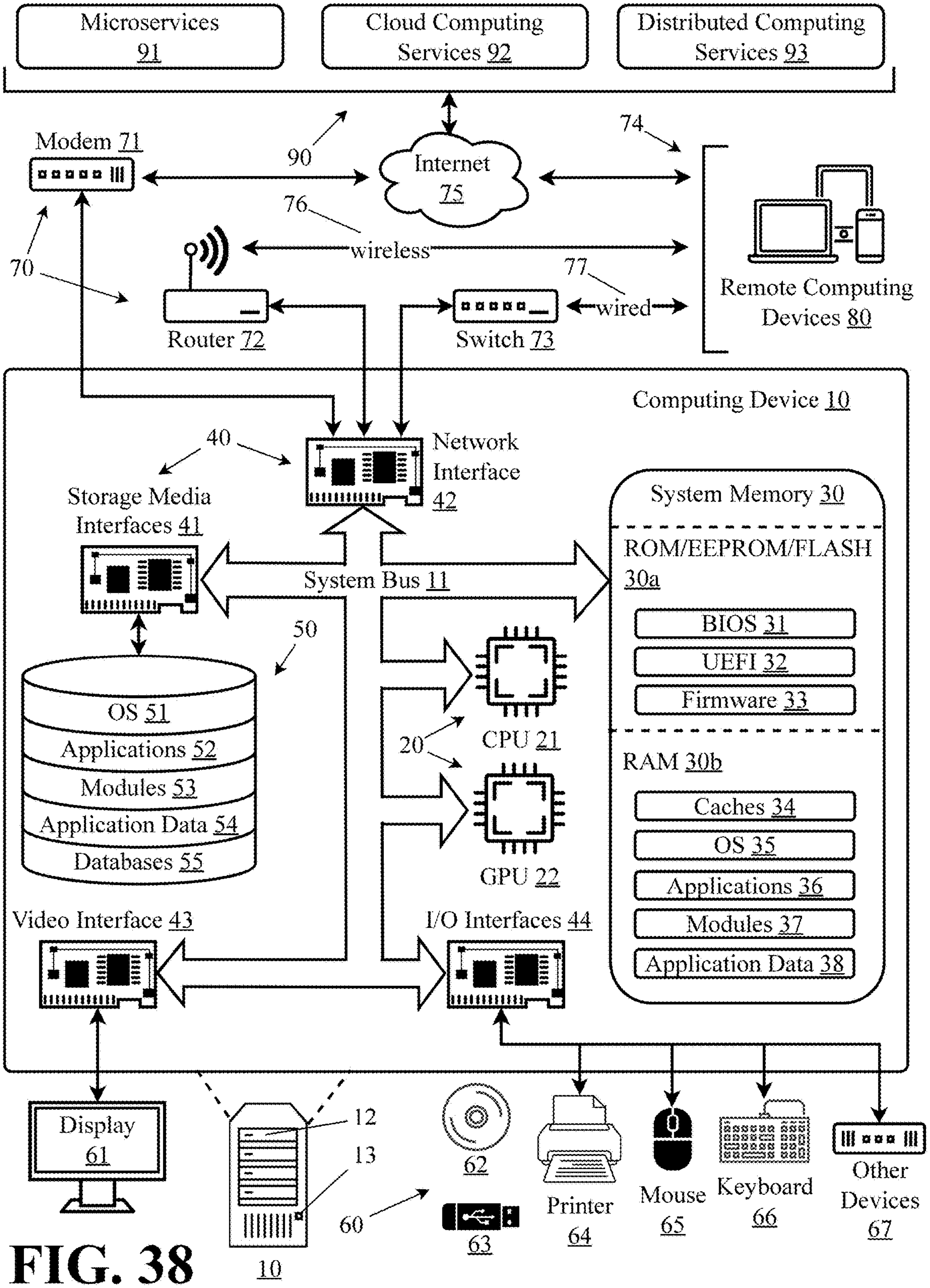
FIG. 38 illustrates an exemplary computing environment on which an embodiment described herein may be implemented, in full or in part.

FIG. 38 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory **30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b*** may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-onsubstrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents. In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

What is claimed is:

1. A computer system comprising a hardware memory, wherein the computer system is configured to execute software instructions stored on nontransitory machine-readable storage media that:

identify a data type of digital data received in varying formats by adapting statistical analysis techniques based on whether received digital data comprises a discrete file with determinable boundaries or a continuous data stream without predetermined endpoints;

when the digital data comprises a discrete file:

segment the entire file into groups of bytes and generate a statistical file-print comprising a plurality of statistical characteristics of a distribution of the groups of bytes across the entire file;

when the digital data comprises a continuous data stream:

maintain rolling buffers of configurable size to capture streaming data segments;

generate incremental statistical file-prints from buffered segments using sliding window analysis, each incremental file-print comprising statistical characteristics of data within a temporal window;

analyze temporal patterns across multiple sequential file-print generations to identify periodic characteristics in the statistical variance between consecutive file-prints; and calculate a confidence score based on an amount of data analyzed and consistency of predictions over time;

process the statistical file-print or incremental file-prints through a trained machine learning classifier to identify a data type; and select an encoding or decoding codebook from a plurality of codebooks based on the identified data type, wherein the selection for streaming data can be dynamically adjusted in response to detected changes in data type within the continuous stream.

2. The system of claim 1, wherein the trained machine learning classifier is specifically trained using training datasets comprising both:

statistical file-prints derived from complete files of known types; and temporal sequences of incremental file-prints derived from streaming data of known types;

wherein the trained machine learning classifier determines a data type based on statistical patterns in the file-print that correspond to patterns previously identified during training;

wherein for streaming data, the machine learning classifier adapts its classification weights based on detected temporal patterns and outputs an enhanced data type prediction when the confidence score exceeds a configurable threshold or when maximum buffer capacity is reached.

3. A method for identifying a file type comprising the steps of:

identifying a data type of digital data received in varying formats by adapting statistical analysis techniques based on whether received digital data comprises a discrete file with determinable boundaries or a continuous data stream without predetermined endpoints;

when the digital data comprises a discrete file:

segmenting the entire file into groups of bytes and generate a statistical file-print comprising a plurality of statistical characteristics of a distribution of the groups of bytes across the entire file;

when the digital data comprises a continuous data stream:

maintaining rolling buffers of configurable size to capture streaming data segments;

generating incremental statistical file-prints from buffered segments using sliding window analysis, each incremental file-print comprising statistical characteristics of data within a temporal window;

analyzing temporal patterns across multiple sequential file-print generations to identify periodic characteristics in the statistical variance between consecutive file-prints; and calculating a confidence score based on an amount of data analyzed and consistency of predictions over time;

processing the statistical file-print or incremental file-prints through a trained machine learning classifier to identify a data type; and selecting an encoding or decoding codebook from a plurality of codebooks based on the identified data type, wherein the selection for streaming data can be dynamically adjusted in response to detected changes in data type within the continuous stream.

4. The method of claim 3, wherein the trained machine learning classifier is specifically trained using training datasets comprising both:

statistical file-prints derived from complete files of known types; and temporal sequences of incremental file-prints derived from streaming data of known types;

wherein the trained machine learning classifier determines a data type based on statistical patterns in the file-print that correspond to patterns previously identified during training;

wherein for streaming data, the machine learning classifier adapts its classification weights based on detected temporal patterns and outputs an enhanced data type prediction when the confidence score exceeds a configurable threshold or when maximum buffer capacity is reached.

* * * * *